US012756243B2

(12) United States Patent
Luzinski et al.

(10) Patent No.: US 12,756,243 B2
(45) Date of Patent: Oct. 6, 2026

(54) DEVICE SYNCHRONIZATION ECO-SYSTEM UTILIZING WIRELESS POWER AND DATA TRANSFER SYSTEMS

(71) Applicant: NuCurrent, Inc., Chicago, IL (US)

(72) Inventors: Jason Luzinski, Chicago, IL (US); Juan Serrano, Chicago, IL (US); Jason Green, Evanston, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

(21) Appl. No.: 18/758,334

(22) Filed: Jun. 28, 2024

(65) Prior Publication Data

US 2026/0005552 A1 Jan. 1, 2026

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC .......... H02J 50/80; H02J 50/12; H04W 40/80
See application file for complete search history.

(56) References Cited

U.S. PATENT DOCUMENTS 9,698,620 B2 * 7/2017 Patro ...................... H02J 50/40
10,075,017 B2 * 9/2018 Leabman ............ H04M 1/0202
10,305,314 B2 * 5/2019 Gupta ..................... H02J 50/10
11,289,952 B1 * 3/2022 Melone .................. H02J 50/10
2006/0187864 A1 * 8/2006 Wang .................... H04W 48/12 370/311
2007/0249386 A1 * 10/2007 Bennett ................. H04W 24/08 455/550.1

(Continued)

FOREIGN PATENT DOCUMENTS

EP 3437252 B1 6/2021
KR 101620628 B1 5/2016
WO WO-2017018681 A1 * 2/2017 ................ H02J 7/82

OTHER PUBLICATIONS

International Searching Authority, PCT International Search Report and Written Opinion, PCT International Application No. PCT/US2025/035049 dated Oct. 28, 2025, 11 pages.

*Primary Examiner* — Menatoallah Youssef
*Assistant Examiner* — Michael J Warmflash
(74) *Attorney, Agent, or Firm* — Lee Sullivan Shea & Smith LLP

(57) ABSTRACT

A method for operating a wireless transmission system includes (i) receiving, as input, direct current (DC) power from a power and data connector that comprises a power input and a bi-directional data connector, (ii) generating a driving signal for driving an antenna of the wireless power transmission system, (iii) generating alternating current (AC) wireless signals based on the input DC power and the driving signal, (iv) propagate AC wireless power signals that are based on the AC wireless signals via the antenna, (v) couple with a wireless receiver system via the AC wireless power signals, (vi) receiving data associated with a peripheral device by decoding in-band data signals from the AC wireless power signals that are encoded by the wireless receiver system, and (vii) providing the data associated with the peripheral device to a client device operatively associated with the wireless transmission system, via the bi-directional data connector.

20 Claims, 34 Drawing Sheets

(56) References Cited

U.S. PATENT DOCUMENTS

| | | | | |
|---|---|---|---|---|
| 2013/0038424 | A1* | 2/2013 | Katar | H02J 13/1321 340/5.8 |
| 2015/0016281 | A1* | 1/2015 | Jagetiya | H04W 48/06 370/252 |
| 2015/0288423 | A1* | 10/2015 | Chu | H04B 5/79 307/104 |
| 2016/0149436 | A1* | 5/2016 | Cooper | H02J 50/40 320/106 |
| 2016/0190862 | A1* | 6/2016 | Ma | H02J 50/10 320/108 |
| 2016/0204642 | A1* | 7/2016 | Oh | H02J 50/12 320/108 |
| 2018/0351387 | A1* | 12/2018 | Gupta | H02J 50/10 |
| 2019/0173309 | A1* | 6/2019 | Jung | H02J 7/42 |
| 2019/0245387 | A1* | 8/2019 | Park | H02J 50/12 |
| 2019/0305597 | A1* | 10/2019 | Venkatraman | H02J 7/42 |
| 2020/0021138 | A1* | 1/2020 | Yeo | H02J 7/42 |
| 2020/0336018 | A1* | 10/2020 | Abajian | G01R 23/16 |
| 2021/0194296 | A1* | 6/2021 | Jo | H02J 50/80 |
| 2021/0234412 | A1 | 7/2021 | Walley et al. | |
| 2021/0265862 | A1* | 8/2021 | Yeo | H02J 50/005 |
| 2022/0029466 | A1* | 1/2022 | Peralta | H02J 50/50 |
| 2022/0029468 | A1* | 1/2022 | Peralta | H02J 50/502 |
| 2023/0120011 | A1 | 4/2023 | Peralta et al. | |
| 2023/0134962 | A1* | 5/2023 | Lim | G06F 3/14 320/108 |
| 2023/0291243 | A1 | 9/2023 | Audet et al. | |
| 2023/0387971 | A1* | 11/2023 | Lin | H04L 5/0094 |

* cited by examiner

803

DEVICE SYNCHRONIZATION ECO-SYSTEM UTILIZING WIRELESS POWER AND DATA TRANSFER SYSTEMS

BACKGROUND

Wireless power and data transfer systems are used in a variety of applications for wireless transfer of electrical energy, electrical power, electromagnetic energy, and/or electrical data signals. Such wireless power and data transfer systems often use inductive wireless power transfer, which occurs when magnetic fields created by a transmitting element induce an electric field, and hence, an electric current, in a receiving element. These transmitting and receiving elements will often take the form of an antenna, such as coiled wires, and the like.

Such transmitting and receiving elements may further be leveraged as a communications medium for transferring data, via the induced electric field, between devices associated, each, with a transmitting element and/or a receiving element.

SUMMARY

Disclosed herein is new technology for establishing and utilizing a multi-device eco-system via wireless power and data transfer that interconnects a plurality of devices, such as client devices and peripheral devices.

In one aspect, the disclosed technology may take the form of a wireless power transmission system. The wireless power transmission system may includes (i) a power and data connector, (ii) a power conditioning system, (iii) an antenna, and (iv) a controller. The power conditioning system may be configured to (a) receive input direct current (DC) power from the power input and (b) generate alternating current (AC) wireless signals based on the input DC power and a driving signal. The antenna may be configured to (a) receive the AC wireless signals, (b) propagate AC wireless power signals based on the AC wireless signals, and (c) couple with a wireless receiver system via the AC wireless power signals. The controller may include (a) at least one processor, (b) at least one machine-readable medium, and (c) program instructions stored on the at least one machine-readable medium. The program instructions, when executed by the at least one processor, may cause the controller to (a) generate the driving signals, (b) receive data associated with a peripheral device by decoding in-band data signals from the AC wireless power signals that are encoded by the wireless receiver system, and (c) provide the data associated with the peripheral device to a client device operatively associated with the wireless transmission system, via the bi-directional data connector.

The foregoing wireless power transmission system may be capable of additional functionality. For example, the program instructions stored on the at least one machine-readable medium which, when executed by the at least one processor, may cause the controller to encode data associated with the client device in the AC wireless power signals by altering the driving signal. In a further example, the program instructions stored on the at least one machine-readable medium which, when executed by the at least one processor, may further cause the controller to receive the data associated with the client device from the client device, as communicated to the client device from a back-end platform.

The data associated with the client device may take various forms and, in some such examples, the data associated with the client device may be peripheral device user data. In some additional or alternative examples, the data associated with the client device may be communications information for another peripheral device that is configured to enable connectivity between the peripheral device and the another peripheral device. Further, in some examples, the data associated with the peripheral device may be user credential data associated with a user of the peripheral device.

The foregoing wireless power transmission system may include additional components. For example, the wireless power transmission system may include an automatic gain control (AGC) configured to (i) receive voltage information indicative of the in-band data signals and (ii) alter the voltage information to generate a gain-controlled data signal. In another example, the wireless power transmission system may further include a damping circuit that is configured to dampen the AC wireless power signals, wherein the damping circuit includes a damping transistor that is configured to receive a damping signal for switching the damping transistor to control damping during transmission of the AC wireless power signals and, in such examples, the program instructions stored on the at least one machine-readable medium which, when executed by the at least one processor, further cause the controller to generate the damping signals. In some further examples, the damping circuit comprises a delay element.

The foregoing wireless power transmission system may further have functionality for utilizing a low power detection mode. In some such examples, the program instructions stored on the at least one machine-readable medium which, when executed by the at least one processor, may further cause the controller to, in response to an indication that the wireless receiver system does not require further power transfer but is still proximate to the wireless transmission system, enter a low power detection mode and the program instructions stored on the at least one machine-readable medium which, when executed by the at least one processor, cause the controller to generate the driving signal may include generating the driving signal based on the low power detection mode.

In another aspect, the disclosed technology may take the form of a method for operating a wireless transmission system that involves (i) receiving, as input, DC power from a power and data connector that comprises a power input and a bi-directional data connector, (ii) generating a driving signal for driving an antenna of the wireless power transmission system, (iii) generating AC wireless signals based on the input DC power and the driving signal, (iv) propagate AC wireless power signals that are based on the AC wireless signals via the antenna, (v) coupling with a wireless receiver system via the AC wireless power signals, (vi) receiving data associated with a peripheral device by decoding in-band data signals from the AC wireless power signals that are encoded by the wireless receiver system, and (vii) providing the data associated with the peripheral device to a client device operatively associated with the wireless transmission system, via the bi-directional data connector.

The foregoing method may include additional functionality, and, in an example, the method may involve encoding data associated with the client device in the AC wireless power signals by altering the driving signal. In a further example, the method further involves receiving the data associated with the client device from the client device, as communicated to the client device from a back-end platform. In another example, the foregoing method may further involve (i) receiving voltage information indicative of the in-band data signals, and (ii) altering the voltage information to generate a gain-controlled data signal. In another example, the method may further involve (i) generating damping signals that control selective signal dampening by a damping circuit during transmission of the AC wireless power signals, and, based on the damping signals, (ii) controlling switching of a damping transistor of the damping circuit during transmission of the AC wireless power signals. In such examples, the damping circuit may include a delay element configured to ramp down a gate voltage for the damping transistor when the damping signal transitions from a high state to a low state.

The data associated with the client device may take various forms and, in some such examples, the data associated with the client device may be peripheral device user data. In some additional or alternative examples, the data associated with the client device may be communications information for another peripheral device that is configured to enable connectivity between the peripheral device and the another peripheral device. Further, in some examples, the data associated with the peripheral device may be user credential data associated with a user of the peripheral device.

The foregoing method may further involve functionality for utilizing a low power detection mode. In such examples, the method may further involve, in response to an indication that the wireless receiver system does not require further power transfer but is still proximate to the wireless transmission system, entering a low power detection mode and generating the driving signal may involve generating the driving signal based on the low power detection mode.

These and other aspects and features of the present disclosure will be better understood when read in conjunction with the accompanying drawings.

Figure 1A:
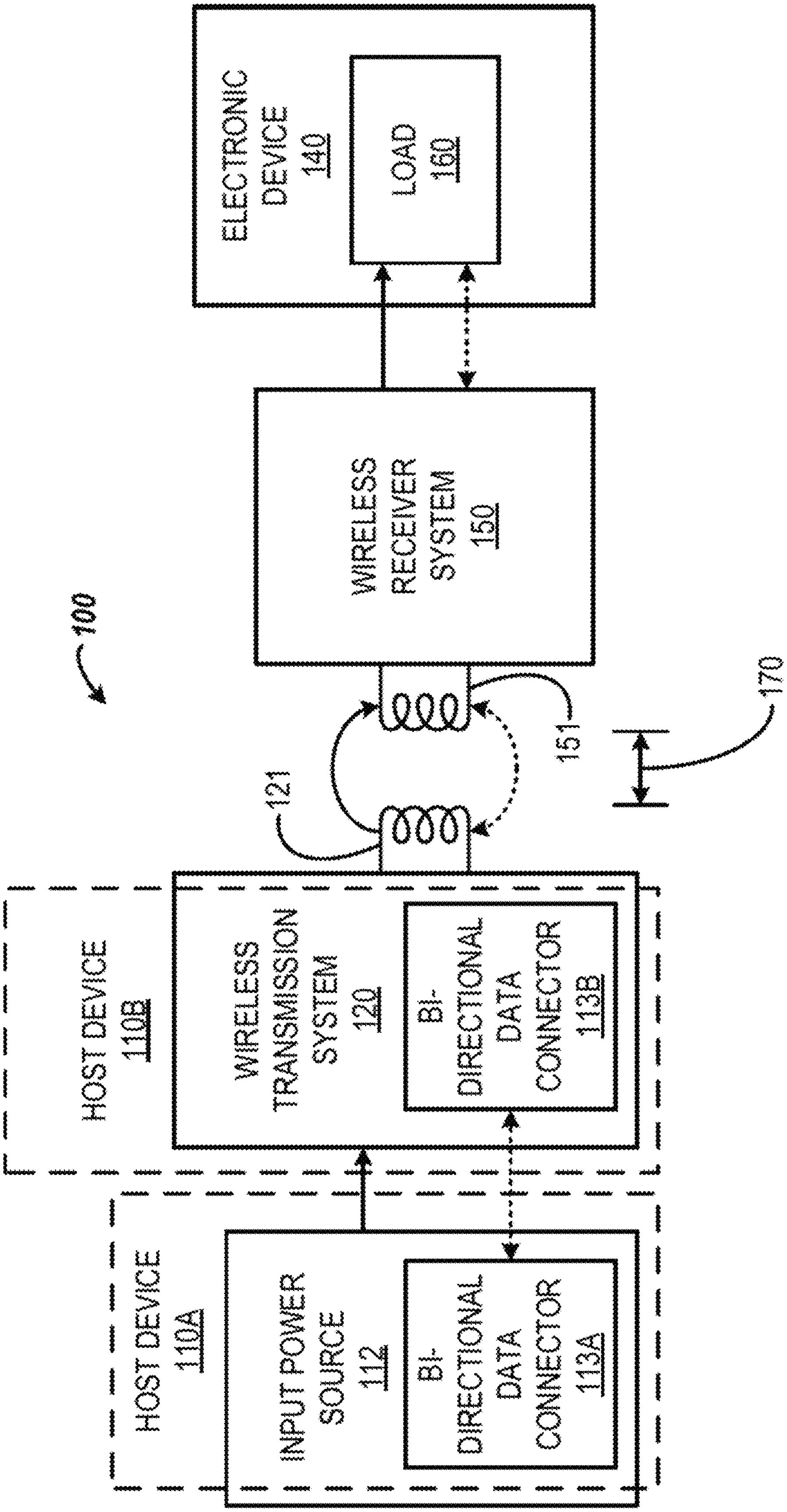
FIG. 1A is a block diagram of an embodiment of a system for wirelessly transferring electrical power and data.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

Near field magnetic induction (NFMI) is often utilized for wireless power transfer. NFMI enables the transfer of signals wirelessly through magnetic that induces a current between a transmission antenna and a receiver antenna coupled with the transmission antenna. To that end, NFMI may be referred to as "inductive coupling," which may be a wireless power transmission technique that utilizes an alternating electromagnetic field to transfer electrical energy between two antennas.

NFMI utilizes this coupling between antennas, in the near field, for wireless transmission of magnetic energy between two magnetically coupled coils that are tuned to resonate at a similar frequency. Such near-field magnetic coupling may enable wireless power transmission via resonant transmission of confined magnetic fields. This near-field magnetic coupling may provide connection via "mutual inductance," which refers to the production of an electromotive force in a circuit by a change in current in at least one other circuit magnetically coupled to the first.

To facilitate NFMI, the inductor coils of either the transmission antenna or the receiver antenna are strategically positioned to facilitate reception and/or transmission of wirelessly transferred electrical signals, via NFMI.

Transmission of one or more of electrical energy, electrical power, electromagnetic energy and/or electronic data signals from one of such coiled antennas to another, generally, operates at an operating frequency and/or an operating frequency range. An operating frequency, generally, refers to the frequency at which antennas of a wireless system are tuned to for purposes of wireless power and/or data transfer. The operating frequency may be selected for any of a variety of reasons, such as, but not limited to, power transfer efficiency characteristics, power level characteristics, self-resonant frequency restraints, design requirements, adherence to standards bodies' required characteristics (e.g, electromagnetic interference (EMI) requirements, specific absorption rate (SAR) requirements, etc.), bill of materials (BOM) restrictions, and/or form factor constraints, among other things. It is to be noted that, "self-resonating frequency," as known to those having skill in the art, generally refers to the resonant frequency of a passive component (e.g., an inductor) due to the parasitic characteristics of the component.

Antenna operating frequencies may comprise relatively high operating frequency ranges, examples of which may include, but are not limited to, 6.78 megahertz (MHz) (e.g., in accordance with the Rezence and/or Airfuel interface standard and/or any other proprietary interface operating at a frequency of 6.78 MHz), 13.56 MHz (e.g., in accordance with the NFC standard, defined by ISO/IEC standard 18092), 27 MHz, and/or an operating frequency of another proprietary operating mode. Such operating frequencies of the antennas may be operating frequencies designated by the International Telecommunications Union (ITU) in the Industrial, Scientific, and Medical (ISM) frequency bands, which may include the aforementioned 6.78 MHz, 13.56 MHz, and 27 MHz frequency bands, which are designated for use in wireless power transfer. In systems wherein a wireless power and data transfer system is operating within the NFC-WLC standards and/or draft standards, the operating frequency may be in a range of about 13.553 MHz to about 13.567 MHz.

While discussed with respect to relatively higher or "high frequency" systems and methods for wireless power transfer, the disclosed technology may be applicable to other wireless power and data transfer systems having other operating frequencies and/or operating frequency ranges. For example, the disclosed technology may be applicable to wireless power and data transfer systems that operate in accordance with a lower frequency standard, such as the Qi standard, and, in accordance with the Qi standard(s), the disclosed technology may be utilized in systems that operate in a frequency range of about 88 kilohertz (kHz) to about 360 kHz.

Further, the operating frequency range for the disclosed wireless power and data transfer systems may have other ranges, such as any range within a range of about 1 kHz to about 1 gigahertz (GHz).

When such systems are operating to wirelessly transfer power from a transmission system to a receiver system via the antennas, it is often desired to simultaneously and/or at a different time communicate electronic data between the systems. In some example systems, wireless-power-related communications (e.g., validation procedures, electronic characteristics data, voltage data, current data, device type data, among other contemplated data communications related to wireless power transfer) are performed using in-band communications.

In-band communications may be communications signals that are encoded in a carrier signal, wherein the carrier signal is generated via NFMI between two or more coupled antennas. In-band communications, as utilized by NFMI systems, are communication signals that are encoded into the induced signal between antennas that are coupled via NFMI. In some examples, in-band communications signals are encoded by modulating a carrier signal (e.g. a wireless power signal or a polling signal) between coupled transmitter and receiver antennas, by a system selectively damping the induced signal. Either the transmitting or receiving system of an NFMI coupled pair may selectively damp the signal, to encode the in-band signals.

In some examples, in-band communication signals in an NFMI system are encoded as amplitude shift keyed (ASK) signals, which, in some examples, may include on-off-keyed (OOK) signals, which are a subset of ASK signals. In an ASK signal, the wireless data signals are encoded by damping the voltage of the magnetic field between a wireless transmission system and a wireless receiver system. Such damping and subsequent re-rising of the voltage in the field is performed based on an underlying encoding scheme for the wireless data signals (e.g., binary coding, Manchester coding, pulse-width modulated coding, among other known or future-developed coding systems and methods). The receiver of the wireless data signals (e.g., a wireless transmission system in this example) can then detect rising and falling edges of the voltage of the induced field and decode said rising and falling edges to demodulate the wireless data signals.

However, it is certainly possible that the connection of devices, via NFMI, may be utilized in transferring data, over the coupled antennas, that is not related to the instant wireless power transfer. Such data transfer may utilize the NFMI connection as a "pass through" or other data connection medium, for transferring data to/from a device operatively associated with the wireless receiver system.

While it may be known to use NFMI connections for data transfer, industry standard implementations are, generally, limited to using a data-only form of NFMI connection (e.g., an NFC card reader, an NFC link between two mobile devices, etc.). While useful, these NFMI connections amount to a need for additional hardware and/or additional software, so they are not commonly implemented in standard consumer or professional device eco-systems (e.g., a user's computer, mobile device/tablet, and peripherals, with various connectivity therebetween). For these reasons, NFMI connections are rarely utilized in standard consumer device eco-systems, for the purpose of data connections between devices existing within said eco-systems.

Further still, even if NFMI connections for data pass-through are capable of facilitating data transfer, due to the low power levels provided by such NFMI connections, the functionality of said connections may be limited (e.g., smaller packet sizes, short sustained connections, reduced feature functionality, etc.), due to the low power. Enhanced functionality that is enabled by higher power levels, for NFMI connections, is desired within device eco-systems.

For properly implementing NFMI communications within such a device eco-system, the technology disclosed herein utilizes NFMI-based wireless power transmission and receiver systems as communication paths between client devices and peripheral devices to be used, in concert, by a user. Further still, the disclosed technology may then utilize the secure and verified connection between the client device and peripheral device to then communicate downstream with other computing systems/devices (e.g., a back-end platform, another client device, another peripheral device, etc.) to enable further functionality based on data associated with a user of the peripheral device or the peripheral device, itself.

To that end, the disclosed technology may enable greater connectivity within a consumer or professional device eco-system, by leveraging NFMI connectivity in devices for both charging (via wireless power transfer) and data connectivity (via communications in-band of the wireless power transfer). Thus, a wireless charger for charging a peripheral device, by utilizing the disclosed technology, may double as a wireless connectivity point, for providing data connection and communications between the peripheral device and a client device. Accordingly, by utilizing synchronization via NFMI systems or sub-systems associated with client devices and peripheral devices, more advanced and secure connectivity may be achieved, while also enhancing the user experience.

For example, consider a consumer device eco-system, wherein a user may use a primary computing device (e.g., a desktop computer, a laptop computer, etc.), a secondary computing device (e.g., a mobile device, a tablet computer, etc.), and one or more peripheral devices connected to one or more of the primary computing device, the secondary computing device, and/or another of the one or more peripheral devices. Consider that one of the peripheral devices is a listening device (e.g., headphones, earphones, over ear headphones, earbuds, etc.), which may be charged via NFMI using a charging stand that includes a wireless transmission system. In such examples, the charging stand may be connected to the primary computing device via some power-and-data-based connection (e.g., via a Universal Serial Bus (USB) connection).

In such examples, utilizing the disclosed technology, when the user sets the listening device proximate to the charging stand, such that a wireless receiver system of the listening device can couple with the wireless transmission system of the charging stand, the charging stand may both provide wireless power to charge the listening device, but may also provide a two-way communications link between the listening device and the primary computing system. Thus, the peripheral device and primary computing device, now, can communicate wirelessly and securely via the NFMI connection therebetween.

This near-instant and secure communication link may provide for enhanced user experience, in a variety of ways. For example, the listening device may have some user settings for the device, that are stored in data storage of the listening device, that have been set by another computing device. Utilizing the disclosed technology, the listening device may then transfer this settings-based data to the primary computing device, via the established NFMI connection, to quickly establish the desired settings for the listening device on the primary computing device. In some examples, the user settings data may not be stored directly on data storage of the listening device but may be stored on data storage of another computing system (e.g., a back-end platform) that can be accessed via a network (e.g., the Internet). In such examples, the listening device may store, on data storage, identifying information that can be used by the primary computing device to request and access the associated user settings data from another computing system that stores the user settings data.

In some other examples, the primary computing device may be connected to other peripheral device(s), other than the listening device, and/or other client devices (e.g., a mobile device, a tablet computer, etc.), via some other wired or wireless means. In such examples, the primary computing device may communicate connectivity data or information associated with such devices to the listening device, such that the listening device may quickly pair or communicate with the other device(s). Such a connection may be verified or presented to a user via some prompt presented via the primary computing device.

Alternatively, consider a scenario in which the device eco-system is a professional device eco-system (e.g., an office, a call center, a coworking space, a worksite, etc.) comprising a plurality of primary computing devices and a plurality of peripheral devices. For the purposes of example, consider that each of the plurality of peripheral devices are a listening device associated with a given user and that each of the plurality of primary computing devices are not associated with a given user and can be used by any user within the professional device ecosystem. In such examples, a user may have his/her/their professional login and/or security credentials stored on the given user's listening device. Such credentials may take the form of data stored on data storage of the listening device and/or may take the form of an address that accesses data stored on another computing system (e.g., a back-end platform).

In such examples, each primary computing device may be associated with a charging stand that includes a wireless transmission system. In such examples, the charging stand may be connected to the primary computing device via some power-and-data-based connection (e.g., via a Universal Serial Bus (USB) connection). Now, by utilizing the disclosed technology, the user may select any of the primary computing devices within the professional device ecosystem, place his/her/their listening device proximate to the charging stand associated with the given primary computing device, and, once the charging stand is connected to the listening device via NFMI, the user's credentials (known by or stored on the listening device) can then be communicated to the primary computing device. Thus, the listening device may be utilized as a "key" to access a primary computing device, in a secured fashion, within a professional device eco-system. Further still, based on the information communicated by the listening device, the primary computing device may then access user information and/or settings associated with the given user of the listening device, via connectivity with another computing system (e.g., a back-end platform connected via the Internet).

Further, the scenarios and/or eco-systems, within which the disclosed technology may be leveraged, may take various other forms, including additional and/or alternative devices.

Referring now to the drawings and with specific reference to FIG. 1, a wireless power and data transfer system 100 is illustrated. The wireless power and data transfer system 100 provides for the wireless transmission of electrical signals, such as, but not limited to, electrical energy, electrical power, electrical power signals, electromagnetic energy, and electronically transmittable data ("electronic data"). As used herein, the term "electrical power signal" refers to an electrical signal transmitted specifically to provide meaningful electrical energy for charging and/or directly powering a load, whereas the term "electronic data signal" refers to an electrical signal that is utilized to convey data across a medium. Further still, "polling signals," as defined herein, refer to electrical power signals having a sufficient power level to induce a current and act as a carrier signal for in-band wireless data signals. Optionally, polling signals may be harvested by components of a device receiving the polling signals. In some examples, polling signals may be harvested by passive electronic devices to provide electrical power for operating the passive electronic device.

The wireless power and data transfer system 100 provides for the wireless transmission of electrical signals via NFMI. As shown in the embodiment of FIG. 1A, the wireless power and data transfer system 100 includes a wireless transmission system 120 and a wireless receiver system 130. The wireless receiver system is configured to receive electrical signals, via a receiver antenna 151, from a transmission antenna 121 of the wireless transmission system 120. In some examples, such as examples wherein the wireless power and data transfer system is configured for wireless power transfer via NFC-WLC draft or accepted standard, the wireless transmission system 120 may be referenced as a "poller" of the a NFC-DC wireless transfer system and the wireless receiver system 150 may be referenced as a "listener" of a NFC-DC wireless transfer system.

As illustrated, the wireless transmission system 120 and wireless receiver system 130 may be configured to transmit electrical signals across, at least, a separation distance or gap 170. A separation distance or gap, such as the gap 170, in the context of a wireless power and data transfer system, such as the wireless power and data transfer system 100, does not include a physical connection, such as a wired connection. There may be intermediary objects located in a separation distance or gap, such as, but not limited to, air, a countertop, a casing for an electronic device, a plastic filament, an insulator, a mechanical wall, among other things; however, there is no physical, electrical connection at such a separation distance or gap.

Thus, the combination of the wireless transmission system 120 and the wireless receiver system 130 creates an electrical connection without the need for a physical connection. As referenced herein, the term "electrical connection" refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless power and/or data transfer, such as, but not limited to, magnetic, electromagnetic, resonant, and/or inductive field, among other wireless power and/or data transfers, connecting a first location, device, component, and/or source to a second location, device, component, and/or destination.

In some cases, the gap 170 may also be referenced as a "Z-Distance," because, if one considers an antenna 121, 151 each to be disposed substantially along respective common X-Y planes, then the distance separating the antennas 121, 151 is the gap in a "Z" or "depth" direction. However, flexible and/or non-planar coils are certainly contemplated by embodiments of the present disclosure and, thus, it is contemplated that the gap 170 may not be uniform, across an envelope of connection distances between the antennas 121, 151. It is contemplated that various tunings, configurations, and/or other parameters may alter the possible maximum distance of the gap 170, such that electrical transmission from the wireless transmission system 120 to the wireless receiver system 130 remains possible.

The wireless power and data transfer system 100 operates when the wireless transmission system 120 and the wireless receiver system 130 are coupled. As used herein, the terms "couples," "coupled," and "coupling" generally refer to magnetic field coupling, which occurs when a transmitter and/or any components thereof and a receiver and/or any components thereof are coupled to each other through a magnetic field. Such coupling may include coupling, represented by a coupling coefficient (k), that is at least sufficient for an induced electrical power signal, from a transmitter, to be harnessed by a receiver. Coupling of the wireless transmission system 120 and the wireless receiver system 130, in the wireless power and data transfer system 100, may be represented by a resonant coupling coefficient of the wireless power and data transfer system 100 and, for the purposes of wireless power transfer, the coupling coefficient for the wireless power and data transfer system 100 may be in the range of about 0.01 to about 0.9.

As illustrated, the wireless transmission system 120 may be associated with host devices 110, which may receive power from or include an input power source 112. The host device 110 may be any electrically operated device, circuit board, electronic assembly, dedicated charging device, or any other contemplated electronic device. Example host devices 110, with which the wireless transmission system 120 may be associated therewith, include, but are not limited to including, a device that includes an integrated circuit, cases for wearable electronic devices, receptacles for electronic devices, a portable computing device, a desktop computer, a laptop computer, a mobile computing device, a client device, wearable charging devices, on-device chargers, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 120 and the host device 110 are operatively associated with an input power source 112. The input power source 112 may be or may include one or more electrical storage devices, such as an electrochemical cell, a battery pack, and/or a capacitor, among other storage devices. Additionally or alternatively, the input power source 112 may be any electrical input source (e.g., any alternating current (AC) or direct current (DC) delivery port) and may include connection apparatus from said electrical input source to the wireless transmission system 120 (e.g., transformers, regulators, conductive conduits, traces, wires, equipment, computer, camera, mobile phone, and/or other electrical device connection ports and/or adaptors, such as but not limited to USB ports and/or adaptors, among other contemplated electrical components).

In an embodiment, the input power source 112 is included as part of a first host device 110A and the wireless transmission system 120 is included as part of a second host device 110B. In such examples, the host device 110B may be utilized as a data connector between the host device 110A and, for example, an electronic device 140 that includes the wireless receiver system 150. To that end, the wireless receiver system 150 may transmit/receive data to/from the wireless transmission system 120 that is intended for receipt—by/transmission—to the host device 110A; accordingly, the wireless transmission system 120 may act, in such scenarios, as a data connector between the host device 110A and the electronic device 140.

In some such examples, the host device 110A (or the input power source 112 associated therewith) may include a bi-directional data connector 113A and the wireless transmission system 120 may also include a bi-directional data connector 113B. The bi-directional data connectors 113 may be any data connector that is capable of transmitting and receiving data between the host device 110 and the wireless transmission system 120. For example, the bi-directional data connectors 113 may be data ports (e.g., USB ports, serial ports, etc.) that facilitate data communications between the host device 110 and the wireless transmission system 120. In some examples, the bi-directional data connector 113 may take the form of a common port for both data transfer between the host device 110 and the wireless transmission system 120 and for power transfer from the host device 110 (from, for example, the input power source 112) to the wireless transmission system 120 (e.g., a USB connection that enables wired power transfer and bi-directional data communications between two devices). Accordingly, the bi-directional data connector(s) 113 may comprise a power and data connector comprising both a power input and a bi-directional data connector. The bi-directional data connector(s) 113 may take various other forms, as well.

Electrical energy received by the wireless transmission system 120 is then used for at least two purposes: to provide electrical power to internal components of the wireless transmission system 120 and to provide electrical power to the transmission antenna 121. The transmission antenna 121 is configured to wirelessly transmit the electrical signals conditioned and modified for wireless transmission by the wireless transmission system 120 via NFMI.

The transmission antenna 121 and the receiver antenna 151 of the present disclosure may be configured to transmit and/or receive electrical power having a magnitude that ranges from about 10 milliwatts (mW) to about 500 watts (W). In one or more embodiments the inductor coil of the transmission antenna 121 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum or the frequency or frequency band where the capacitive reactance has a magnitude substantially similar to the magnitude of the inductive reactance. In one or more embodiments, the transmitting antenna resonant frequency is at a high frequency, as known to those in the art of wireless power transfer.

The wireless receiver system 130 may be associated with an example electronic device 140, wherein the electronic device 140 may be any device that requires electrical power for any function and/or for power storage (e.g., via a battery and/or capacitor). Additionally, the electronic device 140 may be any device capable of receipt of electronically transmissible data. For example, the device may be, but is not limited to being, a handheld computing device, a mobile device, a portable appliance, a computer peripheral, an integrated circuit, an identifiable tag, a headset, earbuds, listening device(s), a kitchen utility device, an electronic tool, an electric vehicle, a game console, a robotic device, a wearable electronic device (e.g., an electronic watch, a fitness tracker, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device, a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless power transfer medium, in the form of power signals that are, ultimately, utilized in wireless power transmission from the wireless transmission system 120 to the wireless receiver system 130. Further, dotted lines are utilized to illustrate electronically transmittable data signals, which ultimately may be wirelessly transmitted from the wireless transmission system 120 to the wireless receiver system 130.

While the systems and methods herein illustrate the transmission of wirelessly transmitted energy, wireless power signals, wirelessly transmitted power, wirelessly transmitted electromagnetic energy, and/or electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 1B:
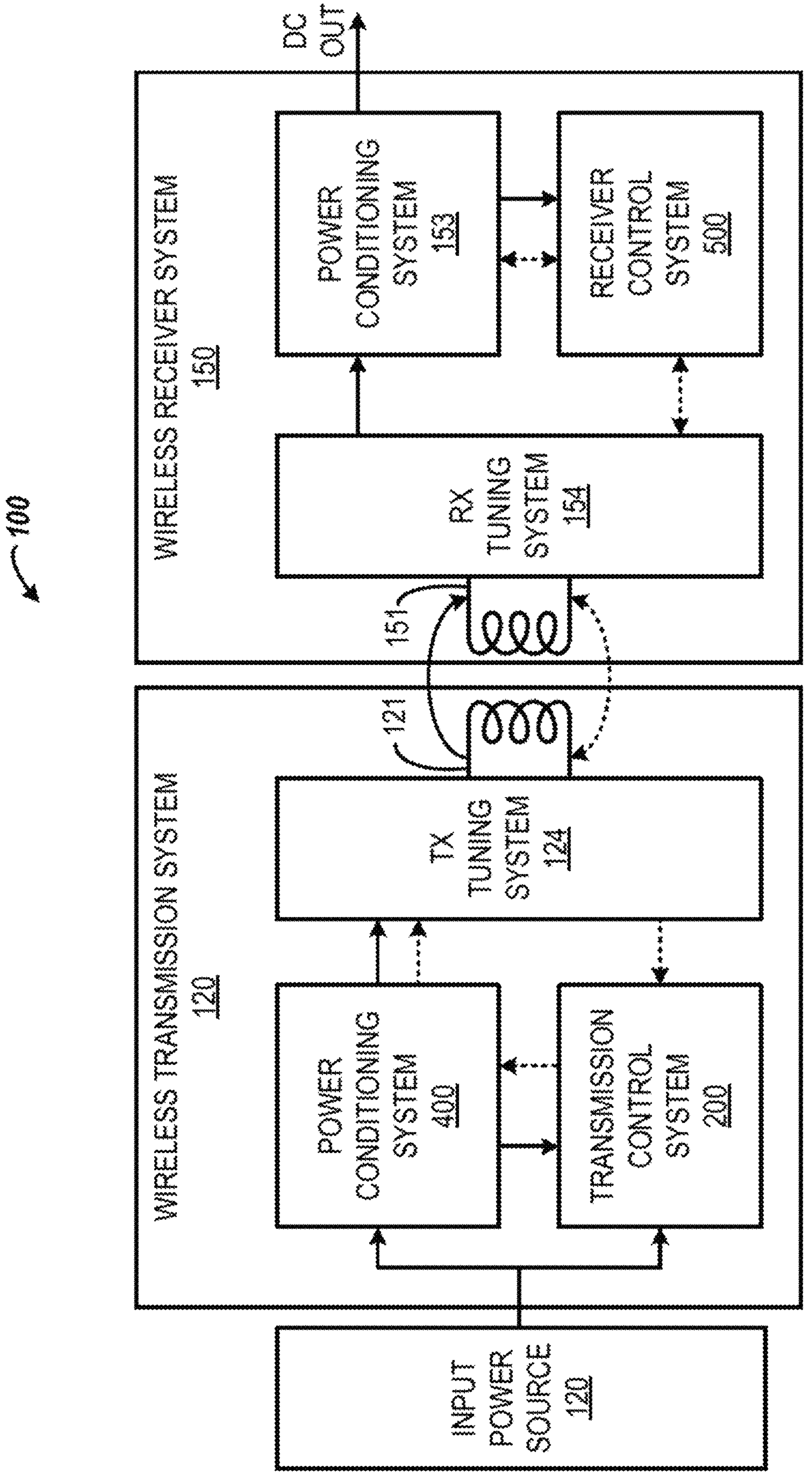
FIG. 1B is another block diagram of an embodiment of the system of FIG. 1A.

Turning now to FIG. 1B, the wireless power and data transfer system 100 is illustrated as a block diagram including example sub-systems of both the wireless transmission system 120 and the wireless receiver system 130. The wireless transmission system 120 may include, at least, a power conditioning system 400, a transmission control system 200, a transmission tuning system 124, and the transmission antenna 121. A first portion of the electrical energy input from the input power source 112 is configured to electrically power components of the wireless transmission system 120 such as, but not limited to, the transmission control system 200. A second portion of the electrical energy input from the input power source 112 is conditioned and/or modified for wireless power transmission, to the wireless receiver system 130, via the transmission antenna 121. Accordingly, the second portion of the input energy is modified and/or conditioned by the power conditioning system 400. While not illustrated, it is certainly contemplated that one or both of the first and second portions of the input electrical energy may be modified, conditioned, altered, and/or otherwise changed prior to receipt by the power conditioning system 400 and/or transmission control system 200, by further contemplated subsystems (e.g., a voltage regulator, a current regulator, switching systems, fault systems, safety regulators, among other things).

Figure 2A:
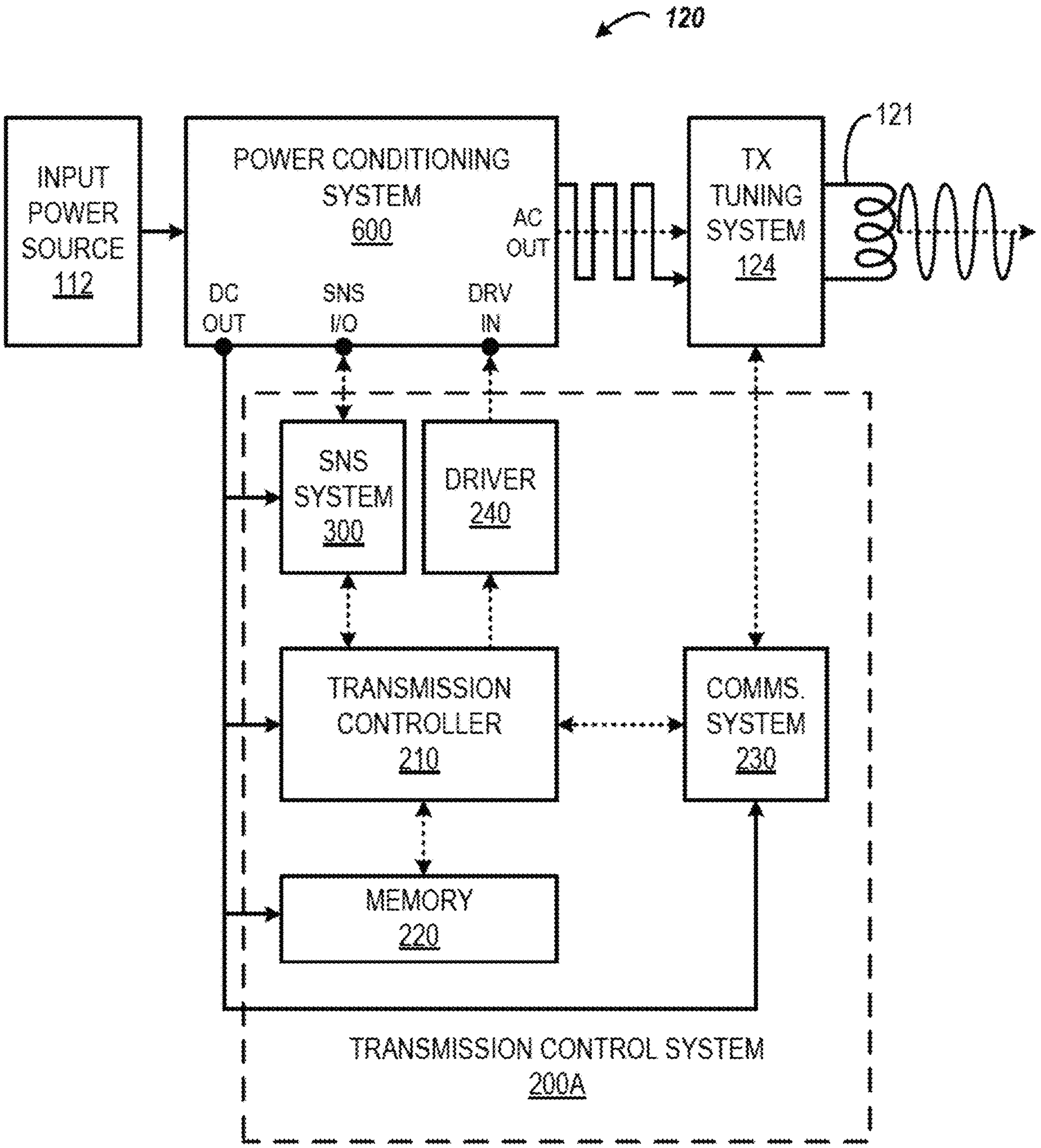
FIG. 2A is a block diagram further illustrating components of a wireless transmission system of the system of FIGS. 1A-B.

Referring now to FIG. 2A, with continued reference to FIGS. 1A and 1B, subcomponents and/or systems of a transmission control system 200A are illustrated. The transmission control system 200A may include a sensing system 300, a transmission controller 210, a communications system 230, a driver 240, and a memory 220.

The transmission controller 210 may be any electronic controller or computing system that includes, at least, a processor which performs operations, executes control algorithms, stores data, retrieves data, gathers data, controls and/or provides communication with other components and/or subsystems associated with the wireless transmission system 120, and/or performs any other computing or controlling task desired. The transmission controller 210 includes at least one processor, at least one machine-readable medium, and program instructions stored on the at least one machine-readable medium which, when executed by the at least one processor, cause the transmission controller 210 to perform any of the functions disclosed herein.

The transmission controller 210 may be a single controller or may include more than one controller disposed to control various functions and/or features of the wireless transmission system 120. Functionality of the transmission controller 210 may be implemented in hardware and/or software and may rely on one or more data maps relating to the operation of the wireless transmission system 120.

To that end, the transmission controller 210 may be operatively associated with the memory 220. The memory may include one or more of internal memory, external memory, and/or remote memory (e.g., a database and/or server operatively connected to the transmission controller 210 via a network, such as, but not limited to, the Internet), each of which may be examples of at least one non-transitory machine-readable medium. The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), graphics double data rate synchronous dynamic RAM (GDDR SDRAM, GDDR2, GDDR3, GDDR4, GDDR5, GDDR6), a flash memory, a portable memory, and the like. Such memory media are examples of non-transitory machine-readable and/or computer-readable memory media.

While particular elements of the transmission control system 200 are illustrated as independent components and/or circuits (e.g., the driver 240, the memory 220, the communications system 230, the sensing system 300, among other contemplated elements) of the transmission control system 200, such components may be integrated with the transmission controller 210. In some examples, the transmission controller 210 may be an integrated circuit configured to include functional elements of one or more of the transmission controller 210 and/or other components of the wireless transmission system 120, generally.

Prior to providing data transmission and receipt details, it should be noted that either of the wireless transmission system 120 and the wireless receiver system 130 may send data to the other within the disclosed principles, regardless of which entity is wirelessly sending or wirelessly receiving power. As illustrated, the transmission controller 210 is in operative association, for the purposes of data transmission, receipt, and/or communication, with, at least, the memory 220, a communications system 230, the power conditioning system 400, the driver 240, and the sensing system 300.

The driver 240 may be implemented to control, at least in part, the operation of the power conditioning system 400. In some examples, the driver 240 may receive instructions from the transmission controller 210 to generate and/or output a generated pulse width modulation (PWM) signal to the power conditioning system 400. In some such examples, the PWM signal may be configured to drive the power conditioning system 600 to output electrical power as an alternating current signal, having an operating frequency defined by the PWM signal. In some examples, PWM signal may be configured to generate a duty cycle for the AC power signal output by the power conditioning system 400. In some such examples, the duty cycle may be configured to be about 50% of a given period of the AC power signal; however, the duty cycle is certainly not limited to being about 50% of a given period of the AC power signal.

The communications system 230 may be any circuit, instructions, and/or functionality that can be utilized in conjunction with the transmission controller 210 to modulate and/or demodulate data signals that are encoded in the wireless power transfer, with the wireless power transfer acting as a carrier signal for the modulated/demodulated signals. For example, the communications system 230 may be configured to modulate the power signal between antennas 121, 151 to encode data signals in-band of the power signals in accordance with the ASK encoding schemes discussed above. Additionally or alternatively, the communications system 230 may include circuits, systems, and/or functionality for demodulating data signals in band of the power signals between the antennas 121, 151. Of course, the communications system 230 may take other forms, for demodulating and/or modulating a power signal in accordance with encoded/decoded signals, as well.

Figure 2B:
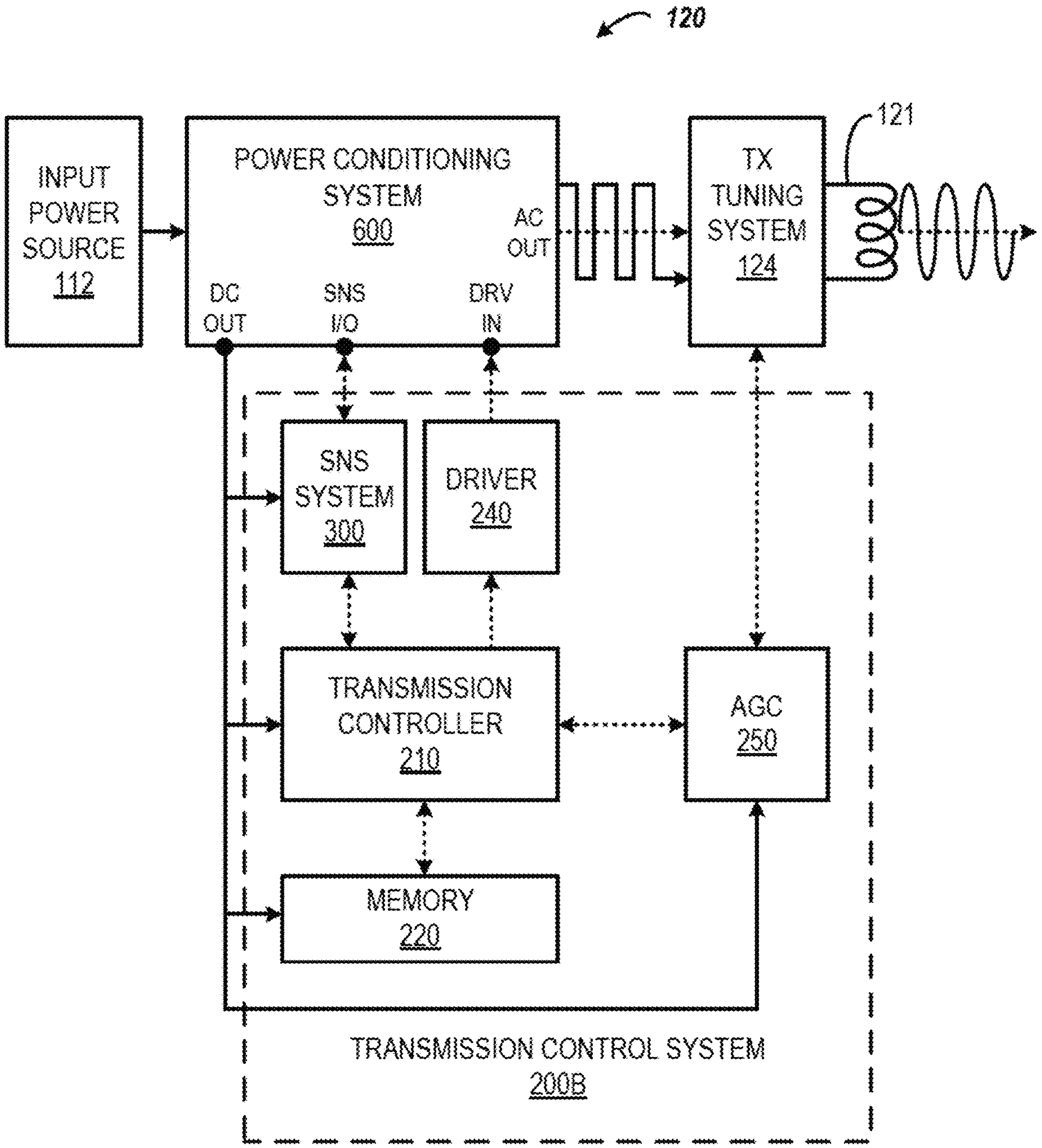
FIG. 2B is another block diagram further illustrating components of the wireless transmission system of the system of FIGS. 1A-B, further illustrating an automatic gain control element.

Turning now to FIG. 2B, another example of a transmission control system 200B for use with the wireless transmission system 120 is illustrated. The transmission control system 200B may include various common components to those of the transmission control system 200B and, accordingly, said components are similarly labelled (e.g., a sensing system 300, a transmission controller 210, a driver 240, and a memory 220, etc.). Further, transmission control system 200B includes an automatic gain control circuit ("AGC") 250.

The AGC 250, at a high level, may receive both an input data signal, at an input data voltage ($V_{DATA\_IN}$), compare $V_{DATA\_IN}$ with a reference voltage for the AGC 250 ($V_{AGC\_REF}$), determine a gain for $V_{DATA\_IN}$ based on the comparison, and apply the gain to $V_{DATA\_IN}$ to generate an amplified input data voltage ($V_{DATA\_IN\_AGC}$). To that end, the AGC 250 may be any circuit, either comprised of discrete components or included as an integrated circuit (IC) or a component of an IC, that performs these functions.

Figure 2C:
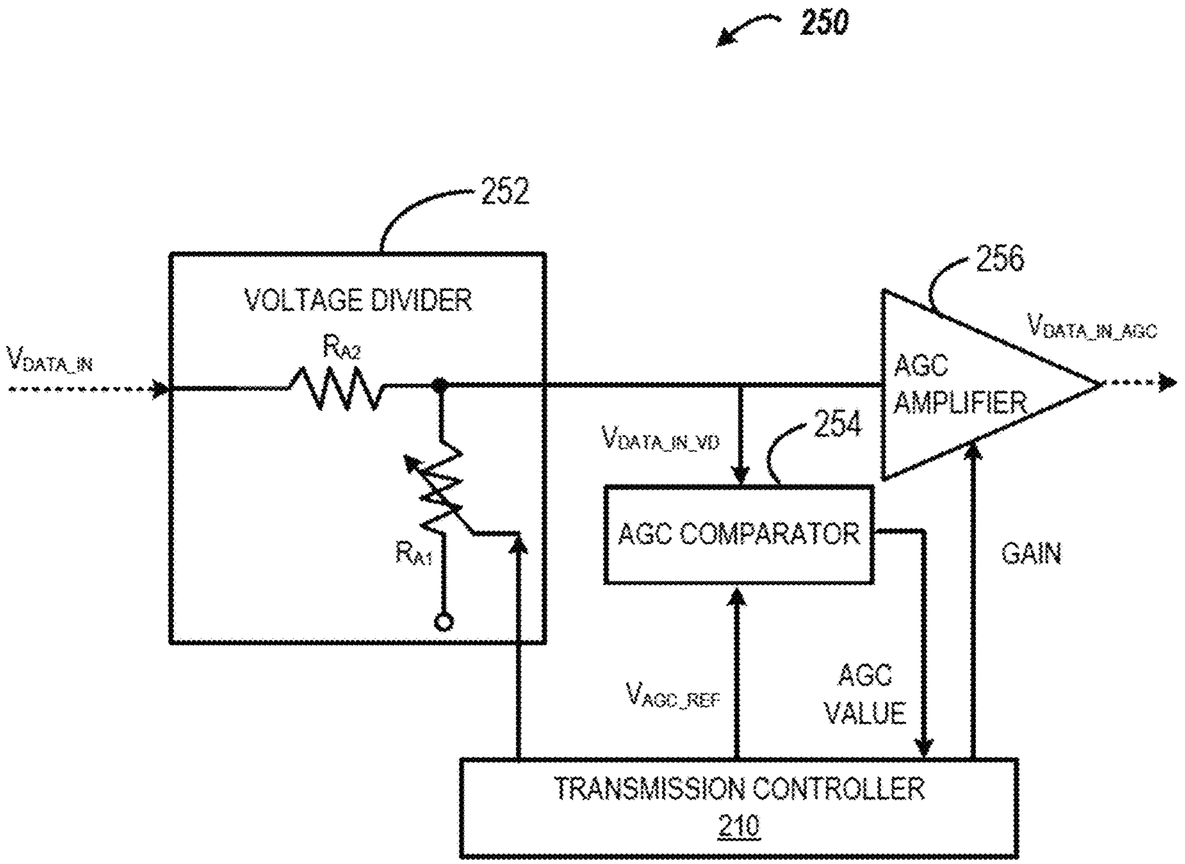
FIG. 2C is a schematic block and component diagram illustrating components of the automatic gain control element of FIG. 2B.

FIG. 2C further illustrates components of an example AGC 250 as a schematic diagram. In some examples, the AGC may include, at least, a voltage divider 252, an AGC comparator 254, and an AGC amplifier 256. Further, the AGC 250 may include one or more other components and/or may take various other forms as well.

The voltage divider 252 may, for example, include a variable resistor $R_{A1}$ and a resistor $R_{A2}$, wherein the value of $R_{A1}$ may be controlled by, for example, the transmission controller 210. The voltage divider 252 may be utilized to allow for proper signal levels to be input to the AGC amplifier 256 by, for example, preventing saturation of the AGC amplifier 256 to ensure the AGC amplifier 256 is operating in a desired operating voltage range. For example, the values of $R_{A1}$ and $R_{A2}$ may be dynamically changed to allow for such proper signal levels to be input to the AGC amplifier 256. Further still, $R_{A1}$ and $R_{A2}$ may be dynamically changed to ensure the output of the AGC amplifier is within a range (e.g., having maximum or minimum voltages) that is based on the sampling needs of another component of the wireless transmission system 120 (e.g., the transmission controller 210 and/or any subcomponents thereof).

$V_{DATA\_IN}$, whether received or bypassing the voltage divider 252, may then be input to the AGC comparator 254. The AGC comparator 254 further receives $V_{AGC\_REF}$ from the transmission controller 210 and, based on a comparison of $V_{AGC\_REF}$ and $V_{DATA\_IN}$, the transmission controller 210 receives and/or otherwise determines an AGC value for the $V_{DATA\_IN}$. Then, based on $V_{DATA\_IN}$, the AGC amplifier 256 may amplify $V_{DATA\_IN}$ to be within an acceptable range for decoding data contained in-band of the wireless power signals.

The AGC value may be a scalar value that is determined based on, for example, a coupling between the systems 120, 150. To that end, the AGC value may be utilized by other components in connection with the transmission controller 210, as will be discussed in more detail below such as, for example, the systems and methods of FIGS. 10A and 10B. For example, the AGC values may be in a scalar range of about 1 to about 500 and have corresponding values associated with coupling values between the systems 120, 150.

Figure 3:
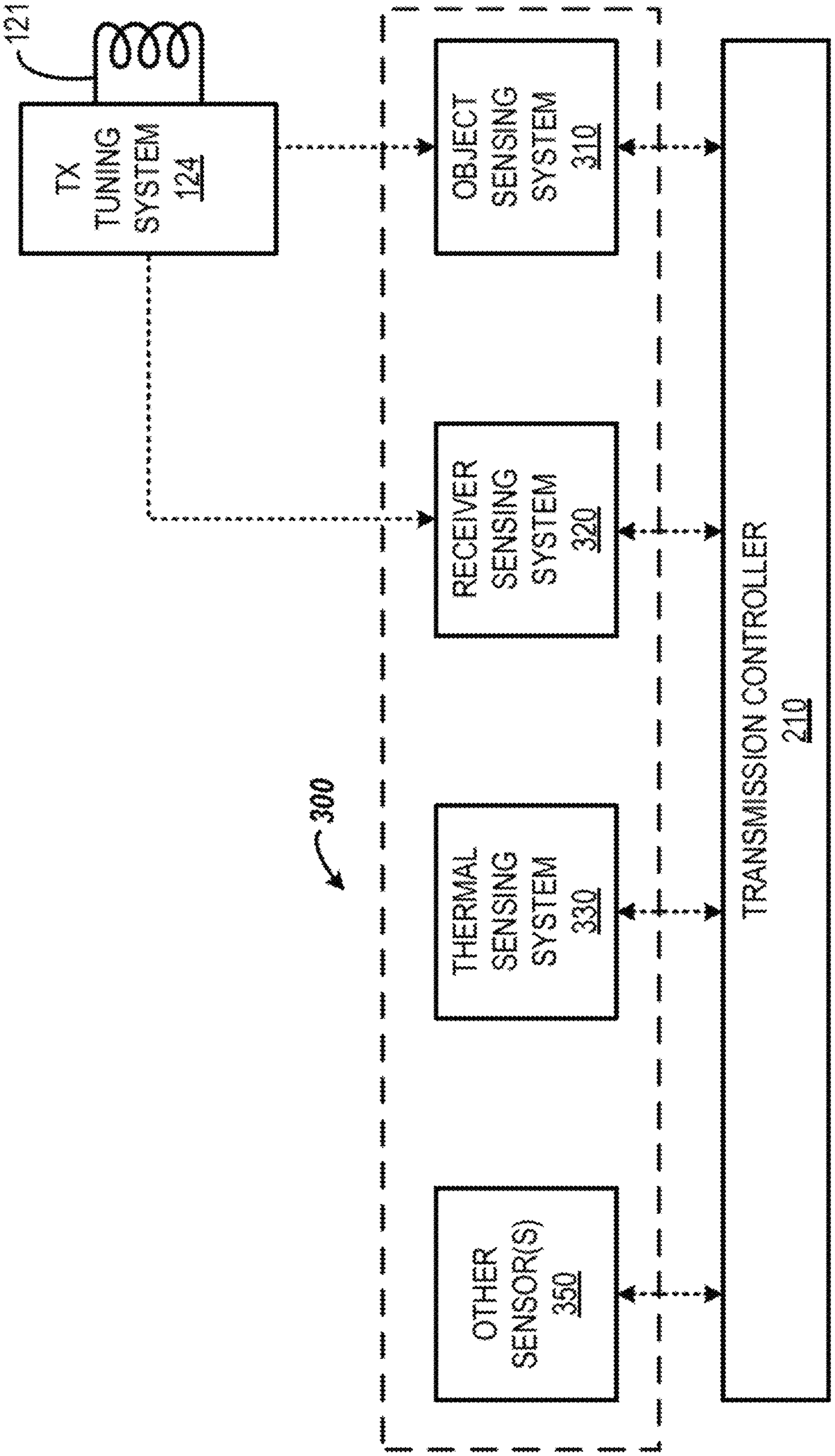
FIG. 3 is a block diagram illustrating components of a sensing system of the wireless transmission system of FIGS. 1-2.

Returning now to both FIGS. 2A and 2B, the sensing system 300 of the wireless transmission system 120 may include one or more sensors, wherein each sensor may be operatively associated with one or more components of the wireless transmission system 120 and configured to provide information and/or data. The term "sensor" is used in its broadest interpretation to define one or more components operatively associated with the wireless transmission system 120 that operate to sense functions, conditions, electrical characteristics, operations, and/or operating characteristics of one or more of the wireless transmission system 120, the wireless receiving system 130, the input power source 112, the host device 110, the transmission antenna 121, the receiver antenna 151, along with any other components and/or subcomponents thereof. Again, while the examples may illustrate a certain configuration, it should be appreciated that either of the wireless transmission system 120 and the wireless receiver system 130 may send data to the other within the disclosed principles, regardless of which entity is wirelessly sending or wirelessly receiving power. As illustrated in the embodiment of FIG. 3, the sensing system 300 may include, but is not limited to including, a thermal sensing system 330, an object sensing system 310, a receiver sensing system 320, a current sensor 340, and/or any other sensor(s) 350. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 310, may be a foreign object detection (FOD) system. The sensing system 300 may include other sensing components, as well.

Each of the thermal sensing system 330, the object sensing system 310, the receiver sensing system 320 and/or the other sensor(s) 350, including the optional additional or alternative systems, are operatively and/or communicatively connected to the transmission controller 210. The thermal sensing system 330 is configured to monitor ambient and/or component temperatures within the wireless transmission system 120 or other elements nearby the wireless transmission system 120. The thermal sensing system 330 may be configured to detect a temperature within the wireless transmission system 120 and, if the detected temperature exceeds a threshold temperature, the transmission controller 210 prevents the wireless transmission system 120 from operating. Such a threshold temperature may be configured for safety considerations, operational considerations, efficiency considerations, and/or any combinations thereof. In a non-limiting example, if, via input from the thermal sensing system 330, the transmission controller 210 determines that the temperature within the wireless transmission system 120 has increased from an acceptable operating temperature to an undesired operating temperature (e.g., in a non-limiting example, the internal temperature increasing from about 20° Celsius (C) to about 50° C., the transmission controller 210 prevents the operation of the wireless transmission system 120 and/or reduces levels of power output from the wireless transmission system 120. In some non-limiting examples, the thermal sensing system 330 may include one or more of a thermocouple, a thermistor, a negative temperature coefficient (NTC) resistor, a resistance temperature detector (RTD), and/or any combinations thereof.

As depicted in FIG. 3, the sensing system 300 may include the object sensing system 310. The object sensing system 310 may be configured to detect one or more of the wireless receiver system 150 and/or the receiver antenna 151, thus indicating to the transmission controller 210 that the wireless receiver system 150 is proximate to the wireless transmission system 120. Additionally or alternatively, the object sensing system 310 may be configured to detect presence of unwanted objects in contact with or proximate to the wireless transmission system 120. In some examples, the object sensing system 310 is configured to detect the presence of an undesired object. In some such examples, if the transmission controller 210, via information provided by the object sensing system 310, detects the presence of an undesired object, then the transmission controller 210 prevents or otherwise modifies operation of the wireless transmission system 120. In some examples, the object sensing system 310 utilizes an impedance change detection scheme, in which the transmission controller 210 analyzes a change in electrical impedance observed by the transmission antenna 121 against a known, acceptable electrical impedance value or range of electrical impedance values.

Additionally or alternatively, the object sensing system 310 may utilize a quality factor (Q) change detection scheme, in which the transmission controller 210 analyzes a change from a known quality factor value or range of quality factor values of the object being detected, such as the receiver antenna 151. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 310 may include one or more of an optical sensor, an electro-optical sensor, a Hall effect sensor, a proximity sensor, and/or any combinations thereof.

The receiver sensing system 320 is any sensor, circuit, and/or combinations thereof configured to detect presence of any wireless receiving system that may be couplable with the wireless transmission system 120. In some examples, the receiver sensing system 320 and the object sensing system 310 may be combined, may share components, and/or may be embodied by one or more common components. In some examples, if the presence of any such wireless receiving system is detected, wireless transmission of electrical energy, electrical power, electromagnetic energy, and/or data by the wireless transmission system 120 to said wireless receiving system is enabled. In some examples, if the presence of a wireless receiver system is not detected, continued wireless transmission of electrical energy, electrical power, electromagnetic energy, and/or data is prevented from occurring.

Accordingly, the receiver sensing system 320 may include one or more sensors and/or may be operatively associated with one or more sensors that are configured to analyze electrical characteristics within an environment of or proximate to the wireless transmission system 120 and, based on the electrical characteristics, determine presence of a wireless receiver system 150.

Figure 4A:
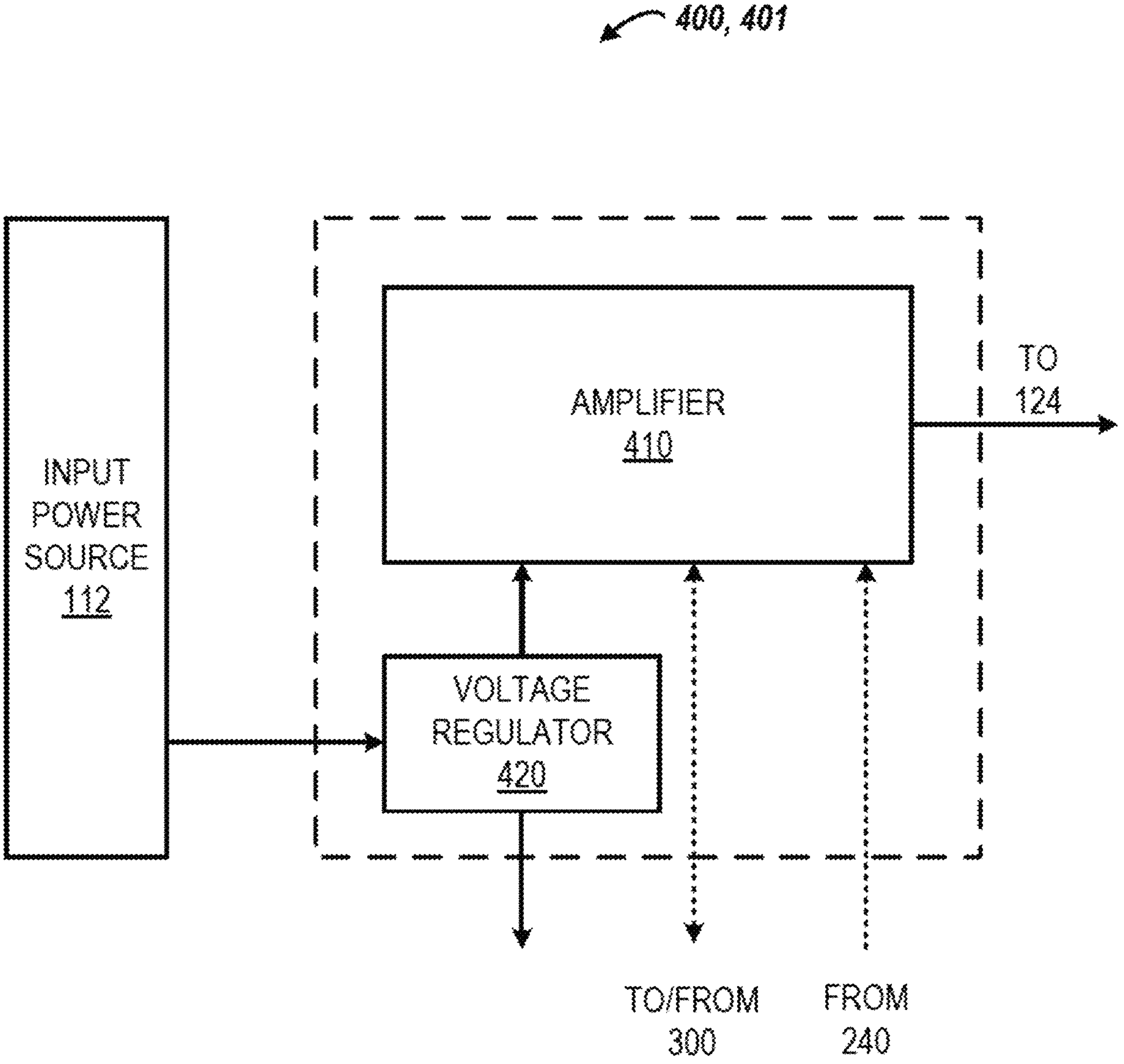
FIG. 4A is a block diagram illustrating components of a power conditioning system of the wireless transmission system of FIGS. 1-2.

Referring now to FIG. 4A, and with continued reference to FIGS. 1-3, a block diagram 401 illustrating an embodiment of a power conditioning system 400 is illustrated. At the power conditioning system 400, electrical power is received, generally, as a DC power source, via the input power source 112 itself or an intervening power converter, converting an AC source to a DC source (not shown). A voltage regulator 420 receives the electrical power from the input power source 112 and is configured to provide electrical power for transmission by the transmission antenna 121 and provide electrical power for powering components of the wireless transmission system 120. Accordingly, the voltage regulator 420 is configured to convert the received electrical power into at least two electrical power signals, each at a proper voltage for operation of the respective downstream components: a first electrical power signal to electrically power any components of the wireless transmission system 120 and a second portion conditioned and modified for wireless transmission to the wireless receiver system 150. As illustrated in FIG. 4A, such a first portion is transmitted to, at least, the sensing system 300, the transmission controller 210 (e.g., via the driver 240), and/or the communications system 230; however, the first portion is not limited to transmission to just these components and can be transmitted to any electrical components of the wireless transmission system 120.

The second portion of the electrical power is provided to an amplifier 410 of the power conditioning system 400, which is configured to condition the electrical power for wireless transmission by the transmission antenna 121. The amplifier 410 may function as an inverter, which receives an input DC power signal from the voltage regulator 420 and generates an AC signal as output, based, at least in part, on PWM input from the transmission controller 210. The amplifier 410 may be or include, for example, a power stage invertor, such as a dual field effect transistor power stage invertor or a quadruple field effect transistor power stage invertor. The use of the amplifier 410 within the power conditioning system 40 and, in turn, the wireless transmission system 120 enables wireless transmission of electrical signals having much greater amplitudes than if transmitted without such an amplifier. For example, the addition of the amplifier 410 may enable the wireless transmission system 120 to transmit electrical energy as an electrical power signal having electrical power from about 10 mW to about 500 W. In some examples, the amplifier 410 may be or may include one or more class-E power amplifiers. Class-E power amplifiers are efficiently tuned switching power amplifiers designed for use at high frequencies (e.g., frequencies from about 1 MHz to about 1 GHZ). Generally, a class-E amplifier employs a single-pole switching element and a tuned reactive network between the switch and an output load (e.g., the transmission antenna 121). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 410 is certainly not limited to being a class-E power amplifier and may be or may include one or more of a class D amplifier, a class EF amplifier, an H invertor amplifier, and/or a push-pull invertor, among other amplifiers that could be included as part of the amplifier 410.

Figure 4B:
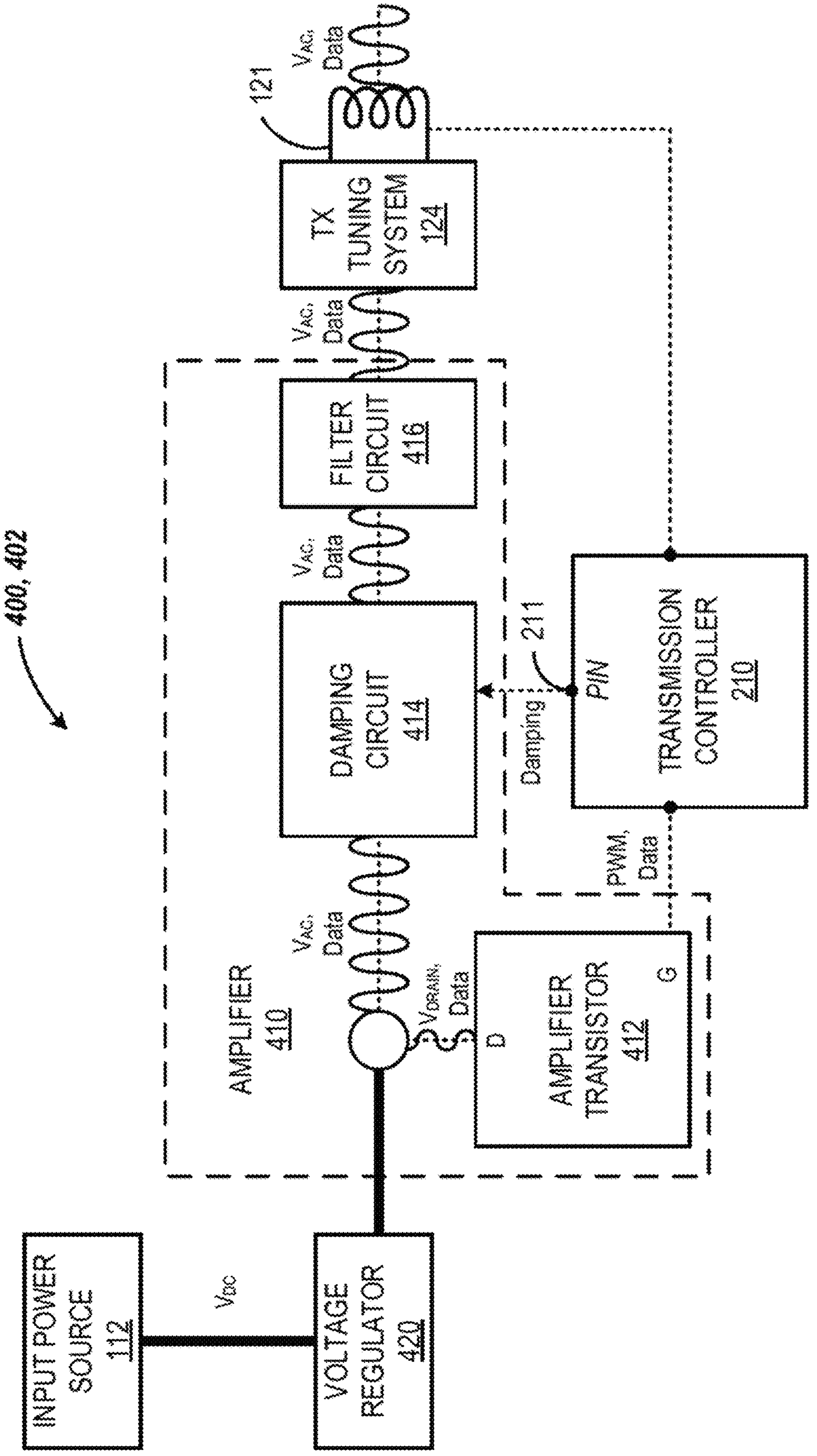
FIG. 4B is a block diagram of elements of the wireless transmission system of FIGS. 1-4A, further illustrating components of an amplifier of the power conditioning system of FIG. 4A and signal characteristics for wireless power transmission.
Figure 4C:
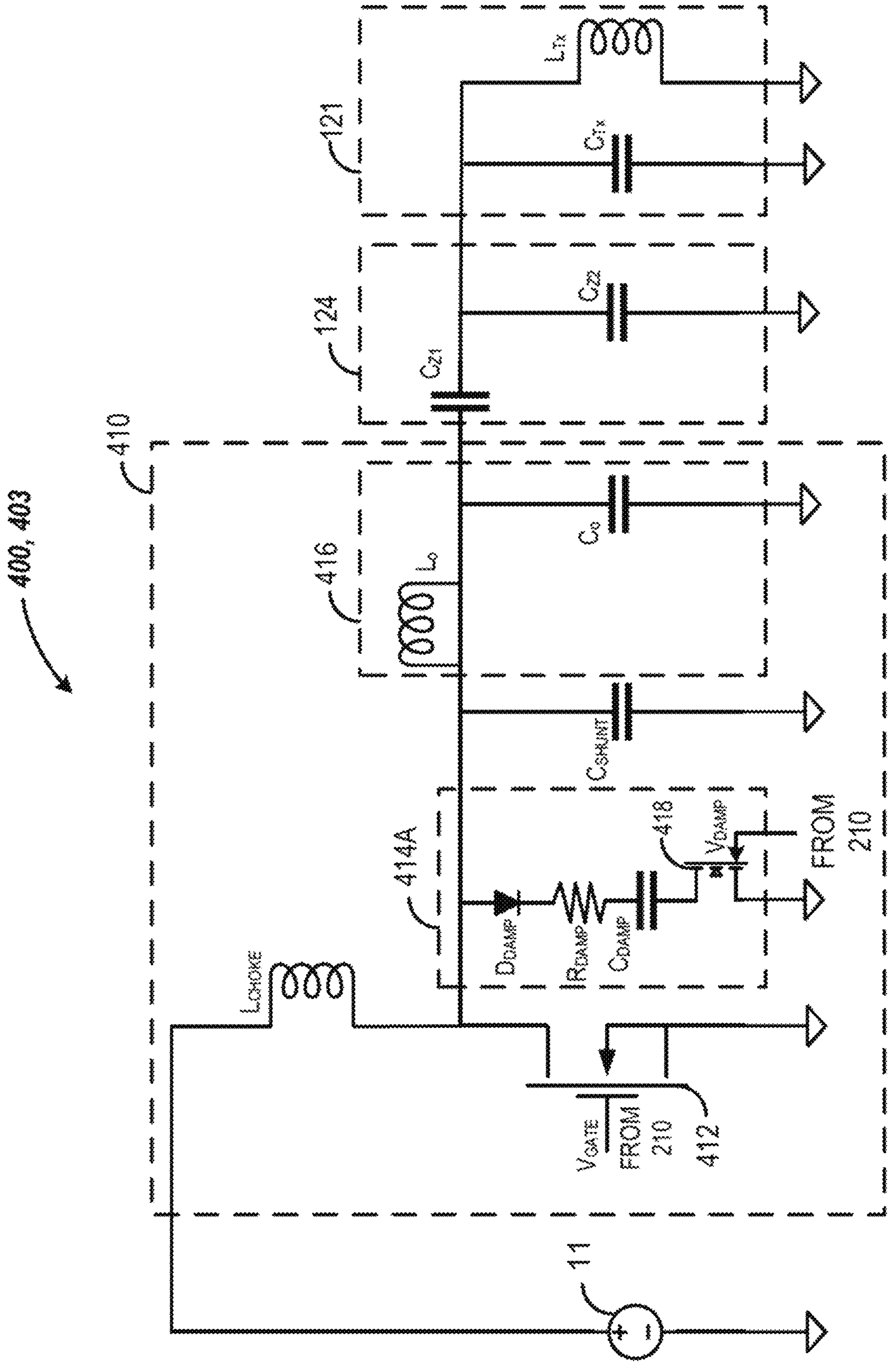
FIG. 4C is an electrical schematic diagram of elements of the wireless transmission system of FIGS. 1-4B, further illustrating components of an amplifier of the power conditioning system, such as a damping circuit.

Turning now to FIGS. 4B and 4C, the wireless transmission system 120 is illustrated, further detailing elements of the power conditioning system 400, the amplifier 410, and the transmission tuning system 124, among other things. The block diagram 402, in FIG. 4B, of the wireless transmission system 120 illustrates one or more electrical signals and the conditioning of such signals, altering of such signals, transforming of such signals, inverting of such signals, amplification of such signals, and combinations thereof. In FIG. 4B, DC power signals are illustrated with heavily bolded lines, such that the lines are significantly thicker than other solid lines in FIG. 4B and other figures of the instant application, AC signals are illustrated as substantially sinusoidal wave forms with a thickness significantly less bolded than that of the DC power signal bolding, and data signals are represented as dotted lines. It is to be noted that the AC signals are not necessarily substantially sinusoidal waves and may be any AC waveform suitable for the purposes described below (e.g., a half sine wave, a square wave, a half square wave, among other waveforms). FIG. 4C illustrates an electrical schematic diagram 403 of example electrical components for elements of the wireless transmission system, and subcomponents thereof, in a simplified form. Note that FIG. 4C may represent one branch or sub-section of a schematic for the wireless transmission system 120 and/or components of the wireless transmission system 120 may be omitted from the schematic illustrated in FIG. 4C for clarity.

As illustrated in FIG. 4B and discussed above, the input power source 112 provides an input direct current voltage ($V_{DC}$), which may have its voltage level altered by the voltage regulator 420, prior to conditioning at the amplifier 410. In some examples, as illustrated in FIG. 4C, the amplifier 410 may include a choke inductor $L_{CHOKE}$, which may be utilized to block radio frequency interference in $V_{DC}$, while allowing the DC power signal of $V_{DC}$ to continue towards an amplifier transistor 412 of the amplifier 410. $V_{CHOKE}$ may be configured as any suitable choke inductor known in the art.

The amplifier 410 is configured to alter and/or invert $V_{DC}$ to generate an AC wireless signal $V_{AC}$, which, as discussed in more detail below, may be configured to carry one or both of an inbound and outbound data signal (denoted as "Data" in FIG. 4B). The amplifier transistor 412 may be any switching transistor known in the art that is capable of inverting, converting, and/or conditioning a DC power signal into an AC power signal, such as, but not limited to, a field-effect transistor (FET), gallium nitride (GaN) FETS, bipolar junction transistor (BJT), and/or wide-bandgap (WBG) semiconductor transistor, among other known switching transistors. The amplifier transistor 412 is configured to receive a driving signal (denoted as "PWM" in FIG. 4B) from at a gate of the amplifier transistor 68 (denoted as "G" in FIG. 4B) and invert the DC signal $V_{DC}$ to generate the AC wireless signal at an operating frequency and/or an operating frequency band for the wireless transmission system 120. The driving signal may be a PWM signal configured for such inversion at the operating frequency and/or operating frequency band for the wireless transmission system 120.

The driving signal is generated and output by the transmission control system 200 and/or the transmission controller 210 therein, as discussed and disclosed above. The transmission controller 210 is configured to provide the driving signal and configured to perform one or more of encoding wireless data signals (denoted as "Data" in FIG. 4B), decoding the wireless data signals (denoted as "Data" in FIG. 4B) and any combinations thereof. In some examples, the electrical data signals may be in band signals of the AC wireless power signal. In some such examples, such in-band signals may be on-off-keying (OOK) signals in-band of the AC wireless power signals. For example, Type-A communications, as described in the NFC Standards, are a form of OOK, wherein the data signal is on-off-keyed in a carrier AC wireless power signal operating at an operating frequency in a range of about 13.553 MHz to about 13.567 MHz.

However, when the power, current, impedance, phase, and/or voltage levels of an AC power signal are changed beyond the levels used in current and/or legacy hardware for high frequency wireless power transfer (over about 500 mW transmitted), such legacy hardware may not be able to properly encode and/or decode in-band data signals with the required fidelity for communications functions. Such higher power in an AC output power signal may cause signal degradation due to increasing rise times for an OOK rise, increasing fall time for an OOK fall, overshooting the required voltage in an OOK rise, and/or undershooting the voltage in an OOK fall, among other potential degradations to the signal due to legacy hardware being ill equipped for higher power, high frequency wireless power transfer. Thus, there is a need for the amplifier 410 to be designed in a way that limits and/or substantially removes rise and fall times, overshoots, undershoots, and/or other signal deficiencies from an in-band data signal during wireless power transfer. This ability to limit and/or substantially remove such deficiencies allows for the systems of the instant application to provide higher power wireless power transfer in high frequency wireless power transmission systems.

To achieve limitation and/or substantial removal of the mentioned deficiencies, the amplifier 410 includes a first damping circuit 414A. The damping circuit 414A is configured for damping the AC wireless signal during transmission of the AC wireless signal and associated data signals. The damping circuit 414A may be configured to reduce rise and fall times during OOK signal transmission, such that the rate of the data signals may not only be compliant and/or legible, but may also achieve faster data rates and/or enhanced data ranges, when compared to legacy systems. For damping the AC wireless power signal, the damping circuit includes, at least, a damping transistor 418, which is configured for receiving a damping signal ($V_{damp}$) from the transmission controller 210. The damping signal is configured for switching the damping transistor (on/off) to control damping of the AC wireless signal during the transmission and/or receipt of wireless data signals. Such transmission of the AC wireless signals may be performed by the transmission controller 210 and/or such transmission may be via transmission from the wireless receiver system 150, within the coupled magnetic field between the antennas 121, 151.

In examples wherein the data signals are conveyed via OOK, the damping signal may be substantially opposite and/or an inverse to the state of the data signals. This means that if the OOK data signals are in an "on" state, the damping signals instruct the damping transistor to turn "off" and thus the signal is not dissipated via the damping circuit 414A because the damping circuit is not set to ground and, thus, a short from the amplifier circuit and the current substantially bypasses the damping circuit 414A. If the OOK data signals are in an "off" state, then the damping signals may be "on" and, thus, the damping transistor 418 is set to an "on" state and the current flowing of $V_{AC}$ is damped by the damping circuit. Thus, when "on," the damping circuit 414A may be configured to dissipate just enough power, current, and/or voltage, such that efficiency in the system is not substantially affected and such dissipation decreases rise and/or fall times in the OOK signal. Further, because the damping signal may instruct the damping transistor 418 to turn "off" when the OOK signal is "on," then it will not unnecessarily damp the signal, thus mitigating any efficiency losses from $V_{AC}$, when damping is not needed. While depicted as utilizing OOK coding, other forms of in band coding may be utilized for coding the data signals, such as, but not limited to, amplitude shift keying (ASK).

As illustrated in FIG. 4B, the branch of the amplifier 410 which may include the damping circuit 414A, is positioned at the output drain of the amplifier transistor 412. While it is not necessary that the damping circuit 414A be positioned here, in some examples, this may aid in properly damping the output AC wireless signal, as it will be able to damp at the node closest to the amplifier transistor 68 output drain, which is the first node in the circuit wherein energy dissipation is desired. In such examples, the damping circuit is in electrical parallel connection with a drain of the amplifier transistor 412. However, it is certainly possible that the damping circuit be connected proximate to the transmission antenna 121, proximate to the transmission tuning system 124, and/or proximate to a filter circuit 416.

While the damping circuit 414A is capable of functioning to properly damp the AC wireless signal for proper communications at higher power high frequency wireless power transmission, in some examples, the damping circuit may include additional components. For instance, as illustrated, the damping circuit 414A may include one or more of a damping diode $D_{DAMP}$, a damping resistor $R_{DAMP}$, a damping capacitor $C_{DAMP}$, and/or any combinations thereof. $R_{DAMP}$ may be in electrical series with the damping transistor 418 and the value of $R_{DAMP}$ (ohms) may be configured such that it dissipates at least some power from the power signal, which may serve to accelerate rise and fall times in an amplitude shift keying signal, an OOK signal, and/or combinations thereof. In some examples, the value of $R_{DAMP}$ is selected, configured, and/or designed such that $R_{DAMP}$ dissipates the minimum amount of power to achieve the fastest rise and/or fall times in an in-band signal allowable and/or satisfy standards limitations for minimum rise and/or fall times; thereby achieving data fidelity at maximum efficiency (less power lost to $R_{DAMP}$) as well as maintaining data fidelity when the system is unloaded and/or under lightest load conditions.

$C_{DAMP}$ may also be in series connection with one or both of the damping transistor 418 and $R_{DAMP}$. $C_{DAMP}$ may be configured to smooth out transition points in an in-band signal and limit overshoot and/or undershoot conditions in such a signal. Further, in some examples, $C_{DAMP}$ may be configured for ensuring the damping performed is 180 degrees out of phase with the AC wireless power signal, when the transistor is activated via the damping signal.

$D_{DAMP}$ may further be included in series with one or more of the damping transistor 418, $R_{DAMP}$, $C_{DAMP}$, and/or any combinations thereof. $D_{DAMP}$ is positioned, as shown, such that a current cannot flow out of the damping circuit 414A, when the damping transistor 418 is in an off state. The inclusion of $D_{DAMP}$ may prevent power efficiency loss in the AC power signal when the damping circuit is not active or "on." Indeed, while the damping transistor 418 is designed such that, in an ideal scenario, it serves to effectively short the damping circuit when in an "off" state, in practical terms, some current may still reach the damping circuit and/or some current may possibly flow in the opposite direction out of the damping circuit 414A. Thus, inclusion of $D_{DAMP}$ may prevent such scenarios and only allow current, power, and/or voltage to be dissipated towards the damping transistor 418. This configuration, including $D_{DAMP}$, may be desirable when the damping circuit 414A is connected at the drain node of the amplifier transistor 68, as the signal may be a half-wave sine wave voltage and, thus, the voltage of $V_{AC}$ is always positive.

Beyond the damping circuit 414A, the amplifier 410, in some examples, may include a shunt capacitor $C_{SHUNT}$. $C_{SHUNT}$ may be configured to shunt the AC power signal to ground and charge voltage of the AC power signal. Thus, $C_{SHUNT}$ may be configured to maintain an efficient and stable waveform for the AC power signal, such that a duty cycle of about 50% is maintained and/or such that the shape of the AC power signal is substantially sinusoidal at positive voltages.

In some examples, the amplifier 410 may include a filter circuit 416. The filter circuit 416 may be designed to mitigate and/or filter out electromagnetic interference (EMI)

within the wireless transmission system 120. Design of the filter circuit 416 may be performed in view of impedance transfer and/or effects on the impedance transfer of the wireless transmission system 120 due to alterations in tuning made by the transmission tuning system 124. To that end, the filter circuit 416 may be or include one or more of a low pass filter, a high pass filter, and/or a band pass filter, among other filter circuits that are configured for, at least, mitigating EMI in a wireless power transmission system.

As illustrated, the filter circuit 416 may include a filter inductor $L_o$ and a filter capacitor $C_o$. The filter circuit 416 may have a complex impedance and, thus, a resistance through the filter circuit 416 may be defined as Ro. In some such examples, the filter circuit 416 may be designed and/or configured for optimization based on, at least, a filter quality factor $\gamma_{FILTER}$, defined as:

$$\gamma_{FILTER} = \frac{1}{R_o}\sqrt{\frac{L_o}{C_o}}.$$

In a filter circuit 416 wherein it includes or is embodied by a low pass filter, the cut-off frequency ($\omega_o$) of the low pass filter is defined as:

$$\omega_o = \frac{1}{\sqrt{L_o C_o}}.$$

In some wireless power transmission systems 20, it is desired that the cutoff frequency be about 1.03-1.4 times greater than the operating frequency of the antenna. Experimental results have determined that, in general, a larger $\gamma_{FILTER}$ may be preferred, because the larger $\gamma_{FILTER}$ can improve voltage gain and improve system voltage ripple and timing. Thus, the above values for $L_o$ and $C_o$ may be set such that $\gamma_{FILTER}$ can be optimized to its highest, ideal level (e.g., when the wireless power and data transfer system 100 impedance is conjugately matched for maximum power transfer), given cutoff frequency restraints and available components for the values of $L_o$ and $C_o$.

As illustrated in FIG. 4B, the conditioned signal(s) from the amplifier 410 is then received by the transmission tuning system 124, prior to transmission by the transmission antenna 121. The transmission tuning system 124 may include tuning and/or impedance matching, filters (e.g. a low pass filter, a high pass filter, a "pi" or "IT" filter, a "T" filter, an "L" filter, a "LL" filter, and/or an L-C trap filter, among other filters), network matching, sensing, and/or conditioning elements configured to optimize wireless transfer of signals from the wireless transmission system 120 to the wireless receiver system 150. Further, the transmission tuning system 124 may include an impedance matching circuit, which is designed to match impedance with a corresponding wireless receiver system 150 for given power, current, and/or voltage requirements for wireless transmission of one or more of electrical energy, electrical power, electromagnetic energy, and electronic data. The illustrated transmission tuning system 124 includes, at least, $C_{Z1}$, $C_{Z2}$, and (operatively associated with the transmission antenna 121) values, all of which may be configured for impedance matching in one or both of the wireless transmission system 120 and the broader system 100. It is noted that $C_{Tx}$ refers to the intrinsic capacitance of the transmission antenna 121.

Figure 4D:
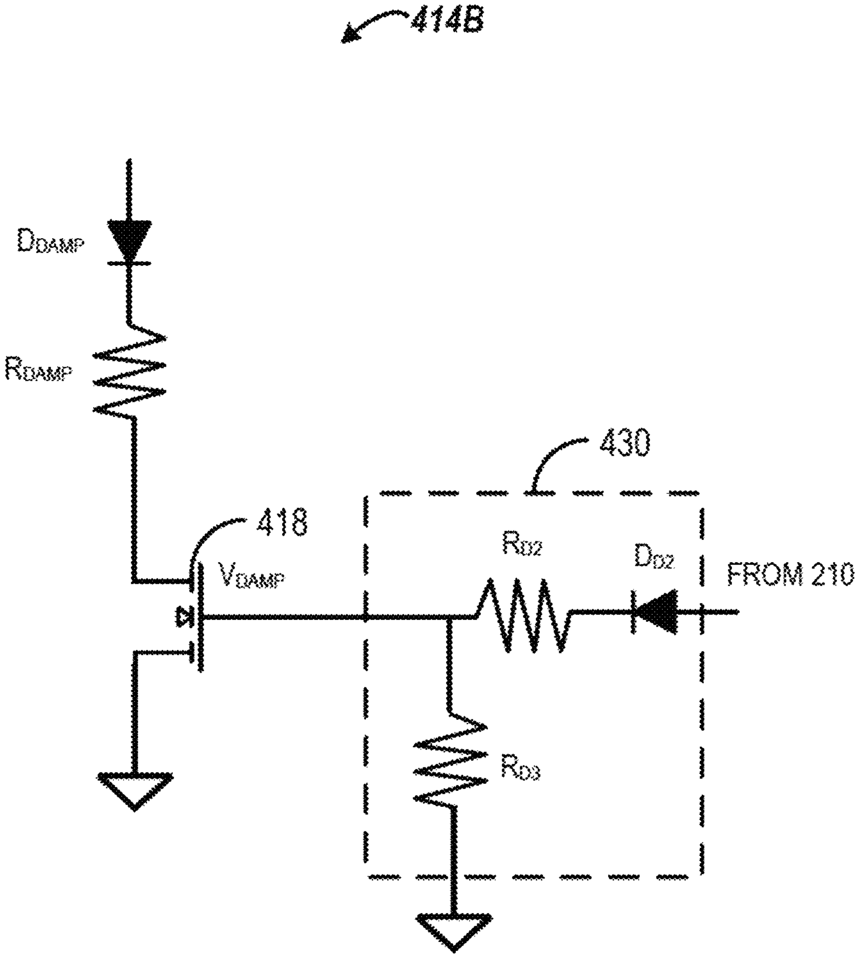
FIG. 4D is an electrical schematic for an example damping circuit for use with the power conditioning system(s) of FIGS. 4A-4C.

Turning now to FIG. 4D, an example of another damping circuit 414B is illustrated as a schematic diagram. The damping circuit 414B may include various common components to those of the damping circuit 414B and, accordingly, said components are similarly labelled (e.g., $D_{DAMP}$, $R_{DAMP}$, the damping transistor 418, etc.). Further, damping circuit 414B includes a delay element 430.

The delay element 430 is configured to slightly ramp down a gate voltage for the damping transistor 418 when the damping signal transitions from a high state to a low state, thus further preventing unwanted undershoots or overshoots caused by OOK or ASK data communications. In some examples, the delay element may comprise second and third damping resistors $R_{D2}$, $R_{D3}$ and a second damping diode $D_{D2}$.

Such a delay may further enhance legibility of the signals that are enhanced via the damping circuit(s) 414, thus mitigating under and overshoots due to ASK or OOK signals in-band of wireless power signals.

Figure 5A:
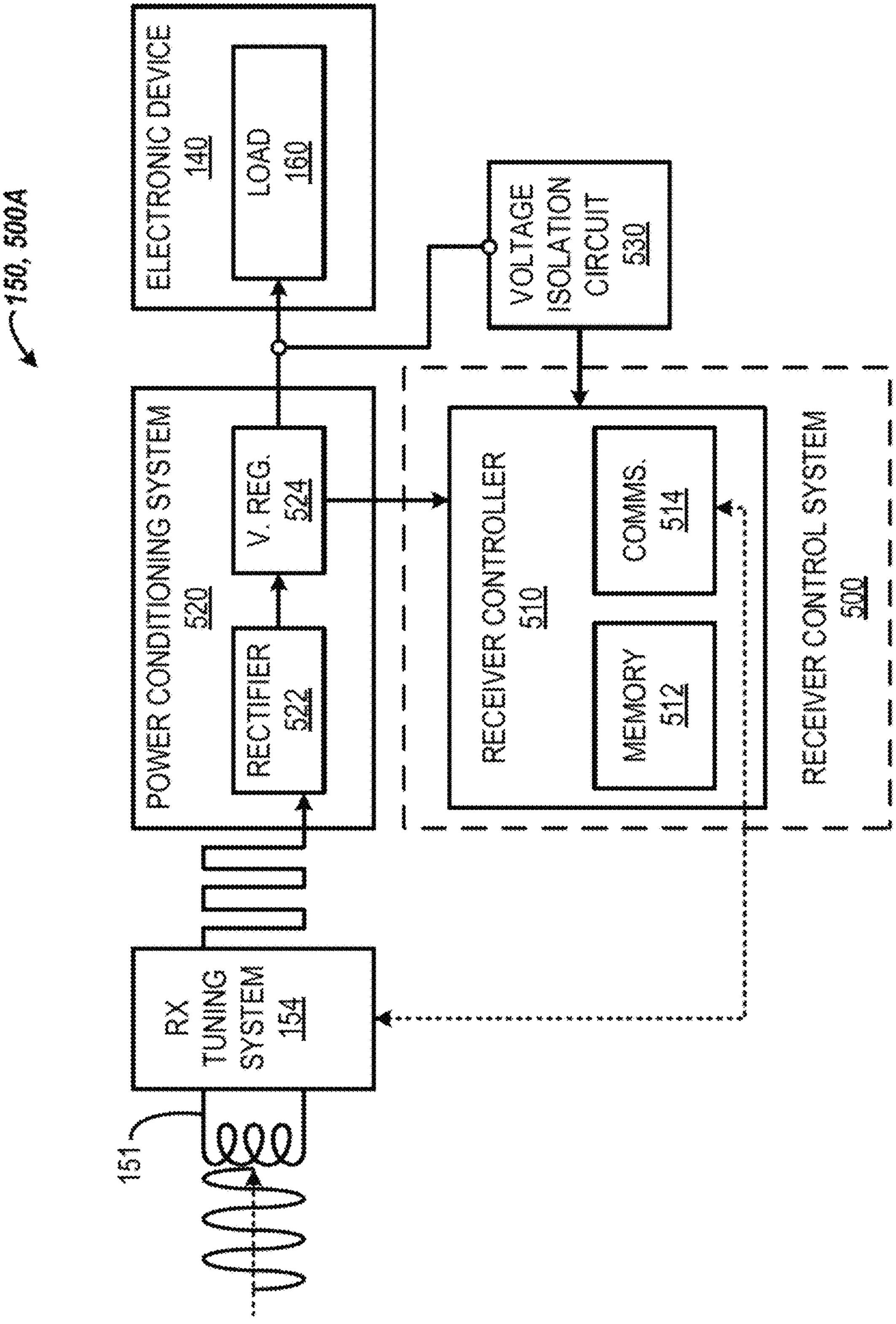
FIG. 5A is a block diagram illustrating components of the wireless receiver system of FIGS. 1A and 1B.

Turning now to FIG. 5A and with continued reference to, at least, FIGS. 1-2, the wireless receiver system 150 is illustrated in further detail in a block diagram 500A. The wireless receiver system 150 is configured to receive, at least, electrical energy, electrical power, electromagnetic energy, and/or electrically transmittable data, via near field magnetic coupling from the wireless transmission system 120, via the transmission antenna 121. As illustrated in FIG. 5A, the wireless receiver system 150 includes, at least, the receiver antenna 151, a receiver tuning system 154, a power conditioning system 520, a receiver control system 500, and a voltage isolation circuit 530. The receiver tuning system 154 may be configured to substantially match the electrical impedance of the wireless transmission system 120. In some examples, the receiver tuning system 154 may be configured to dynamically adjust and substantially match the electrical impedance of the receiver antenna 151 to a characteristic impedance of the power generator or the load at a driving frequency of the transmission antenna 121.

As illustrated, the power conditioning system 520 includes a rectifier 522 and a voltage regulator 524. In some examples, the rectifier 522 is in electrical connection with the receiver tuning system 154. The rectifier 522 is configured to convert the received electrical energy from an alternating current electrical energy signal to a direct current electrical energy signal. In some examples, the rectifier 522 is comprised of at least one diode. Some non-limiting example configurations for the rectifier 522 include, but are not limited to including, a full wave rectifier, a center tapped full wave rectifier, a full wave rectifier with filter, a half wave rectifier, a half wave rectifier with filter, a bridge rectifier, a bridge rectifier with filter, a split supply rectifier, a single phase rectifier, a three phase rectifier, a voltage doubler, a synchronous voltage rectifier, a controlled rectifier, an uncontrolled rectifier, a half controlled rectifier, and the like. As electronic devices may be sensitive to voltage, additional protection of the electronic device may be provided by clipper circuits or devices. In this respect, the rectifier 522 may further include a clipper circuit or a clipper device, which is a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Of course, other example implementations, including additional or alternative components for the rectifier 522, are contemplated, as well.

Some non-limiting examples of a voltage regulator 524 include, but are not limited to, including a series linear voltage regulator, a buck convertor, a low dropout (LDO) regulator, a shunt linear voltage regulator, a step up switching voltage regulator, a step down switching voltage regulator, an invertor voltage regulator, a Zener controlled transistor series voltage regulator, a charge pump regulator, and an emitter follower voltage regulator. The voltage regulator 524 may further include a voltage multiplier, which is as an electronic circuit or device that delivers an output voltage having an amplitude (peak value) that is, for example, two, three, or more times greater than the amplitude (peak value) of the input voltage. The voltage regulator 524 is in electrical connection with the rectifier 522 and configured to adjust the amplitude of the electrical voltage of the wirelessly received electrical energy signal, after conversion to AC by the rectifier 522. In some examples, the voltage regulator 524 may include a LDO linear voltage regulator; however, other voltage regulation circuits and/or systems are contemplated. As illustrated, the direct current electrical energy signal output by the voltage regulator 524 is received at the load 160 of the electronic device 140. In some examples, a portion of the direct current electrical power signal may be utilized to power the receiver control system 500 and any components thereof; however, it is certainly possible that the receiver control system 500, and any components thereof, may be powered and/or receive signals from the load 160 (e.g., when the load 160 is a battery and/or other power source) and/or other components of the electronic device 140.

The receiver control system 500 may include, but is not limited to including, a receiver controller 510, a communications system 514, and a memory 512.

The receiver controller 510 may be any electronic controller or computing system that includes, at least, a processor which performs operations, executes control algorithms, stores data, retrieves data, gathers data, controls and/or provides communication with other components and/or subsystems associated with the wireless receiver system 150. The transmission controller 210 includes at least one processor, at least one machine-readable medium, and program instructions stored on the at least one machine-readable medium which, when executed by the at least one processor, cause the transmission controller 210 to perform any of the functions disclosed herein. The receiver controller 510 may be a single controller or may include more than one controller disposed to control various functions and/or features of the wireless receiver system 150.

Functionality of the receiver controller 510 may be implemented in hardware and/or software and may rely on one or more data maps relating to the operation of the wireless receiver system 150. To that end, the receiver controller 510 may be operatively associated with the memory 512. The memory 512 may include one or both of internal memory, external memory, and/or remote memory (e.g., a database and/or server operatively connected to the receiver controller 510 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of non-transitory computer and/or machine readable memory media.

Further, while particular elements of the receiver control system 500 are illustrated as subcomponents and/or circuits (e.g., the memory 512, the communications system 514, among other contemplated elements) of the receiver control system 500, such components may be external of the receiver controller 510. In some examples, the receiver controller 510 may be and/or include one or more integrated circuits configured to include functional elements of one or both of the receiver controller 510 and the wireless receiver system 150, generally. As used herein, the term "integrated circuits" generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the receiver controller 510 may be a dedicated circuit configured to send and receive data at a given operating frequency. For example, the receiver controller 510 may be a tagging or identifier integrated circuit, such as, but not limited to, an NFC tag and/or labelling integrated circuit. Examples of such NFC tags and/or labelling integrated circuits include the NTAG® family of integrated circuits manufactured by NXP Semiconductors N.V. However, the communications system 39 is certainly not limited to these example components and, in some examples, the communications system 39 may be implemented with another integrated circuit (e.g., integrated with the receiver controller 510), and/or may be another transceiver of or operatively associated with one or both of the electronic device 14 and the wireless receiver system 150, among other contemplated communication systems and/or apparatus. Further, in some examples, functions of the communications system 39 may be integrated with the receiver controller 510, such that the controller modifies the inductive field between the antennas 121, 151 to communicate in the frequency band of wireless power transfer operating frequency.

The communications system 514 may be any circuit, instructions, and/or functionality that can be utilized in conjunction with the receiver controller 510 to modulate and/or demodulate data signals that are encoded in the wireless power transfer, with the wireless power transfer acting as a carrier signal for the modulated/demodulated signals. For example, the communications system 514 may be configured to modulate the power signal between antennas 121, 151 to encode data signals in-band of the power signals in accordance with the aforementioned pulse width encoding schemes discussed above. Additionally or alternatively, the communications system 514 may include circuits, systems, and/or functionality for demodulating data signals in band of the power signals between the antennas 121, 151. Of course, the communications system 514 may take other forms, for demodulating and/or modulating a power signal in accordance with encoded/decoded signals, as well.

Figure 5B:
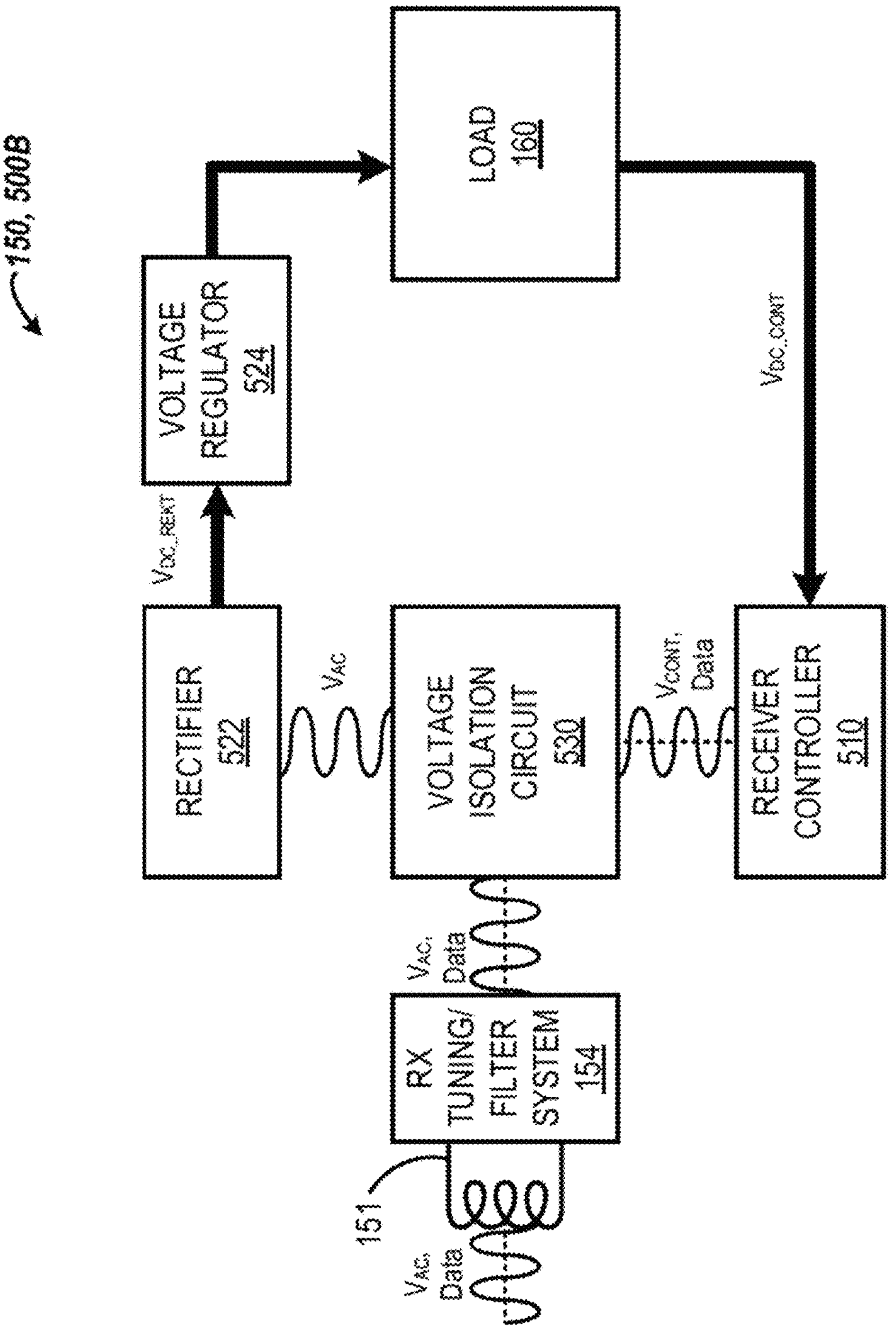
FIG. 5B is another block diagram illustrating components of the wireless receiver system of FIGS. 1A and 1B, further illustrating signal characteristics for wireless power receipt and data receipt and transmission.

Turning now to FIG. 5B, the wireless receiver system 150 is illustrated in further detail to show some example functionality of one or more of the receiver controller 510, the voltage isolation circuit 530, and the rectifier 522. The block diagram of the wireless receiver system 150 illustrates one or more electrical signals and the conditioning of such signals, altering of such signals, transforming of such signals, rectifying of such signals, amplification of such signals, and combinations thereof. Similarly to FIG. 4B, DC power signals are illustrated with heavily bolded lines, such that the lines are significantly thicker than other solid lines in FIG. 5B and other figures of the instant application, AC signals are illustrated as substantially sinusoidal wave forms with a thickness significantly less bolded than that of the DC power signal bolding, and data signals are represented as dotted lines.

As illustrated in FIG. 5B, the receiver antenna 151 receives the AC wireless signal, which includes the AC power signal ($V_{AC}$) and the data signals (denoted as "Data" in FIG. 5B), from the transmission antenna 121 of the wireless transmission system 120. $V_{AC}$ will be received at the rectifier 522 and/or the broader power conditioning system 520, wherein the AC wireless power signal is converted to a DC wireless power signal ($V_{DC\_REKT}$). $V_{DC\_REKT}$ is then provided to, at least, the load 160 that is operatively associated with the wireless receiver system 150. In some examples, $V_{DC\_REKT}$ is regulated by the voltage regulator 524 and provided as a DC input voltage ($V_{DC\_CONT}$) for the receiver controller 510. In some examples, such as the signal path shown in FIG. 5B, the receiver controller 510 may be directly powered by the load 160. In some other examples, the receiver controller 510 need not be powered by the load 160 and/or receipt of $V_{DC\_CONT}$, but the receiver controller 510 may harness, capture, and/or store power from $V_{AC}$, as power receipt occurring in receiving, decoding, and/or otherwise detecting the data signals in-band of $V_{AC}$.

As illustrated in FIGS. 5A, 5B, the receiver controller 510 is configured to perform one or more of encoding the wireless data signals, decoding the wireless data signals, receiving the wireless data signals, transmitting the wireless data signals, and/or any combinations thereof. In examples wherein the data signals are encoded and/or decoded as ASK signals and/or OOK signals, the receiver controller 510 may receive and/or otherwise detect or monitor voltage levels of $V_{AC}$ to detect in-band ASK and/or OOK signals. However, at higher power levels than those currently utilized in standard high frequency, NFMI communications and/or low power wireless power transmission, large voltages and/or large voltage swings at the input of a controller, such as the receiver controller 510, may be too large for legacy microprocessor controllers to handle without disfunction or damage being done to such microcontrollers. Additionally, certain microcontrollers may only be operable at certain operating voltage ranges and, thus, when high frequency wireless power transfer occurs, the voltage swings at the input to such microcontrollers may be out of range or too wide of a range for consistent operation of the microcontroller.

For example, in some high frequency higher power wireless power and data transfer systems 100, when an output power from the wireless transmission system 120 is greater than 1 W, voltage across the receiver controller 510 may be higher than desired for the receiver controller 510. Higher voltage, lower current configurations are often desirable, as such configurations may generate lower thermal losses and/or lower generated heat in the system 100, in comparison to a high current, low voltage transmission. To that end, the load 160 may not be a consistent load, meaning that the resistance and/or impedance at the load 160 may swing drastically during, before, and/or after an instance of wireless power transfer.

This is particularly an issue when the load 160 is a battery or other power storing device, as a fully charged battery has a much higher resistance than a fully depleted battery. For the purposes of this illustrative discussion, we will assume:

$$V_{AC\_MIN} = I_{AC\_MIN} * R_{LOAD\_MIN}, \text{ and}$$

$$P_{AC\_MIN} = I_{AC} * V_{LOAD\_MIN} = (I_{AC\_MIN})^2 * R_{LOAD\_MIN}$$

wherein $R_{LOAD\_MIN}$ is the minimum resistance of the load 160 (e.g., if the load 160 is or includes a battery, when the battery of the load 160 is depleted), $I_{AC\_MIN}$ is the current at $R_{LOAD\_MIN}$, $V_{AC\_MIN}$ is the voltage of $V_{AC}$ when the load 160 is at its minimum resistance and $P_{AC\_MIN}$ is the optimal power level for the load 160 at its minimal resistance. Further, we will assume:

$$V_{AC\_MAX} = I_{AC\_MAX} * R_{LOAD\_MAX}, \text{ and}$$

$$P_{AC\_MAX} = I_{AC\_MAX} * V_{LOAD\_MAX} = (I_{AC\_MAX})^2 * R_{LOAD\_MAX}$$

wherein $R_{LOAD\_MAX}$ is the maximum resistance of the load 160 (e.g., if the load 160 is or includes a battery, when the battery of the load 160 is depleted), $I_{AC\_MAX}$ is the current at $V_{AC}$_MAX, $V_{AC}$_MAX is the voltage of $V_{AC}$ when the load 160 is at its minimum resistance and $P_{AC\_MAX}$ is the optimal power level for the load 160 at its maximal resistance.

Accordingly, as the current is desired to stay relatively low, the inverse relationship between $I_{AC}$ and $V_{AC}$ dictate that the voltage range must naturally shift, in higher ranges, with the change of resistance at the load 160.

However, such voltage shifts may be unacceptable for proper function of the receiver controller 510. To mitigate these issues, the voltage isolation circuit 530 is included to isolate the range of voltages that can be seen at a data input and/or output of the receiver controller 510 to an isolated controller voltage ($V_{CONT}$), which is a scaled version of $V_{AC}$ and, thus, comparably scales any voltage-based in-band data input and/or output at the receiver controller 510. Accordingly, if a range for the AC wireless signal that is an acceptable input range for the receiver controller 510 is represented by $$V_{AC} = [V_{AC\_MIN}: V_{AC\_MAX}]$$

then the voltage isolation circuit 530 is configured to isolate the controller-unacceptable voltage range from the receiver controller 510, by setting an impedance transformation to minimize the voltage swing and provide the controller with a scaled version of $V_{AC}$, which does not substantially alter the data signal at receipt. Such a scaled controller voltage, based on $V_{AC}$, is $V_{CONT}$, where $$V_{CONT} = [V_{CONT\_MIN}: V_{CONT\_MAX}].$$

While an altering load is one possible reason that an unacceptable voltage swing may occur at a data input of a controller, there may be other physical, electrical, and/or mechanical characteristics and/or phenomena that may affect voltage swings in $V_{AC}$, such as, but not limited to, changes in coupling (k) between the antennas 121, 151, detuning of the system(s) 100, 120, 150 due to foreign objects, proximity of another wireless receiver system 150 within a common field area, among other things.

The wireless receiver system 150, utilizing the voltage isolation circuit 530, may have the capability to achieve proper data communications fidelity at greater receipt power levels at the load 160, when compared to other high frequency wireless power transmission systems. To that end, the wireless receiver system 150, with the voltage isolation circuit 530, is capable of receiving power from the wireless transmission system that has an output power at levels over 1 W of power, whereas legacy high frequency systems may be limited to receipt from output levels of only less than 1 W of power. For example, in legacy NFC-DC systems, the listener (receiver system) often utilizes a microprocessor from the NTAG family of microprocessors, which was initially designed for very low power data communications. NTAG microprocessors, without protection or isolation, may not adequately and/or efficiently receive wireless power signals at output levels over 1 W. However, inventors of the present application have found, in experimental results, that when utilizing voltage isolation circuits as disclosed herein, the NTAG chip may be utilized and/or retrofitted for wireless power transfer and wireless communications, either independently or simultaneously.

To that end, the voltage isolation circuits disclosed herein may utilize inexpensive components (e.g., isolation capacitors) to modify functionality of legacy, inexpensive microprocessors (e.g., an NTAG family microprocessor), for new uses and/or improved functionality. Further, while alternative controllers may be used as the receiver controller 510 that may be more capable of receipt at higher voltage levels and/or voltage swings, such controllers may be cost prohibitive, in comparison to legacy controllers. Accordingly, the systems and methods herein allow for use of less costly components, for high power high frequency wireless power transfer.

Further description and examples of such isolation circuits are further disclosed in U.S. Pat. No. 11,469,626 to Peralta, et. al., titled "Wireless Power Receiver for Receiving High Power High Frequency Transfer," which is commonly owned by applicant and incorporated by reference herein in its entirety.

Returning to FIG. 5A, in some example embodiments of the wireless receiver system 150, the wireless receiver system 150 may include functionality as an NFMI polling system, as discussed in more detail above. In such examples, the receiver controller 510 of the wireless receiver system 150 may further include a driver (similar to the driver of the wireless transmission system 120), and a communications system 514 (which may include one or both of a communications demodulator and a communications modulator. While described or illustrated as part of or integrated with the receiver controller 510, it is certainly possible that one or more components and/or functions of such a driver or the communications system 714 may be embodied by or functionally executed by other devices, hardware, or software, such as, but not limited to additional controllers or processors associated with the receiver controller 510, additional discrete components in electrical connection with the receiver controller 510, instructions stored on machine-readable media associated with the receiver controller 510, among other components external to the receiver controller 510.

As illustrated, the communications system 514 may be electrically connected, via a data receipt signal path, to one or more of the receiver tuning system 154, the receiver antenna 151, or combinations thereof, such that the communications system 714 can detect variances in a carrier signal (e.g., a wireless power signal, a polling signal, etc.) and subsequently determine or demodulate said variances to decode signals in-band of the aforementioned carrier signal. The communications system 514 may be electrically connected, via a data transmit signal path, to one or more of the receiver tuning system 154, the receiver antenna 151, or combinations thereof, such that the communications modulator can selectively alter a carrier signal (e.g., a wireless power signal, a polling signal, etc.) and subsequently insert said variances to encode signals in-band of the aforementioned carrier signal.

To that end, while the drawing and description of FIGS. 5A and 5B, above, generally refers to functions of the wireless receiver system 150 and components thereof in a wireless power receiver mode, FIGS. 5A and 5B are exemplary of a system capable of a polling operating mode for the wireless receiver system 150.

Figure 6A:
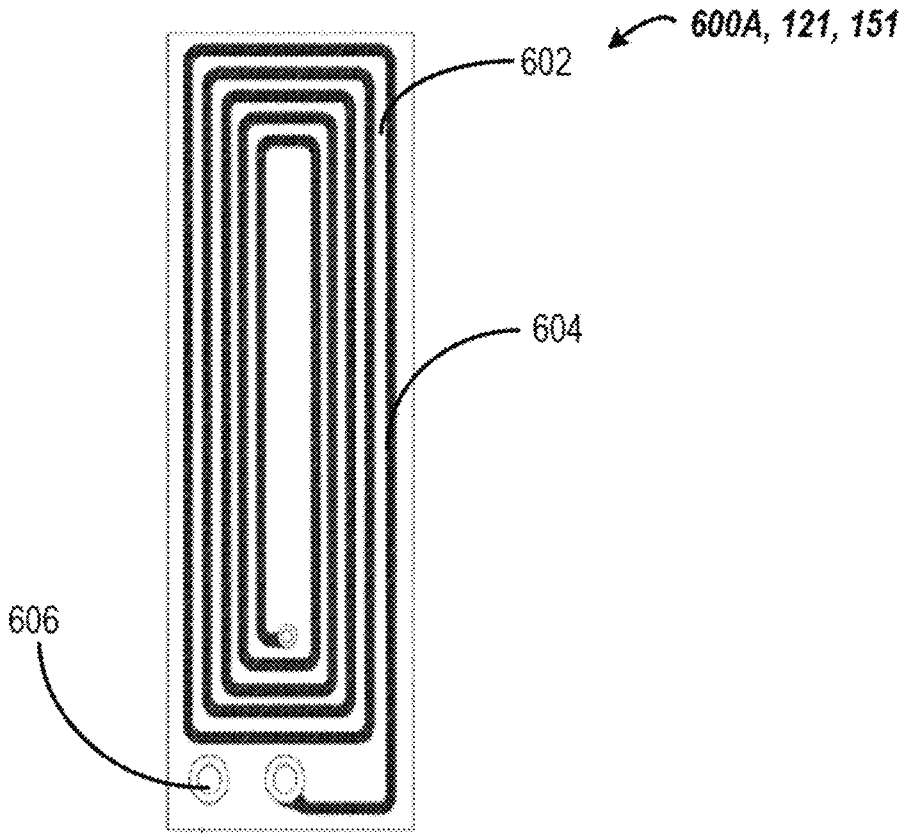
FIG. 6A is a top view of an embodiment of an antenna, for use as one or more of a transmission antenna and/or a receiver antenna of the systems of FIGS. 1-5B.

FIG. 6A illustrates an example, non-limiting embodiment of one or more of a first antenna 600A, which may be utilized as the transmission antenna 121, the receiver antenna 151, or any other antennas or coils discussed herein. The antenna 600A may be used with any of the systems, methods, and/or apparatus disclosed herein. In the illustrated embodiment, the antenna 600A is a flat spiral coil configuration.

The antenna 600A may be a printed circuit board (PCB) or flexible printed circuit board (FPC) antenna, having a plurality of turns 604 of a conductor and one or more connectors 06, all disposed on a substrate 602 of the antenna 600A. While the antenna 600A is illustrated, in FIG. 6A, having a certain number of turns and/or layers, the PCB or FPC antenna may include any number of turns or layers. The PCB or FPC antenna 600A of FIG. 6A may be produced via any known method of manufacturing PCB or FPCs known to those skilled in the art.

Figure 6B:
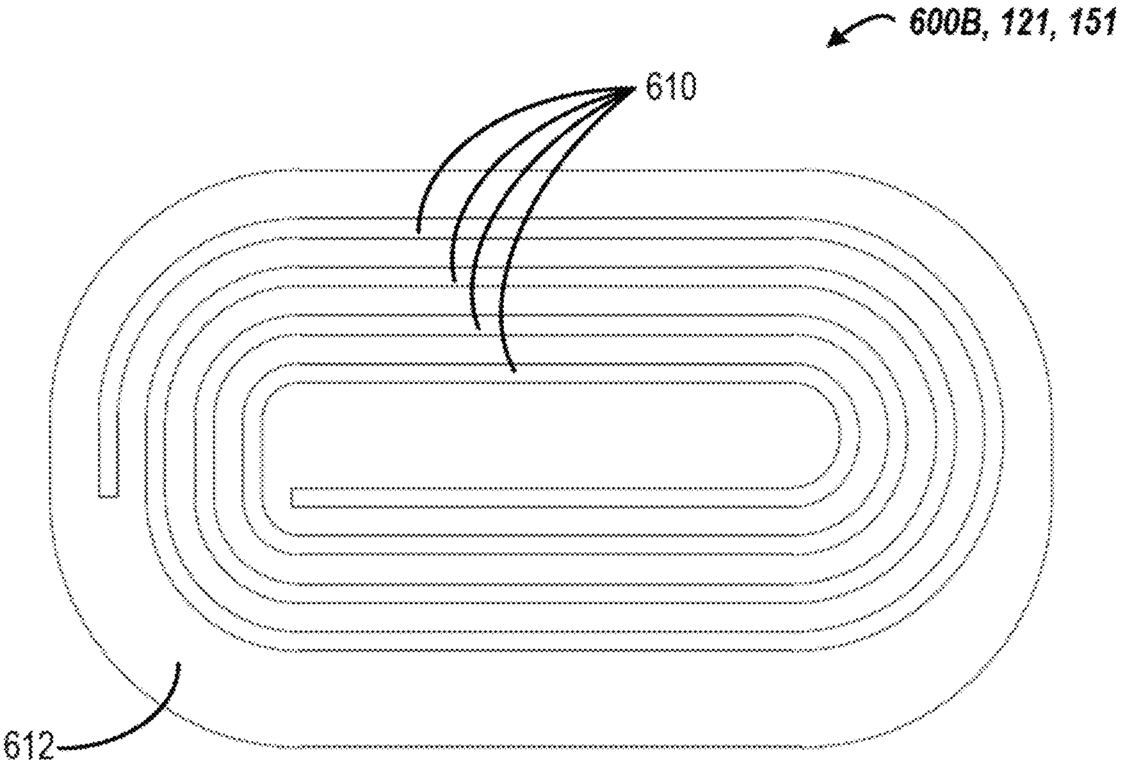
FIG. 6B is a top view of another embodiment of an antenna, for use as one or more of a transmission antenna and/or a receiver antenna of the systems of FIGS. 1-6A.

In another embodiment of an antenna 600B, illustrated in FIG. 6B, which may be utilized as the antenna 121, the antenna 151, or any other antenna disclosed herein, may be a wire wound antenna, wherein the antenna is a conductive wire wound in a particular pattern and having any number of turns 610. The wire wound antenna 600B may be free standing within an associated structure or, in some examples, the wire wound antenna 600B may be either held in place or positioned using a wire holder 612.

Of course, other examples for implementation of the transmission antenna 121 and/or the receiver antenna 151 are contemplated, as well.

Figure 7A:
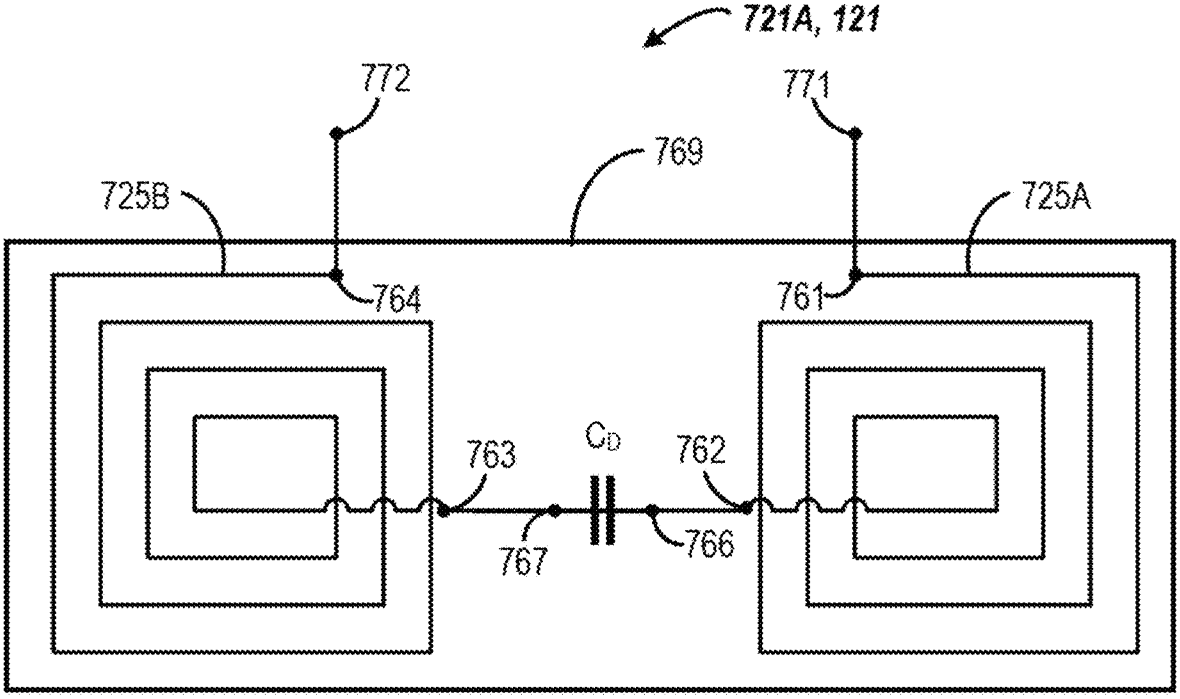
FIG. 7A is a top view of a multi-zone wireless power transmission antenna, for use as the wireless transmission antenna in the system(s) of FIGS. 1-6B.
Figure 7B:
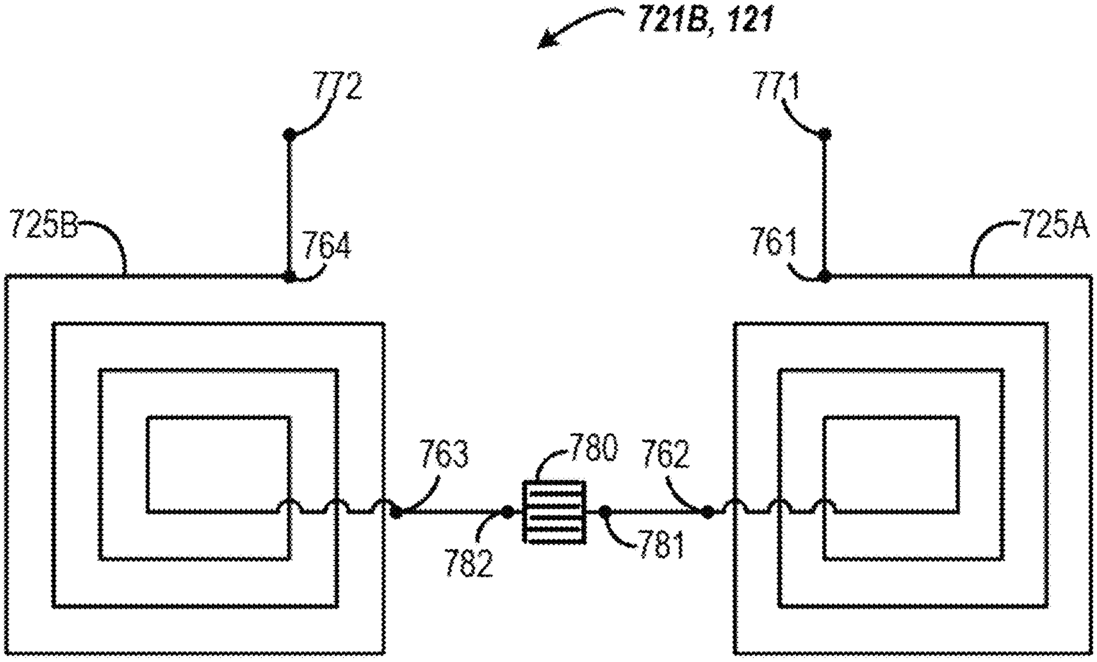
FIG. 7B is another top view of a multi-zone wireless power transmission antenna, for use as the wireless transmission antenna in the system(s) of FIGS. 1-6B.

Turning now to FIGS. 7A and 7B, example implementations of respective multi-zone antennas 721A, 721B for use as the transmission antenna 121 are illustrated.

As illustrated in FIGS. 7A and 7B and, similarly, in the later illustrated embodiments of the wireless transmission system 120, the first antenna portion 725A, which has a first pole 761 and a second pole 762. The multi-zone antenna 721A includes a second antenna portion 725B which includes a third pole 763 and a fourth pole 764. The first and second antenna portions 725A, 725B connect to the amplifier 410 via a first power pole 771 and a second power pole 772. As illustrated, to achieve the series antenna-to-amplifier connection, the first pole 761 of the first antenna portion 725A is in electrical connection with the first power pole 771, the fourth pole of the second antenna portion 725B is in electrical connection with the second power pole 772, and the second pole 762 of the first antenna portion 725A is in electrical connection with the third pole 763 of the second antenna portion 725B, thereby establishing the series connection between the antenna portions 725A, 725B, with respect to the amplifier 410.

FIGS. 7A and 7B illustrate embodiments of the wireless transmission system 120, wherein a distributed capacitor Cp is included, in series connection between the first antenna portion 725A and the second antenna portion 725B. In such examples, the Cp includes a first capacitor pole 766 and a second capacitor pole 767. As illustrated, to achieve the series antenna-to-amplifier connection, with Cp disposed therebetween, the first pole 761 of the first antenna portion 725A is in electrical connection with the first power pole 771, the fourth pole 764 of the second antenna portion 725B is in electrical connection with the second power pole 772, the second pole 762 is in electrical connection with the first capacitor pole 766, and the third pole 763 is in electrical connection with the second capacitor pole 767.

By disposing $C_D$ in series connection between the first and second antenna portions 725A, 725B, transient current spikes and large changes in phase may be mitigated. Such transient current spikes and changes in phase may cause current sensitivity issues, difficulties in manufacturing, and/or coil-to-coil efficiency degradation between multiple antenna portions 725A, 725B. Thus, mitigation via inclusion of $C_D$ may be advantageous for improvements in coil sensitivity, mass-manufacturability, and coil-to-coil efficiency. To that end, experimental results have indicated that inclusion of $C_D$ causes an increase in coil-to-coil efficiency of about six percent and an impedance shift, due to metal, decreased by about 52 percent. Such increases in efficiency and decreases in impedance shift may be particularly advantageous in transmission antenna 121 designs wherein a, relatively, small transmission antenna 121 has expanded requirements for coupling Z-distance.

Additionally, inclusion of $C_D$, in series connection between the first and second antenna portions 125A, 125B, aids in isolating communications for each antenna portion 725A, 725B, by limiting interference. For example, if two antenna portions 725A, 725B are coupled with two wireless receiver systems $C_D$ may prevent interference in communications signals that are transmitted by the wireless receiver systems, via communications within the frequency band of the operating frequency of one or both of the antenna portions 725.

Referring specifically to FIG. 7A, a first multi-zone antenna 721A illustrates $C_D$ as implemented as a component on a printed circuit board (PCB) 769, upon which one or both of the first and second antenna portions 725A, 725B are disposed. By utilizing the PCB 769 having $C_D$ thereon, case in bill of materials may be improved. Further, in such examples, both of the first and second antenna portions 725A, 725B may be printed on the same substrate of the PCB 769 and the receiver first and second antenna portions 725A, 725B may be, therefore, internally connected to each other through $C_D$, wherein, in such examples, $C_D$ is a surface mount capacitor on the PCB 769. In comparison to other designs, this configuration may reduce antenna complexity by reducing the number of connections to the amplifier 410, which simplifies the manufacture of the antenna portions 725A, 725B. Accordingly, in such examples, the antenna portions 725A, 725B and $C_D$ are all functionally coupled with the PCB 769.

Referring again to the PCB 769, it will be understood to those skilled in the art that PCB 769 may be a single layer or multi-layer. A multi-layer PCB may further comprise surface and embedded circuit traces, and may also include through-hole, surface mount and/or embedded components and or component circuits. Typical PCB substrate materials may include fiberglass, FR4, a ceramic, among others. In some examples the PCB 769 may further be or include a flexible printed circuit board (FPCB).

Referring specifically to FIG. 7B, a second multi-zone antenna 721B illustrates $C_D$ as implemented as an interdigitated capacitor 780 in electrical connection with the first antenna portion 725A and the second antenna portion 725B. The interdigitated capacitor 780 includes, at least, a first capacitor pole 781 and a second capacitor pole 782. As illustrated, the first pole 761 of the first antenna portion 725A is in electrical connection with the first power pole 771, the fourth pole 764 of the second antenna portion 725B is in electrical connection with the second power pole 772, the second pole of the first antenna portion 725A is in electrical connection with the first capacitor pole 781 of the interdigitated capacitor 780, and the third pole 763 of the second antenna portion 725B is in electrical connection with the second capacitor pole 782 of the interdigitated capacitor 780.

The interdigitated capacitor 780 may be included to impart a desired capacitance to one or both of the transmission first and second antenna portions 725A, 725B. The interdigitated capacitor 780 may utilize a parallel plate configuration that can provide a robust, thin design that is, generally, manufacturable at a lower cost, when compared to similar capacitor components. The interdigitated capacitor 780 has a finger-like shape, wherein the interdigitated capacitor 780 includes a plurality of micro-strip lines that may produce one or more of high pass characteristics, low pass characteristics, and/or bandpass characteristics. The value of the capacitance of the interdigitated capacitor 780 generally depends on various construction parameters, such as, but not limited to, a length of the micro-strip lines, a width of the micro-strip line, a horizontal gap between two adjacent micro-strip lines, and a vertical cap between two adjacent micro strip lines. In one or more embodiments, the length and the width of the micro-strip lines can be from about 10 mm to 600 mm, the horizontal gap can be between about 0.1 mm to about 100 mm, and the vertical gap can be between about 0.0001 mm to about 2 mm.

In some examples, the interdigitated capacitor 780 may be integrated within a substrate associated with one or both of the transmission first and second antenna portions 725A, 725B, such as a PCB. Further, in some examples, the interdigitated capacitor 780 may be positioned within an opening or cavity within a substrate that supports one or both of the transmission first and second antenna portions 725A, 725B. The interdigitated capacitor 980 may be used similarly to $C_D$, for improvements in coil sensitivity, mass-manufacturability, and coil-to-coil efficiency. Additionally or alternatively, the interdigitated capacitor 980 may be utilized as a cost-effective means to add capacitance to one or both of the transmission first and second antenna portions 725A, 725B. Further, the interdigitated capacitor 780 may be more mechanically durable, have a thinner form factor, and a lower cost, in comparison to a surface mount capacitor.

Further description and examples of such multi-zone type antennas are further disclosed in U.S. Pat. No. 11,101,848 to Peralta, et. al., and entitled "Wireless Power Transmission System Utilizing Multiple Transmission Antennas with Common Electronics," which is commonly owned by applicant and incorporated by reference herein in its entirety.

As discussed above, communications may occur between the wireless transmission and receiver systems 120, 150 in a manner that is meant to simulate communications that otherwise would occur over a two-way wired communication components. The communications between such two-way wired data communication components may include, but are not limited to including, data communications and/or connections compliant with a serial and/or universal asynchronous receiver-transmitter (UART) based protocol.

To that end, data communications between the wireless transmission and receiver systems 120, 150 may be compliant with a serial and/or universal asynchronous receiver-transmitter (UART) based protocol. However, such two-way wired data communications, and/or any simulations thereof, are certainly not limited to UART based protocol data communications and/or connections and may take various other forms.

UART, in wired systems, provides a wired serial connection that utilizes serial data communications over a wired (human-tangible, physical electrical) connection between UART transceivers, which may take the form of a two-wire connection. UART transceivers transmit data over the wired connection asynchronously, i.e., with no synchronizing clock. A transmitting UART transceiver packetizes the data to be sent and adds start and stop bits to the data packet, defining, respectively, the beginning and end of the data packet for the receiving UART transceiver. In turn, upon detecting a start bit, the receiving UART transceiver reads the incoming bits at a common frequency, such as an agreed baud rate. This agreed baud rate is what allows UART communications to succeed in the absence of a synchronizing clock signal.

A first UART transceiver may transmit a multi-bit data sequence to a second UART transceiver, via UART communication, and likewise, the second UART transceiver may transmit a multi-bit data element to the first UART transceiver. For instance, a UART-encoded signal representing a multi-bit data element may be transmitted over a two-wire connection between the first UART transceiver and the second UART transceiver. A first wire of the two-wire connection may be used for communication in one direction while a second wire of the two-wire connection may be used for communication in the other direction.

While wired, two-wire, simultaneous two-way communications are a regular means of communication between two devices, it is desired to eliminate the need for such wired connections, while simulating and/or substantially replicating the data transmissions that are achieved today via wired two-way communications, such as, but not limited to serial wired communications that are compliant with UART and/or other data transmission protocols. To that end, FIGS. 8A-9B illustrate systems, methods, and/or protocol components utilized to carry out such serial two-way communications wirelessly via the wireless power and data transfer system 100.

Figure 8A:
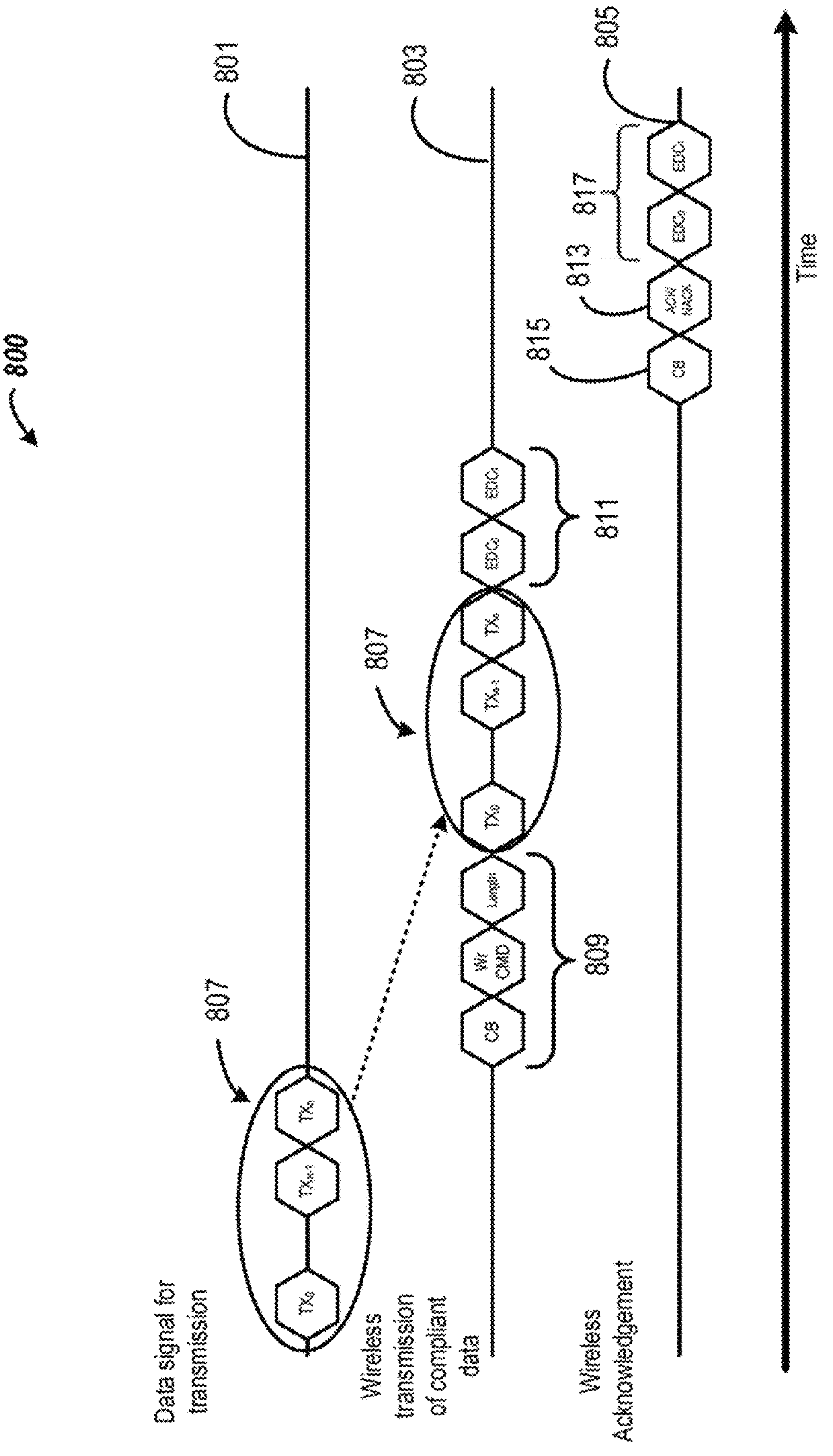
FIG. 8A is a timing diagram showing encapsulation of wirelessly transmitted data, that may be transferred via the wireless transfer system(s) of FIGS. 1-7B.

Turning to FIG. 8A, this figure shows a set of a vertically-registered signal timing diagrams 800 associated with a wireless exchange of data and associated communications over a wireless connection, as a function of time, in accordance with the present disclosure. For example, the wireless connection herein may be the magnetic coupling of the transmission antenna 121 and the receiver antenna 151 of, respectively, the wireless transmission system 120 and the wireless receiver system 150, discussed above. In this situation, the wireless exchange of data occurs between the wireless transmission system 120 and the wireless receiver system 150. It should be noted that data transferred over the wireless connection may be generated, encoded, and/or otherwise provided by one or both of the transmission controller 210 and the receiver controller 510. Such data may be any data, such as, but not limited to, data associated with the wireless transmission of electrical energy, data associated with a host device associated with one of the wireless transmission system 120 or the wireless receiver system 150, or combinations thereof. While illustrated in FIG. 8A, along with the proceeding drawings, as a transfer of data from the wireless transmission system 120 to the wireless receiver system 150, as mentioned, the simulated serial communications between the systems 120, 150 may be bidirectional (i.e., two-way), such that both systems 120, 150 are capable of transmission, receipt, encoding, decoding, other bi-directional communications functions, or combinations thereof.

The originating data signal 801 is an example UART input to the wireless transmission system 120, e.g., as a UART data input to the wireless transmission system 120 and/or the transmission controller 210 and/or as a UART data input to the wireless receiver system 150 and/or the receiver controller 510. While the figure shows the data originating at and transmitted by the wireless transmission system 120/transmission controller 210, the transmission controller 210 and/or the receiver controller 510 may communicate data within the power signal by modulating the inductive field between the antennas 121, 151 to communicate in the frequency band of the wireless power transfer operating frequency.

The wireless serial data signal 803 in FIG. 8A shows a resultant data stream conveying the data of the originating data signal 801 as an encapsulated transmission. The acknowledgment signal 805, shown in FIG. 8A, represents a transmission-encapsulated acknowledgment (ACK) or non-acknowledgement (NACK) signal, communicated over the near field magnetic connection, by the receiver controller 510, upon acknowledgment or non-acknowledgement of receipt of the wireless serial data signal 803, by the receiver controller 510.

Turning to the specific contents of each signal in FIG. 8A, the originating data signal 801 includes an n-byte data element 807 comprised of bytes $T_{x0} \ldots T_{xn-1}$, $T_{xn}$. In the wireless serial data signal 803, the data stream may include a command header 809 and a checksum 811, in accordance with the particular transmission protocol in use in the example. "n" indicates any number of bytes for data elements, defined herein. For example, the command header 809 may include a Control Byte ("CB"), Write command ("Wr CMD") and Length code ("Length"). The Control Byte contains, for example, information required to control data transmission of blocks. The Write command may include information specifying that encapsulated data is to be written at the receiving end. The Length code may include information indicating the length of the n-byte data element 807. The checksum 811 may be a datum used for the purpose of detecting errors and may be determined by or generated from a checksum algorithm. The ACK signal 813 from the receiver is similarly encapsulated between a CB 815 and a checksum 817.

Figure 8B:
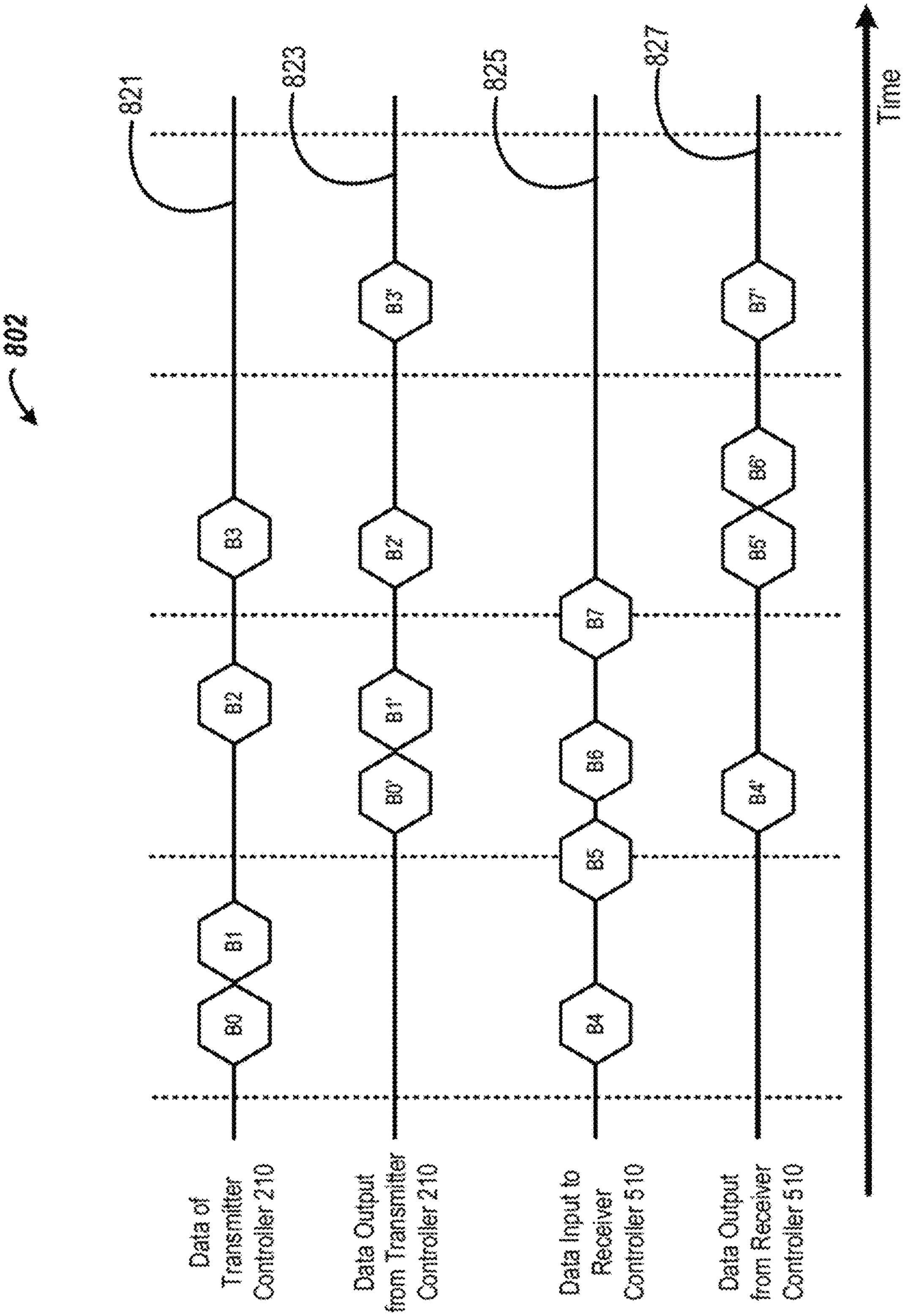
FIG. 8B is a timing diagram showing receiver and transmitter timing functions, for data that may be transferred via the wireless transfer system(s) of FIGS. 1-7B.

FIG. 8B is a timing diagram 802 showing receiver and transmitter timing functions in accordance with the present disclosure. For example, the receiver timing functions may be the timing of data transmission/receipt at the receiver controller 510 and the transmitter timing functions may be the timing of data transmission/receipt at the transmission controller 210. In this example, the receiver and transmitter timing utilizes a slotted protocol, wherein certain slots of time are available for data transmission, as in-band data communications of the wireless power signal between the transmission antenna 121 and the receiver antenna 151. Utilizing such timing and/or protocol may provide for virtually simultaneous data transfer between the transmission controller 210 and the receiver controller 510, as both the transmission controller 210 and the receiver controller 510 may be capable of altering an amplitude (voltage/current) of the magnetic field between the antennas 121, 151. "Virtually simultaneous data transfer" refers to data transfer which may not be actually simultaneous, but performed at a speed and with such regular switching of active transmitter of data (e.g., the wireless transmission system 120 or the wireless receiver system 150), such that the communications provide a user experience comparable to actual simultaneous data transfer.

In the illustrated embodiment, the first line 821 shows an incoming stream of bytes $B_0$, $B_1$, $B_2$, $B_3$, to the transmission controller 210. If the transmission controller 210 is configured to transmit data in time slots, then the incoming bytes are slightly delayed and placed into sequential slots as they become available. In other words, data that arrives during a certain time slot (or has any portion arriving during that time slot) will be placed into a subsequent time slot for transmission. This is shown in the second line 823, which shows data to be transmitted over the wireless link, e.g., a wireless power and data connection. As can be seen, the analog of each byte is sent in the subsequent slot after the data arrives at the transmission controller 210, from, for example, a data source associated with the wireless transmission system 120. Further, a third line 825 shows an incoming stream of bytes $B_5$, $B_6$, $B_7$, $B_8$, to the receiver controller 510. If the receiver controller 510 is configured to transmit data in time slots, then the incoming bytes are slightly delayed and placed into sequential slots as they become available. In other words, data that arrives during a certain time slot (or has any portion arriving during that time slot) will be placed into a subsequent time slot for transmission. This is shown in the fourth line 827, which shows data to be transmitted over the wireless link, e.g., a wireless power and data link. As can be seen, the analog of each byte is sent in the subsequent slot after the data arrives at the receiver controller 510 from, for example, a data source associated with the wireless receiver system 150.

In a buffered system, communications can be held in one or more buffers until the subsequent processing element is ready for communications. To that end, if one side is attempting to pass a large amount of data but the other side has no need to send data, communications can be accelerated since they can be sent "one way" over the virtual "wire" created by the inductive connection. Therefore, while such electromagnetic communications are not literally "two-way" communications utilizing two wires, virtual two-way UART communications are executable over the single inductive connection between the transmitter and receiver.

Figure 8C:
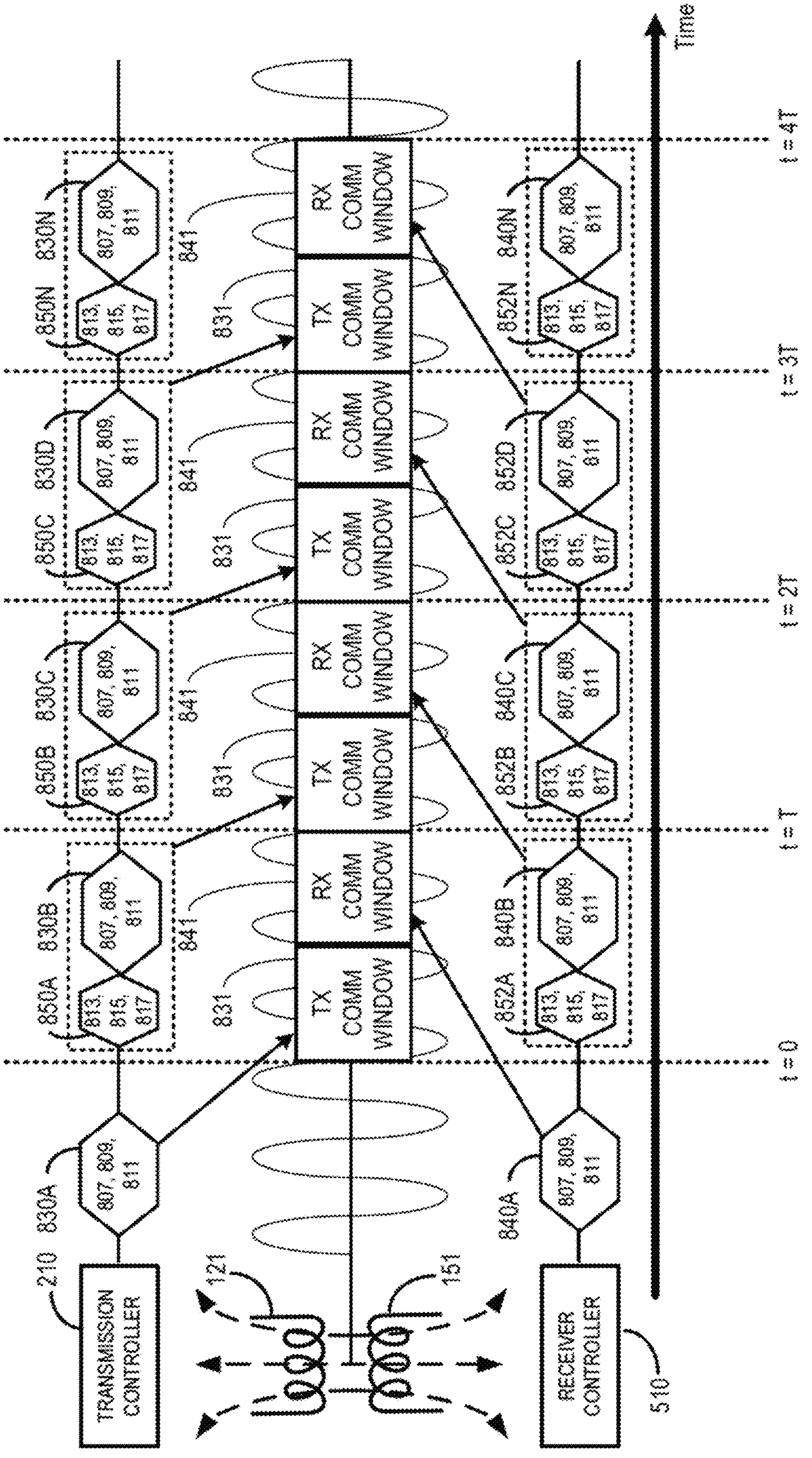
FIG. 8C is a timing diagram showing windowing of communications, when both the wireless transmission system and the wireless receiver system are communicating with virtual two-way communications, when, for example, data is transferred via the wireless transfer system(s) of FIGS. 1-7B.
Figure 8D:
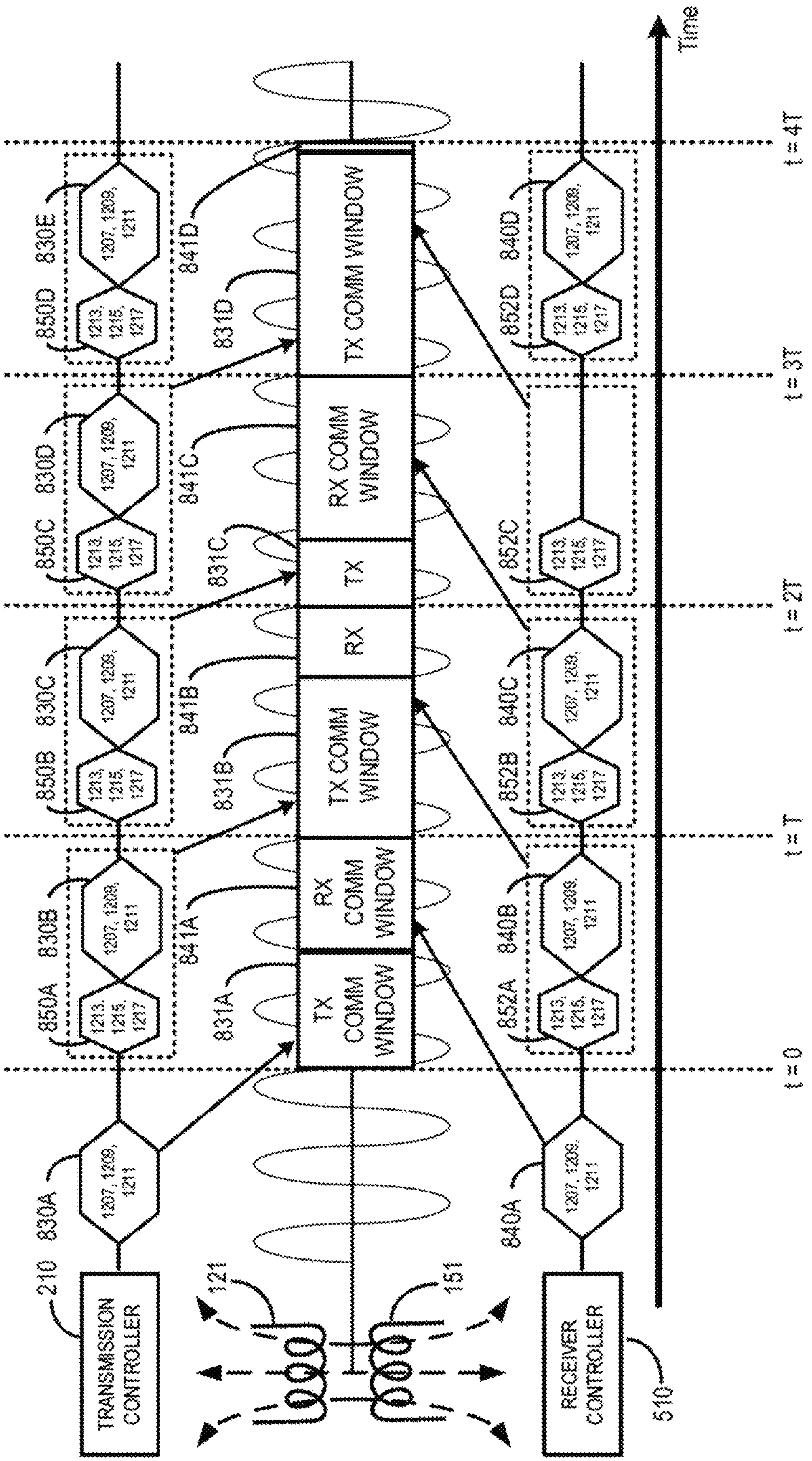
FIG. 8D is a timing diagram showing variable-length windowing of communications, when both the wireless transmission system and the wireless receiver system are communicating with virtual two-way communications, when, for example, data is transferred via the wireless transfer system(s) of FIGS. 1-7B.

To that end, as illustrated in FIGS. 8C and 8D, two-way communications may be achieved by windowing a period of time, within which each of the wireless transmission system 120 and the wireless receiver system 150 encode their data into the power signal/magnetic field emanating between the antennas 121, 151. FIG. 8C shows a timing diagram, wherein data 830, 840 at the systems 120, 150, respectively, are prepared for transmission and subsequently encoded into the signal during respective transmission communication windows 831 and receiver communication windows 841. As illustrated, the systems 120, 150 and/or controllers 210, 510 may be configured to store, transmit, and encode data 830, 840 into the resultant signal emanating between the antennas 121, 151. Such controllers 210, 510 may be configured to encode said data 830, 840 within the windows 831, 841, within a given and known (by both controllers 210, 510) period of time (T). As such, the time scale in FIGS. 8C and 8D is labelled with recurring periods for the time, as indicated by the vertical dotted lines. Further, while the windows 831, 841 are illustrated as consuming entire periods T of the signal, the windows 831, 841 do not necessarily consume an entire period T and may be configured as a fraction of the period T, but recurring and beginning at intervals of the period T.

Each of the transmission controller 210 and the receiver controller 510 may be configured to transmit a stream of the data 830A-N, 840A-N, respectively, to the other controller 210, 510, in a sequential manner and within the respective windows 831, 841. The period T and/or the windows 831, 841 may be of any time length suitable for the data communications operation used. However, it may be beneficial to have short periods and windows, such that the switching of senders (controllers 210, 510) is not perceptible by the user of the system. Thus, to achieve high data rates with short windows and periods, the power signal may be of a high operating frequency (e.g., in a range of about 1 MHz to about 20 MHz). To that end, the data rates utilized may be up to or exceeding about 1 megabit per second (Mbps) and, thus, small periods and windows therein are achievable.

Further, while the windows in FIG. 8C are illustrated as relatively equal, such window sizes may not be equal. For example, as illustrated in FIG. 8D, the length of the windows 831, 841 may dynamically alter based on, for example, the desired data operations needed. Thus, the length of the windows 831, 841 within each slot may lengthen or shrink, with respect to one another, based on operating conditions. For example, as illustrated at windows 831B, 841B, the transmission communications window 831B may be significantly larger than the receiver communications window 841B. Such a configuration may be advantageous when the wireless transmission system 120 desires to send a large amount of data (e.g., a firmware update, new software for the electronic device 140, among other software and/or firmware), while the wireless receiver system 150 only needs to transmit regular wireless power related information.

Conversely, in some examples, such as those of illustrated by windows 831C, 8411C, the wireless receiver system 150 may need to send much more data than the wireless transmission system 120 and, thus, the windows 831C, 841C are dynamically altered such that the receiver communications window 841C is larger, with respect to the transmission communications window. Such a configuration may be advantageous when the receiver system desires to send a large amount of data to the wireless transmission system 120 and/or a device associated therewith. Example situations wherein this scenario may exist include, but are not limited to including, download of device data from the wireless receiver system 150 to a device associated with the wireless transmission system 120.

In an example exemplified by the windows 831D, 841D, the transmission communications window 831D may be so much larger than the receiver communications window 841D, such that the receiver communications window 841D, virtually, does not exist. Thus, this may put the wireless transmission system 120 in a virtual one-way data transfer, wherein the only data transmitted back to the wireless transmission system 120 is a simple ACK signal 813 and, in some examples, associated data such as the CB 815 and/or checksum 817. Such a configuration may be advantageous when the wireless transmission system 120 is transmitting data and the wireless receiver system 150 does not need to receive significant electrical power to charge the load 160 (e.g., when the load 160 is at a full load or fully charged state and, thus, the wireless receiver system 150 may not need to send much power-related data).

In some examples, as illustrated, some data 830, 840 may be preceded by acknowledgment data 850, 852, which includes, but is not limited to including, at least the ACK signal 813 and, in some examples, may further include a CB 815 and/or a checksum 817, each of which are discussed in more detail above. The acknowledgement data 850, 852 may be associated with an acknowledgement of receipt of a previously transmitted member of the stream of data 830A-N, 840A-N, within a subsequent window of the previously transmitted member of the stream of data 830A-N, 840A-N. For example, consider that in a first transmission communication window 831, a first data 830A is encoded and transmitted during the first period of time [t=0:T]. Then, a receiver acknowledgment data 343A will be encoded and transmitted, by the receiver controller 510, within a second receiver communications window 841, during a second period of time [t=T:2T].

Therefore, by encoding the data 830, 840, 850, 852 sequentially and within timed, alternating windows in the power signal of the antennas 121, 151, this may make the alternation of data passage nearly unnoticeable, and, thus, the communications are virtually simultaneously two-way, as the user experience does not register as alternating senders.

Figure 9A:
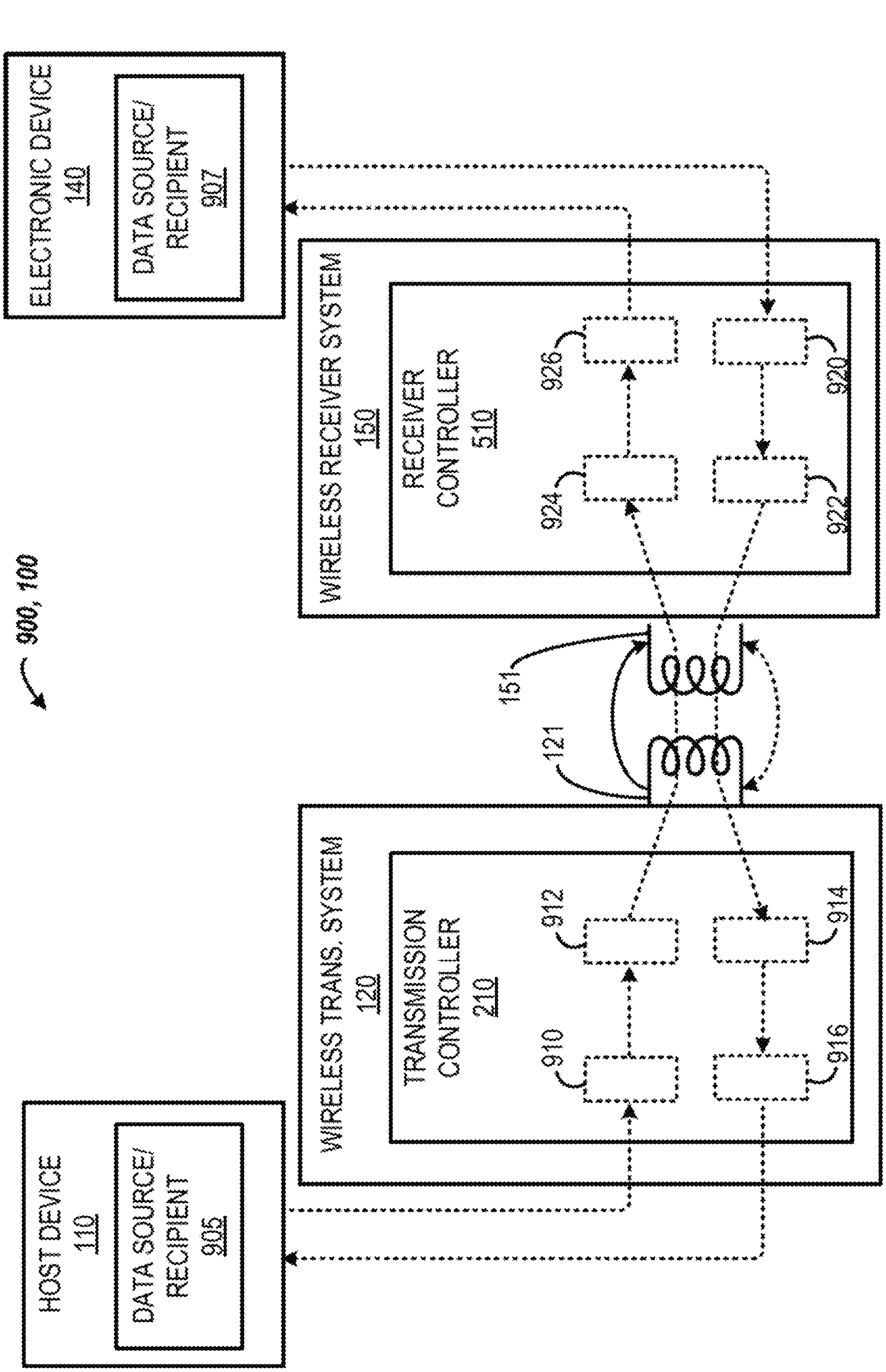
FIG. 9A is a schematic diagram of an example wireless transfer system configured for buffering data communication for transmission and receipt via near-field magnetic coupling via the wireless transfer system(s) of FIGS. 1-7B.

FIG. 9A is a schematic diagram 900 of one or more components of the wireless power and data transfer system 100, including the transmission controller 210 and the receiver controller 510 of, respectively, the wireless transmission system 120 and the wireless receiver system 150. The diagram 900 illustrates a configuration of the wireless power and data transfer system 100 capable of buffering data in order to facilitate virtual two-way communications. The transmission controller 210 may receive data from a first data source/recipient 905 associated with the wireless transmission system 120; however, it is certainly contemplated that the source of the data for the transmission controller 210 is the transmission controller 210 and/or any data collecting/providing elements of the wireless transmission system 120, itself. The data source/recipient 905 may be operatively associated with a host device 11 that hosts or otherwise utilizes the wireless transmission system 120. Data provided by the data source/recipient 905 may be processed by the transmission controller 210, transmitted from the transmission antenna 121 to the receiver antenna 151, processed by the receiver controller 510, and, ultimately, received by a second data source/recipient 907.

The second data source/recipient 907 may be associated with the electronic device 14, which hosts or otherwise utilizes the wireless receiver system 150. The receiver controller 510 may receive data from a first data source/recipient 907 associated with the wireless receiver system 150; however, it is certainly contemplated that the source of the data for the receiver controller 510 is the receiver controller 510 and/or any data collecting/providing elements of the wireless receiver system 150 itself. The data source/recipient 907 may be operatively associated with an electronic device 14 that hosts or otherwise utilizes the wireless receiver system 150. Data provided by the data source/recipient 907 may be processed by the receiver controller 510, transmitted over the field generated by the connection between the transmission antenna 121 and the receiver antenna 151, processed by the transmission controller 210, and, ultimately, received by a second data source/recipient 905. The second data source/recipient 905 may be associated with the host device 110, which hosts or otherwise utilizes the wireless transmission system 120.

As shown, the illustrated example includes a series of buffers 910, 912, 914, 916, 920, 922, 924, 926, each associated with one of the transmission controller 210 or the receiver controller 510. The buffers 910, 912, 914, 916, 920, 922, 924, 926 may be used to properly order the data for transmission and receipt, especially when the communication between the wireless transmission system 120 and wireless receiver system 150 includes data of a type typically associated with a two-wire, physical, serialized data communications system, such as UART. In an embodiment, the output of the one or more buffers 910, 912, 914, 916, 920, 922, 924, 926 in the wireless power transmission system is clocked to trigger buffered data for transmission, meaning that the controller(s) 210, 510 may be configured to output the buffered data at a regular, repeating, clocked timing In the illustrated example, the transmission controller 210 includes two outgoing buffers 910, 912 to buffer outgoing communications, as well as two incoming buffers 914, 916 to buffer incoming communications. Similarly, the receiver controller 510 includes two incoming buffers 926, 924 to buffer incoming communications and two outgoing buffers 920, 922 to buffer outgoing communications.

The purpose of these two-buffer sets, in an embodiment, is to manage overflow by mirroring the first buffer in the chain to the second when full, allowing the accumulation of subsequent data in the now-cleared first buffer. Thus, for example, data entering buffer 910 from data source 905 is accumulated until buffer 910 is full or reaches some predetermined level of capacity. At that point, the accumulated data is transferred into buffer 912 so that buffer 910 can again accumulate data coming from the data source 905. Similarly, for example, data entering buffer 920 from data source 907 is accumulated until buffer 920 is full or reaches some predetermined level of capacity. At that point, the accumulated data is transferred into buffer 922 so that buffer 920 can again accumulate data coming from the data source 907. While the two-buffer sets are used in this illustration, by way of example, it will be appreciated that single buffers may be used or, alternatively, three-buffer or larger buffer sets may be used. Similarly, the manner of using the illustrated two-buffer sets is not necessary in every embodiment, and other accumulation schemes may be used instead.

Figure 9B:
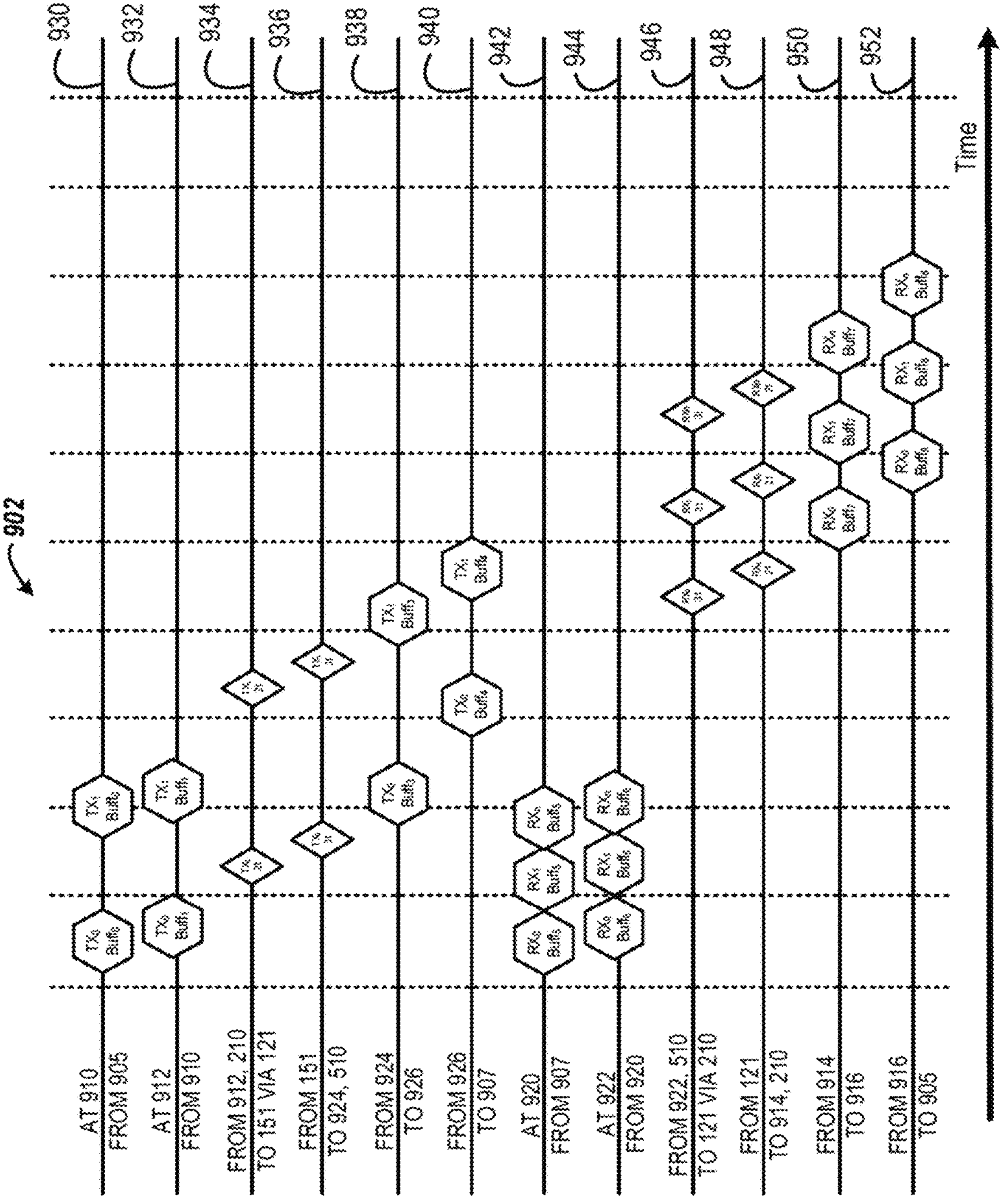
FIG. 9B is a set of vertically-registered timing diagrams reflecting buffered data communications, communicated using, for example, the example wireless transfer system of FIG. 9A and in accordance with the disclosed principles of FIGS. 1-7B.

FIG. 9B is a timing diagram showing initial data input (lines 930, 942), buffering (lines 930, 932, 942, 944), and wireless transmission (lines 934, 936, 946, 948), as well as receipt (line 938, 950), buffering (line 938, 940, 950, 952), and data output (line 940, 952) in the context of a configuration, such as that shown in FIG. 9A. The first three lines of each data transfer (lines 930, 932, 934, 940, 942, 944) show a series of data transfers for sending asynchronous incoming data such as UART data across a wireless connection. The last three lines of each data transfer (936, 938, 940, 948, 950, 952) show the receipt and processing of embedded data in a wireless transmission.

As can be seen, the data stream in the first two lines 930, 932, represent incoming data received and buffered at the transmission controller 210. The buffered data is then transmitted within the prescribed wireless data slots in line 934, which may, for example, cover a very small portion of the transmission bandwidth. Note, that the wireless data slots have no bearing on the timing of data receipt/internal transfer within the controllers 210, 510, but may be utilized for timing the modulation of the induced field between the antennas 121, 151 that is utilized for transmission of data.

In the example of FIG. 9B, line 930 shows a series of data packets from the wireless transmission system 120 ($TX_0$ . . . $TX_n$) sequentially input to a first outgoing buffer 910 ($Buff_0$). Then, prior to transmission via the transmission antenna 121, the series of data packets ($TX_0$ . . . $TX_n$) are input to the second outgoing buffer 912 ($Buff_1$), as illustrated in line 932. Then, the transmission controller 21 sequentially encodes the series of data packets ($TX_0$ . . . $TX_n$) into the driving signal for the transmission antenna 121 (line 934) which is then received and/or detected in the magnetic field between the antennas 121, 31, at the wireless receiver system 150 (line 936).

As noted above, the last three lines 936, 938, 940 show the receipt and processing of embedded data in the wireless transmission, and in particular show wireless receipt of the data (936), buffering of the received data (938, 940) and outputting of the buffered data (940). Again, the output of the one or more buffers in the wireless power transmission system may be clocked to trigger buffered data for transmission.

In the non-limiting example of FIG. 9B, line 936 shows a series of data packets originating from the wireless transmission system 120 ($TX_0$ . . . . $TX_n$) and received at the receiver antenna 151 sequentially input to a first input buffer 924 ($Buff_3$) of the receiver controller 510, upon sequential decoding of the series of data packets ($TX_0$ . . . . $TX_n$) by the receiver controller 510 detection of the magnetic field between antennas 121, 151. Then, prior to output of the data to the data recipient 907, the series of data packets ($TX_0$ . . . . $TX_n$) are input to a second input buffer 926 ($Buff_4$) from the first input buffer ($Buff_3$), as illustrated in line 940.

In the example of FIG. 9B, line 930 shows a series of data packets ($RX_0$ . . . $RX_n$) sequentially input to a first outgoing buffer 920 ($Buff_0$). Then, prior to transmission via altering the field between the receiver antenna 151 and the transmission antenna 121, the series of data packets ($RX_0$ . . . $RX_n$) are input to the second outgoing buffer 922 ($Buff_1$), as illustrated in line 932. Then, the receiver controller 510 sequentially encodes the series of data packets ($RX_0$ . . . $RX_n$) into in band of the wireless power transfer between the antennas 121, 151 (line 934), the signal is then received and/or detected in the magnetic field between the antennas 121, 151, at the wireless transmission system 120 (line 936).

As noted above, the lines 936, 938, 940 show the receipt and processing of embedded data in the wireless transmission, and in particular show wireless receipt of the data (936), buffering of the received data (938, 940) and outputting of the buffered data (940). Again, the output of the one or more buffers in the wireless power transmission system may be clocked to trigger buffered data for transmission.

As can be seen, the data stream in the lines 942, 944 represent incoming data received and buffered at the receiver controller 510. The buffered data is then transmitted within the prescribed wireless data slots in line 946, which may, for example, cover a very small portion of the transmission bandwidth. Note, that the wireless data slots have no bearing on the timing of data receipt/internal transfer within the controllers 210, 510, but may be utilized for timing the modulation of the induced field between the antennas 121, 151 that is utilized for transmission of data.

In example of FIG. 9B, line 942 shows a series of data packets ($RX_0$ . . . $RX_n$) originating at the wireless receiver system 150 and sequentially input to a third outgoing buffer 920 ($Buff_5$). Then, prior to transmission via altering the field between the receiver antenna 151 and the transmission antenna 121, the series of data packets ($RX_0$ . . . $RX_n$) are input to the fourth outgoing buffer 922 ($Buff_6$), as illustrated in line 944. Then, the receiver controller 510 sequentially encodes the series of data packets ($RX_0$ . . . $RX_n$) in band of the wireless power transfer between the antennas 121, 151 (line 946), the signal is then received and/or detected in the magnetic field between the antennas 121, 151, at the wireless transmission system 120 (line 948).

As noted above, the three lines 948, 950, 952 show the receipt and processing of embedded data in the wireless transmission, and in particular show wireless receipt of the data (948), buffering of the received data (950, 952) and outputting of the buffered data (952). Again, the output of the one or more buffers in the wireless power transmission system may be clocked to trigger buffered data for transmission.

In the non-limiting example of FIG. 9B, line 948 shows the series of data packets ($RX_0$ . . . $RX_n$) sequentially input to a third input buffer 914 ($Buff_7$) of the transmission controller 210, upon sequential decoding of the series of data packets ($RX_0$ . . . $RX_n$) by the transmission controller 210 detection of the magnetic field between antennas 121, 151. Then, prior to output of the data to the data recipient 905, the series of data packets ($RX_0$ . . . $RX_n$) are input to a fourth input buffer 916 ($Buff_8$) from the third input buffer ($Buff_7$), as illustrated in line 952.

As best illustrated in FIG. 9A, by utilizing the buffers and the ability of both the transmission controller 210 and the receiver controller 510 to encode data into the wireless power signal transmitted over the connection between the antennas 121, 151, such combinations of hardware and software may simulate the two-wire, depicted as dotted, arrowed lines in FIG. 9A. Thus, the systems and methods disclosed herein may be implemented to provide a "virtual wired" serial and/or "virtual wired" UART data communications system, method, or protocol, for data transfer between the wireless transmission system 120 and the wireless receiver system 150 and/or between the host devices thereof. "Virtual wired," as defined herein, refers to a wireless data connection, between two devices, that simulates the functions of a wired connection and may be utilized in lieu of said wired connection.

In contrast to the wired serial data transmission systems such as UART the systems and methods disclosed herein eliminate the need for a wired connection between communicating devices, while enabling a data communication interpretable by legacy systems that utilize known data protocols, such as UART. Further, in some examples, such legacy-compatible systems may enable manufacturers to quickly introduce wireless data and/or power connections between devices, without needing to fully reprogram their data protocols and/or without having to hinder interoperability between devices.

Additionally, such systems and methods for data communications, when utilized as part of a combined wireless power and wireless data system, may provide for much faster legacy data communications across an inductive wireless power connection, in comparison to legacy systems and methods for in-band communications.

Figure 10A:
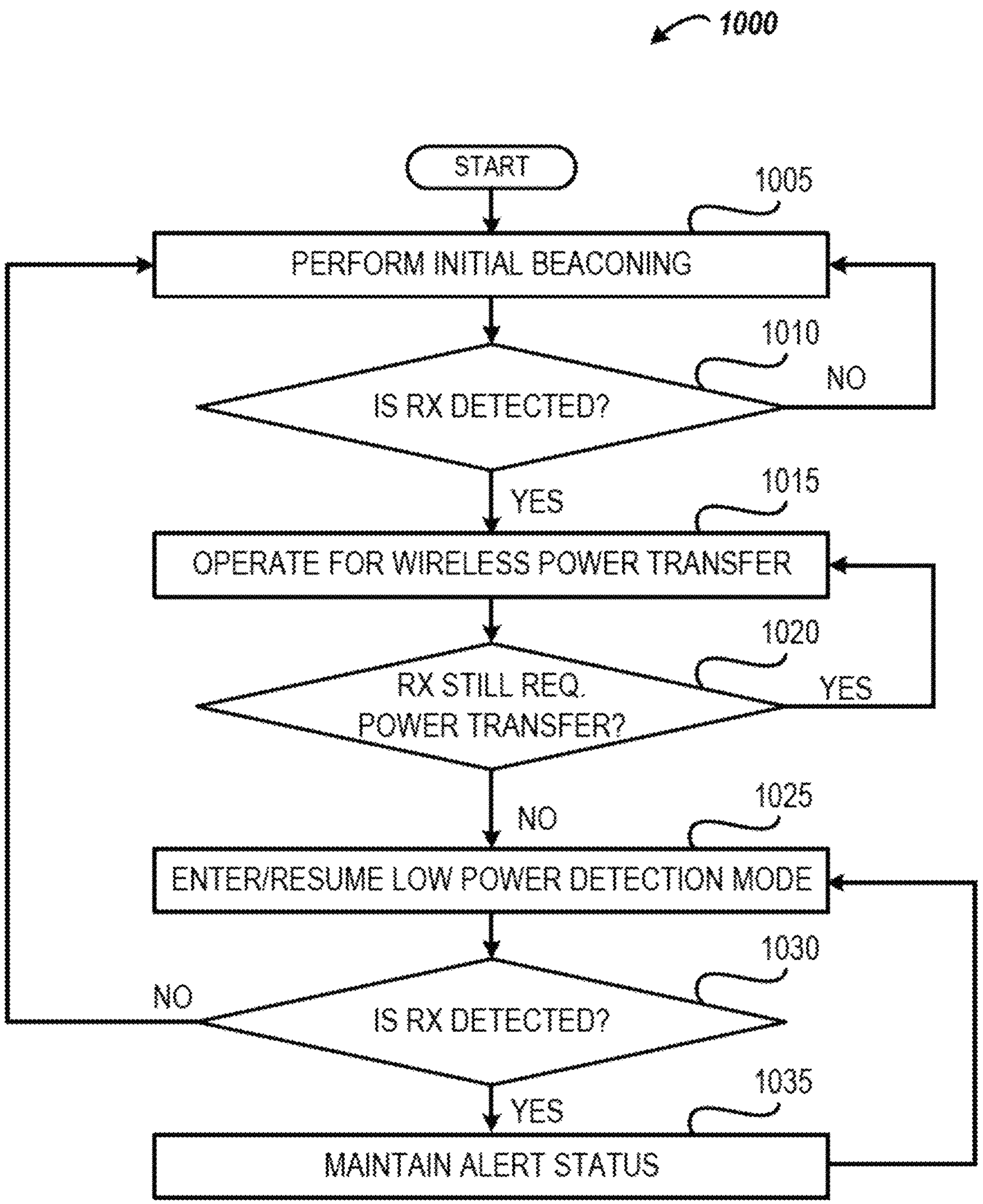
FIG. 10A is an example block diagram of an object detection method that may be utilized by the wireless transfer system(s) of FIGS. 1-7B.

Turning now to FIG. 10A, an example method 1000 of operating a wireless transmission system (e.g., the wireless transmission system 120), while utilizing a low power detection mode, is illustrated. The low power detection mode may utilize an object or device (receiver system) detection process that is configured to utilize less energy to beacon for such an object or device, in comparison to a standard beaconing process. Such a low power detection modes may be initialized, for example, when a wireless transmission system 120 receives an indication that a detected device being charged by the wireless transmission system 120 no longer needs additional power (e.g., when a battery of the device is charged to a sufficient degree).

To that end, the method 1000 begins at block 1005, wherein the wireless transmission system 120 operates in an initial beaconing mode, such as those discussed above with respect to the object sensing system 310. As depicted by the decision 1010, if, during such an initial beaconing mode, the wireless transmission system 120 detects a wireless receiver system 150, then the wireless transmission system 120 will transition to operating in a mode for wireless power transfer from the wireless transmission system 120 to the wireless receiver system 150, as illustrated in block 1015. If, at the decision 1010, no wireless receiver system 150 is detected, then the method 1000 returns to block 1005 and continues to operate in the initial beaconing mode.

While operating in the wireless power transfer mode of block 1015, the wireless transmission system 120 may determine if a load 160 (e.g., a battery) associated with the wireless receiver system 150 continues to need additional power transfer. This may come in the form of receiving a message, via in-band communications, from the coupled wireless receiver system 150 indicating that the wireless receiver system 150 does not require additional power transfer. In some other examples, conditions indicative of such a state, wherein no additional power transfer is required, may be determined via electrical characteristics (e.g., impedances, coupling, voltages, etc.) detected by, for example, the sensing system 300. Further, the determination of whether or not the wireless receiver system 150 desires additional power transfer can take various other forms.

This decision is illustrated by the decision 1020. If the wireless transmission system 120 determines that the wireless receiver system 150 still requires or requests additional power transfer, then the wireless transmission system 120 continues to operate in the power transfer mode of block 1015. However, if the wireless transmission system determines that the wireless receiver system 150 does not require or request additional power transfer, then the method 1000 includes operating the wireless transmission system 120 in a low power detection mode, as illustrated in block 1025.

The low power detection mode may be a mode that determines, at a periodic rate, that the wireless receiver system 150 has not been removed from a proximate area to the wireless transmission system 120, wherein said area is one wherein the systems 120, 150 are couplable with respect to one another. The power usage, by a wireless transmission system 120, during the low power detection mode may be inversely proportional with the periodic rate at which the wireless transmission system 120 determines presence of a wireless receiver system 150 (e.g., the greater the period between beacons, the lesser the power usage).

However, if the periodic rate at which the wireless transmission system 120 determines presence of a wireless receiver system 150 is high, while it may reduce power usage, it may have adverse effects on user experience of the wireless power and data transfer system 100. For example, a wireless transmission system 120 and/or its associated host device 110 may include some alert mechanism that alerts a user to presence or non-presence of a wireless receiver system 150 and/or an associated electronic device 140. For example, such an alert mechanism may include a visual indicator (e.g., a light, a light emitting diode (LED), a screen, etc.), an audio indicator (e.g., a speaker, a buzzer, etc.), and/or a haptic indicator (e.g., a haptic motor, a vibrating surface, etc.), among other things.

In such examples, if the periodic rate at which the wireless transmission system 120 determines presence of a wireless receiver system 150 is too high, such an alert mechanism may improperly believe that the wireless receiver system 150 is removed and indicate an incorrect state to a user. For example, consider that the alert mechanism is an LED that is configured to turn off after the wireless receiver system 150 has been removed from the proximity of the wireless transmission system 120 for at least one second. In such examples, if the periodic rate is greater than 1 second, then the LED will, effectively, blink with the periodic rate, as the control mechanism of the LED may believe the wireless receiver system 150 is removed and then re-placed at each instance of the beaconing at the periodic rate.

Figure 10B:
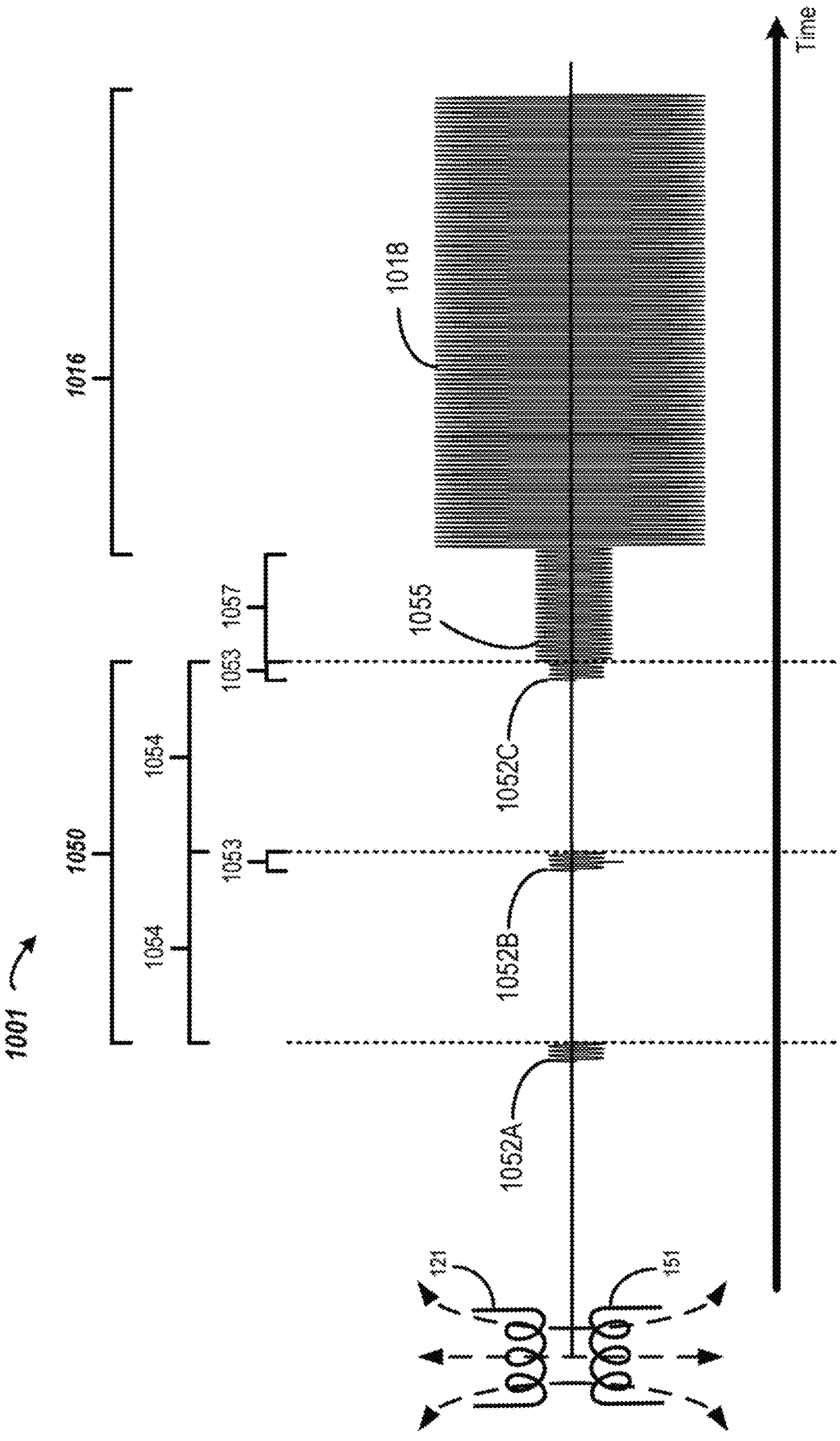
FIG. 10B is an example timing diagram for a wireless receiver detection signal output in accordance with the method of FIG. 10A via wireless transmission system(s) of FIGS. 1-7B.

Thus, the low power detection mode is configured to mitigate these issues by providing for object detection beacons at a rate lower than a threshold for maintaining an alert status of an alert mechanism. FIG. 10B shows an example timing diagram 1001 for an output signal of the wireless transmission system 120 operating in a low power detection mode 1050.

As illustrated, the low power detection mode 1050 may operate by utilizing a plurality of short beacons 1052 that are timed apart (e.g., at a periodic rate) by an off-period 1054 and each of the short beacons 1052 has a beacon length 1053. The short beacons 1052 may be configured such that the wireless transmission system 120 may detect presence of a wireless receiver system 150 and/or an associated load condition associated with the wireless receiver system 150. If a wireless receiver system 150 detects a change during one of the short beacons 1052, then the low power detection mode 1050 causes the wireless transmission system 120 to output a long beacon 1055, within which proper communications can occur between the systems 120, 150.

In such examples, the long beacon 1055 may be considered a digital beacon, wherein digital communications can occur to determine if the wireless transmission system 120 should begin power transfer. For example, if during a long beacon 1055 it is determined that wireless power transfer should be initiated, then the wireless transmission system will enter a power transmission mode 1016 and output wireless power signal(s) 1018.

In some such examples, detection at the short beacon(s) 1052 may comprise determining an AGC level (e.g., a level detected by the AGC 250 of FIGS. 2B and 2C) and, if the AGC level meets a certain threshold, then the low power detection mode 1050 will cause the wireless transmission system 120 to output a long beacon 1055.

The off-periods 1054 may be configured such that an alert status of an alert mechanism is not altered by the low power detection mode 1050. For example, the off-periods 1054 may be about one second if the alert status of an alert mechanism changes if a state change is detected for over two seconds.

To that end, as illustrated in FIG. 10A, if, when operating in the low power detection mode 1050, a wireless receiver system 150 is detected, then an alert status may be maintained via operation in the low power detection mode 1050, as illustrated by decision 1030. However, if no wireless receiver system 150 is detected during the low power detection mode of block 1025, then the method 1000 returns to block 1005 for the initial beaconing and/or object detection mode.

Figure 11:
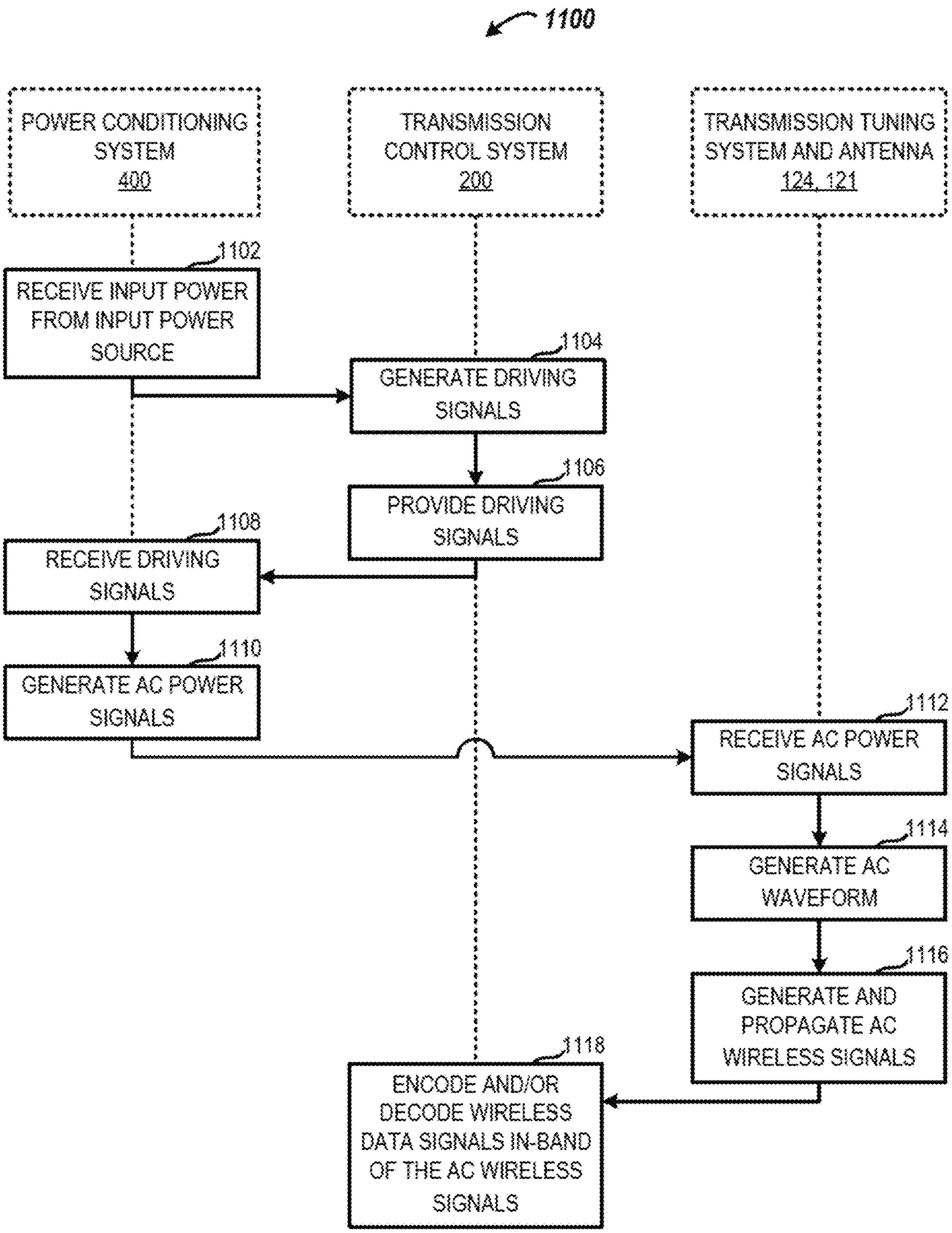
FIG. 11 is a block diagram for a method of operating a wireless power transmission system, such as those disclosed with respect to FIGS. 1-10C.

Turning now to FIG. 11, an example method 1100 of operating a wireless transmission system (e.g., the wireless transmission system 120) is illustrated. As illustrated, certain functions of the method 1100 are indicated as being performed by one of the power conditioning system 400, the transmission control system 200, or the transmission tuning system 124 and antenna 121, as indicated by the dotted lines connecting blocks to said components; however, the method 1100 is not limited to having the indicated steps specifically performed by only the indicated connected component. One or more functions of the method 1100 may be carried out by additional or alternative components, as known by those having skill in the art. The functionality discussed below may be carried out using any of the disclosed technology discussed above.

The method 1102 begins with the wireless transmission system 120 receiving input power from an input power source. Then, as indicated by block 1104, the input power may be utilized in generating driving signals for the wireless transmission system 120. In some examples, as indicated in block 1106, the driving signals may be provided to the power conditioning system 400, by the transmission control system 200.

The driving signals may be received by the power conditioning system 400 (block 1108) and utilized to generate AC power signals (block 1110), which, in some examples, are received by the transmission tuning system 124 and antenna 121 (block 1112). Then, based on the driving signals, the wireless transmission system 120 generates an AC waveform based on the driving signals (block 1114) to then generate and propagate AC wireless signals based on said waveform (block 1116). In some examples, the wireless transmission system 120 may optionally encode and/or decode data signals in-band of the propagated AC wireless signals, in accordance with the technology disclosed above (block 1118).

Figure 12:
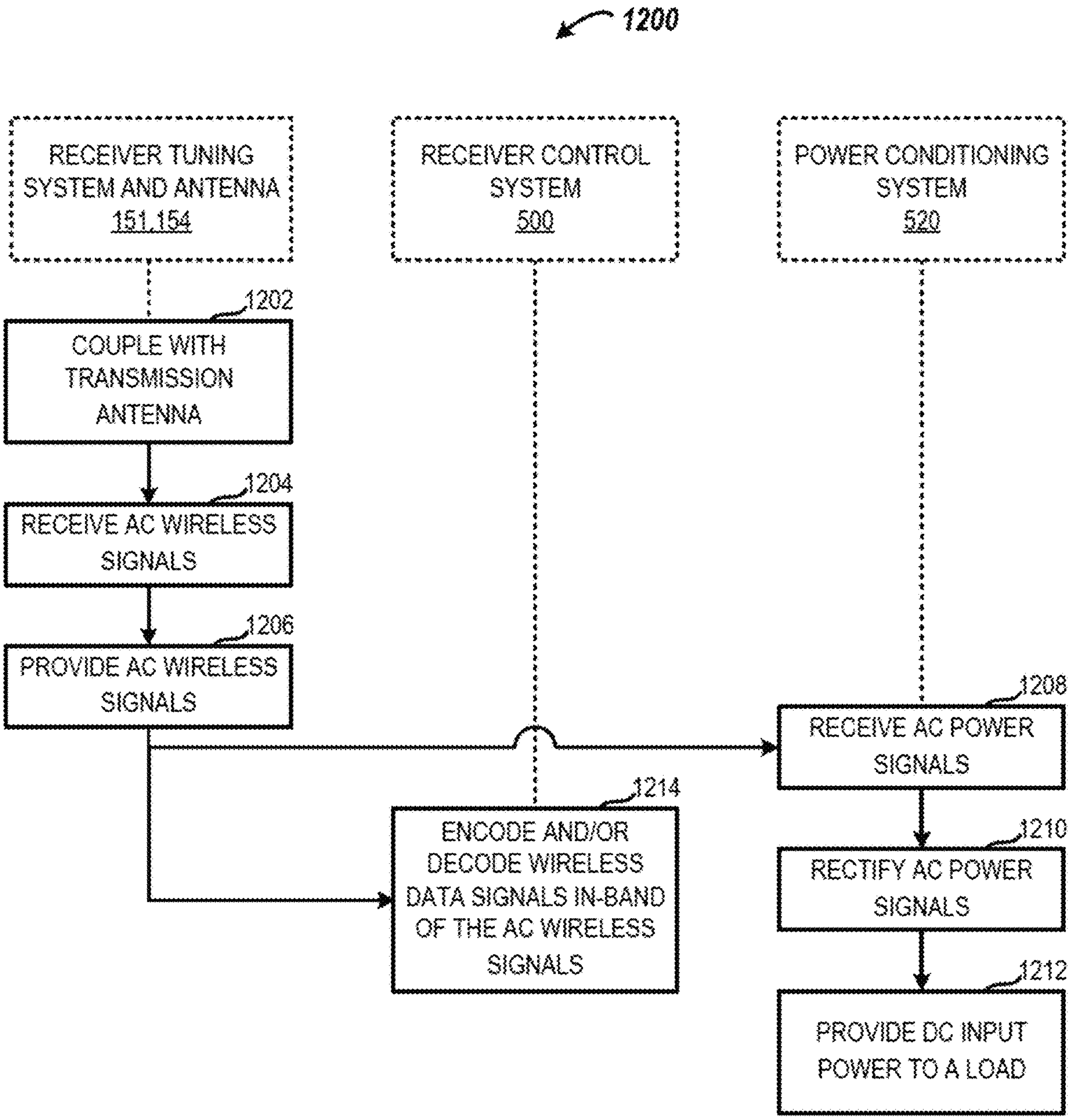
FIG. 12 is a block diagram for a method of operating a wireless power receiver system, such as those disclosed with respect to FIGS. 1-10C.

Turning now to FIG. 12, an example method 1200 of operating a wireless receiver system (e.g., the wireless transmission system 120) is illustrated. As illustrated, certain functions of the method 1200 are indicated as being performed by one of the power conditioning system 520, the receiver control system 500, or the receiver tuning system 154 and antenna 151, as indicated by the dotted lines connecting blocks to said components; however, the method 1200 is not limited to having the indicated steps specifically performed by only the indicated connected component. One or more functions of the method 1200 may be carried out by additional or alternative components, as known by those having skill in the art. The functionality discussed below may be carried out using any of the disclosed technology discussed above.

The method 1200 begins when the wireless receiver system 150 couples with a wireless transmission system (e.g., the wireless transmission system 120), via NFMI, as illustrated in block 1202. Then, the wireless receiver system 150 may receive AC wireless signals, such as wireless power signals, as illustrated in block 1204.

The antenna 151 and/or the receiver tuning system 154 may provide the AC wireless signals (block 1206) to the power conditioning system, which receives that AC wireless signals (block 1208). The wireless receiver system 150 may then rectify the AC wireless signals to generate DC output power (block 1210) to then, for example, provide meaningful electrical power to a load associated with the wireless receiver system 150 (block 1212). In some examples, the wireless receiver system 150 may optionally encode and/or decode data signals in-band of the received AC wireless signals, in accordance with the technology disclosed above.

Figure 13:
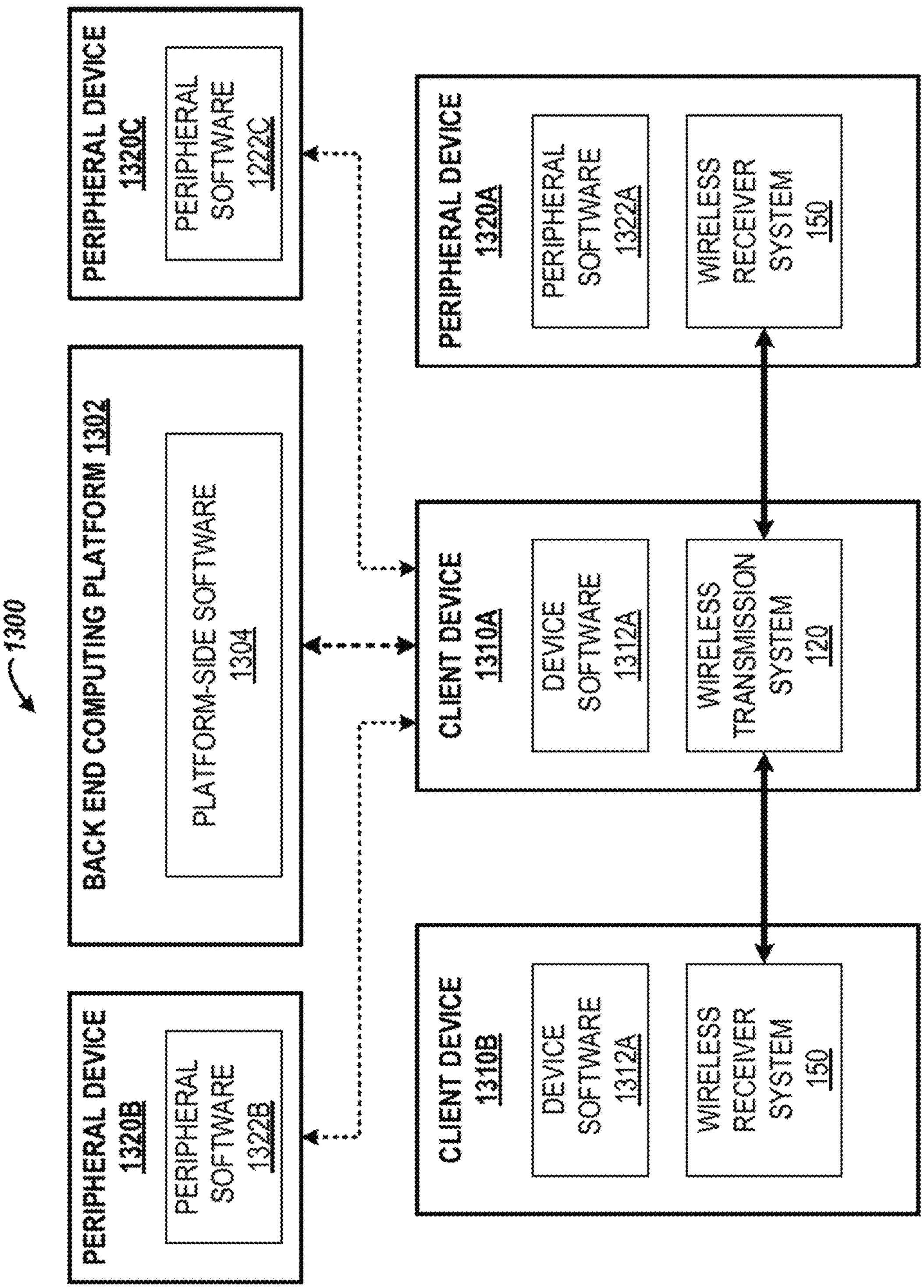
FIG. 13 depicts an example computing environment in which the disclosed systems and methods for device synchronization may utilize the wireless power transmission and receiver systems of FIGS. 1-12 for such device synchronization.

FIG. 13 depicts one illustrative example of a computing environment 1300 in which a device synchronization ecosystem may be employed. As shown, the computing environment 1300 may include a back-end computing platform 1302, one or more client device(s) 1310, and one or more peripheral device(s) 1320.

The back-end computing platform 1302 may comprise any one or more computer systems (e.g., one or more servers) that have been installed with platform-side software 1304 for carrying out the platform-side functions disclosed herein. In practice, the one or more computer systems of the back-end computing platform 1302 may collectively comprise some set of physical computing resources (e.g., one or more processors, data storage systems, communication interfaces, etc.), which may take any of various forms. As one possibility, the back-end computing platform 1302 may comprise cloud computing resources supplied by a third-party provider of "on demand" cloud computing resources, such as Amazon Web Services (AWS), Amazon Lambda, Google Cloud, Microsoft Azure, or the like. As another possibility, the back-end computing platform 1302 may comprise "on-premises" computing resources of an organization that operates the back-end computing platform 1302 (e.g., servers owned by the organization that operates the back-end computing platform 1302). As yet another possibility, the back-end computing platform 1302 may comprise a combination of cloud computing resources and on-premises computing resources. Other implementations of the back-end computing platform 1302 are possible as well.

Further, in practice, the platform-side software 1304 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Further yet, although not shown in FIG. 13, the platform-side software 1304 may interact with a data storage layer of the back-end computing platform 1302, which may comprise data stores of various different forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, or streaming event queues, among other possibilities.

The example back-end computing platform 1302 may comprise various other components and take various other forms as well.

Further, the client device 1310 may generally take the form of any computing device that is capable of synchronizing with one or more of the peripheral device(s) 1320. The client device(s) 1310 may be installed with device software 1312, which may take the form of a client application that runs in a web browser, a native desktop application, or a mobile application, among other possibilities. In this respect, the client device 1310 may include hardware components such as one or more processors, data storage, communication interfaces, and input/output (I/O) components (or interfaces for connecting thereto), among other possible hardware components, as well as software components such as operating system (OS) software, and/or web browser software, among other possible software components. As representative examples, the example client device 1310 may take the form of a smartphone, a mobile device, a desktop computer, a laptop, a netbook, a tablet, or a personal digital assistant (PDA), among other possibilities.

Further yet, the peripheral device(s) 1320 may generally take the form of any electronic device that is capable of connection with one or more client device(s) 1310 operating within the computing environment 1300. The peripheral device(s) 1320 may include hardware components such as one or more processors, data storage, communication interfaces, and input/output (I/O) components (or interfaces for connecting thereto), among other possible hardware components, as well as software components such as embedded software, control software, driver software, among other possible software components.

As shown in FIG. 13, various of the entities in the example computing environment 1300 may be configured to communicate with one another over respective communication paths. For instance, the example client device(s) 1310 may be configured to communicate with the back-end computing platform 1302 over a respective communication path. This communication path may generally comprise one or more data networks and/or data links, which may take any of various forms. For instance, the communication path between the example client device(s) 1310 and the back-end computing platform 1302 may include any one or more of a Personal Area Network (PAN), a Local Area Network (LAN), a Wide Area Networks (WAN) such as the Internet or a cellular network, a cloud network, and/or a point-to-point data link, among other possibilities, where each such data network and/or link may be wireless, wired, or some combination thereof, and may carry data according to any of various different communication protocols. Additionally, the communication between an example client device(s) 1310 and the back-end computing platform 1302 may be carried out via an Application Programming Interface (API) provided by the back-end computing platform 1302, among other possibilities. Although not shown, the respective communication path between the example client device(s) 1310 and the back-end computing platform 1302 may also include one or more intermediate systems, examples of which may include a data aggregation system or a host server, among other possibilities. Many other configurations are also possible.

Further, the client device(s) 1310 may be configured to communicate with one or more peripheral device(s) 1320 over respective wireless communication paths. Each such wireless communication path may take any of various forms and carry data according to any of various different communication protocols. For instance, each respective wireless communication path between the client device(s) 1310 and the peripheral device(s) 1320 may include any one or more of a wireless point-to-point link (e.g., radio frequency identification (RFID) link such as a near-field communications (NFC) link, etc.), a wireless PAN (e.g., a Bluetooth® or Zigbee PAN), and/or a wireless LAN (e.g., a WiFi LAN), etc.), among other possibilities. Many other configurations are also possible.

It should be understood that the computing environment 1300 is one example of a computing environment in which the disclosed software technology may be implemented, and that numerous other examples of computing environments are possible as well.

Figure 14A:
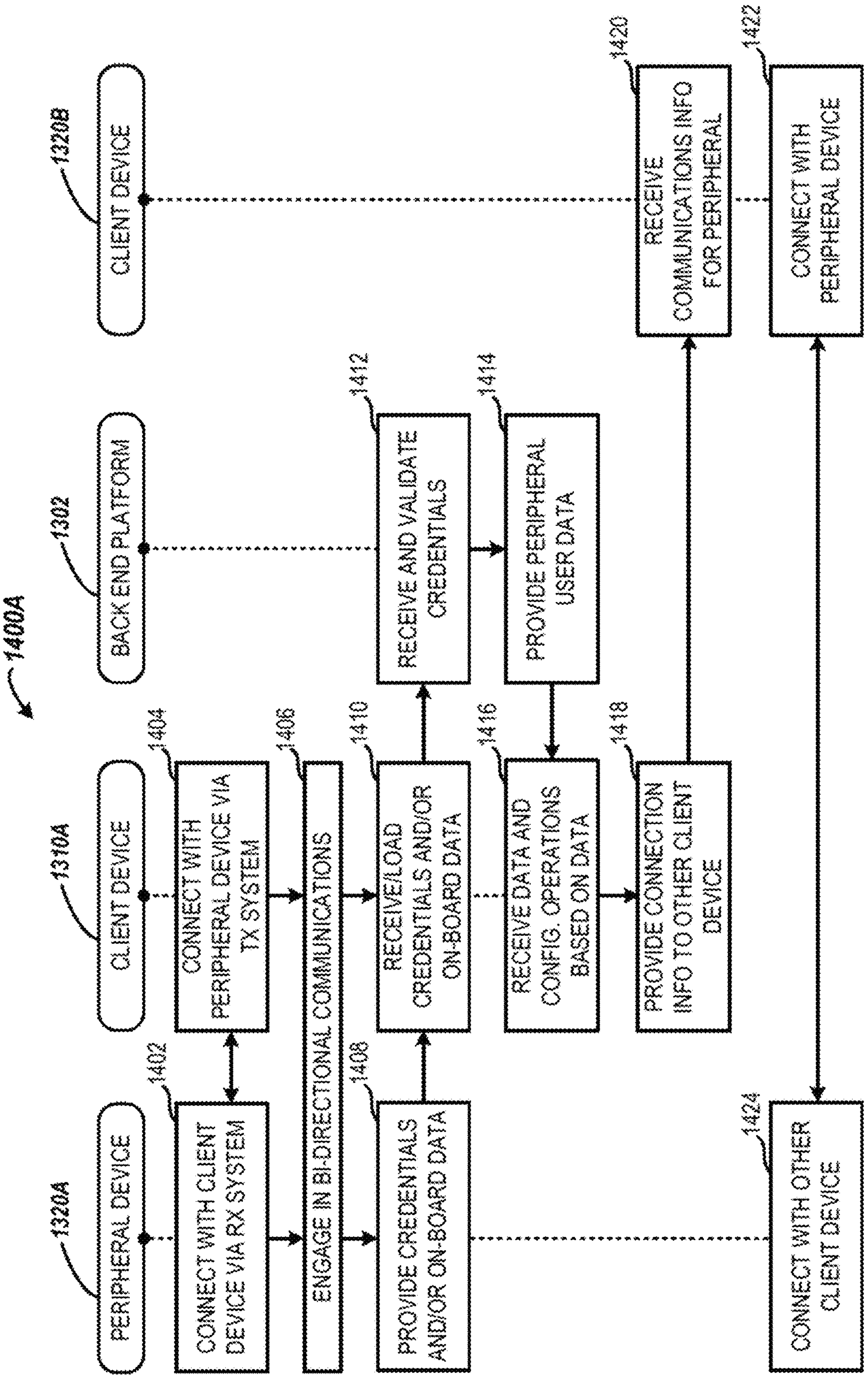
FIG. 14A is a flow diagram that illustrates example functionality that may be carried out amongst a computing environment for device synchronization.
Figure 14B:
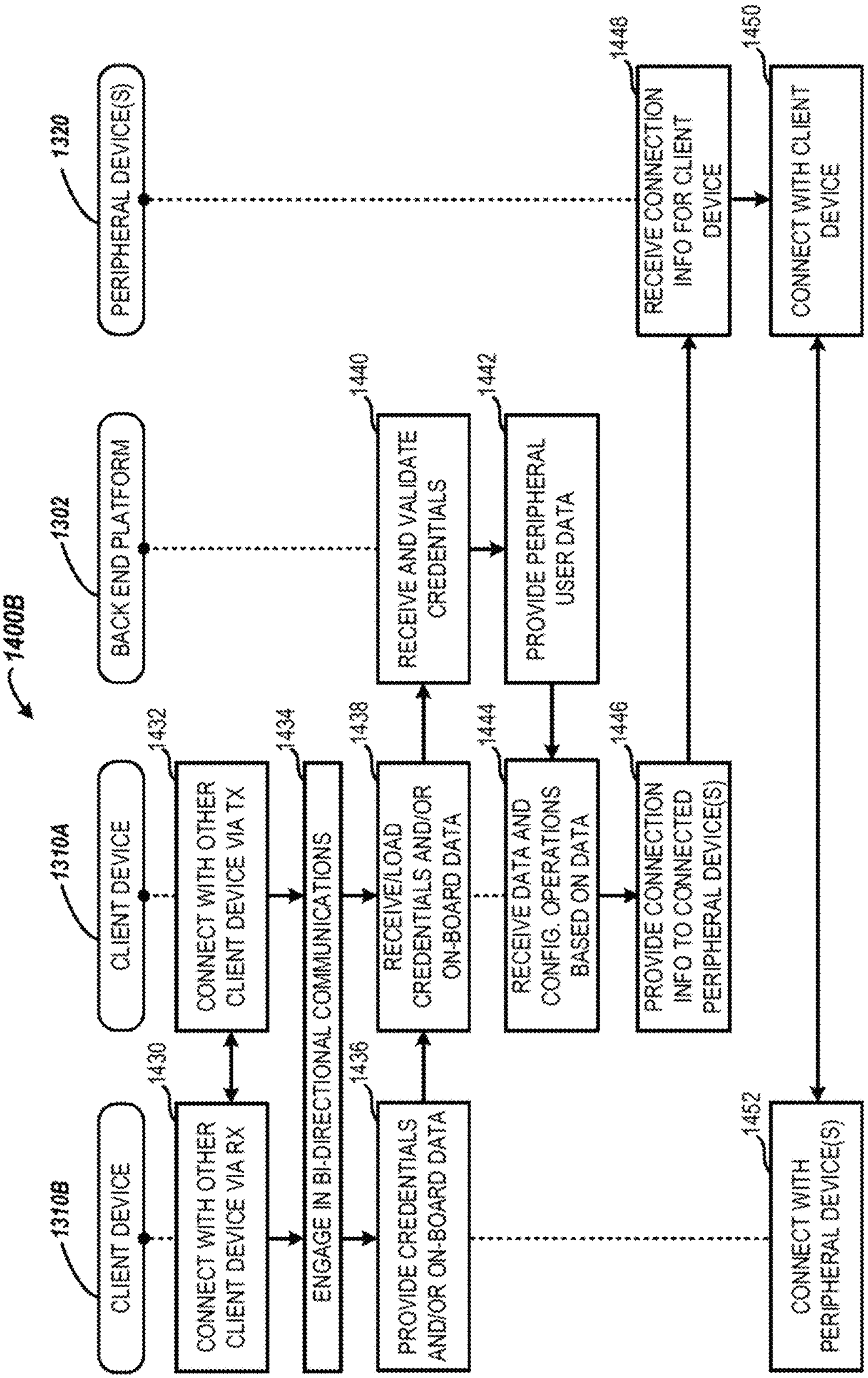
FIG. 14B is a flow diagram that illustrates other example functionality that may be carried out amongst a computing environment for device synchronization.

Possible implementations of the functionality that is carried out in accordance with the disclosed technology is illustrated in FIGS. 14A and 14B. For purposes of illustration, example functionality 1400A, 1400B of FIGS. 14A, 14B is described as being carried out by the devices within the example computing environment 1300 of FIG. 13, but it should be understood that the example functionality 1400A, 1400B of FIGS. 14A, 14B may be carried out by any other computing devices, systems, and/or platforms that are capable of implementing the disclosed technology. Further, it should be understood that the example functionality of FIGS. 14A, 14B are merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

As shown in FIG. 14A, the example functionality 1400A may begin at block(s) 1402 and 1404, wherein a peripheral device 1320A and a client device 1310A connect with one another via the NFMI connection established using the systems 120, 150. This connection may take the form of electromagnetic coupling between the systems 120, 150. The devices 1320A, 1310A may then, via the systems 120, 150, engage in bi-directional communications, as illustrated in block 1406.

At block 1408, via the established bi-directional communication link, the peripheral device 1320A may provide user-based credentials and/or on-board data to the client device 1310A, via the NFMI connection established between the systems 120, 150. For example, the on-board data of the peripheral device 1320A may comprise one or more of user-based data (e.g., login credentials, user preferences, account information for software associated with the peripheral device, biometric data associated with the user, etc.), system configuration data for the peripheral device 1320A (e.g., system settings, pre-set controls, macros and/or user-defined shortcuts, parameters and/or limits for use, etc.), software-associated data (e.g., save data for a computer program and/or video game, configuration data for software applications on the client device 1310A but associated with the peripheral device 1320A, shared data files, etc.), among other forms of data.

At block 1410, the client device 1310A may receive and/or load the credentials and/or on-board data that were transmitted, via the NFMI connection between the systems 120, 150, from the peripheral device 1320A. While additional steps are illustrated, the bi-directional sharing of information between the peripheral device 1320A and the client device 1310A may end the operations of the functionality 1400A, when applicable for a given task-such as data sharing and/or device synchronization between the two devices. However, as discussed in more detail below, the functionality 1400A may include additional functionality for further utilizing NFMI technology to synchronize the device ecosystem.

In some examples, the information received at block 1410 by the client device 1310A comprises credentials for use of at least one software application or data object on the client device 1310A. In such examples, the functionality 1400A may further include the client device transmitting and a back-end platform receiving said credentials and/or a request to validate the credentials, which may be then validated or denied by the back-end platform, as depicted in block 1412. In practice, this request may take the form of one or more request messages (e.g., one or more HTTP messages) that are sent over the respective communication path between the client device 1310A and the back-end computing platform 1302 (which as noted above may include at least one data network), and in at least some implementations, the one or more request messages may be sent via an API.

In some such examples, after the credentials are validated at block 1412, the back-end platform 1302 may locate, in data storage, peripheral user data associated with the peripheral device 1320A and/or the user thereof and then provide said peripheral data to the client device 1310A, which is in connection with the peripheral device 1320A, as depicted in block 1416. In some such examples, the peripheral user data, as received from the back-end platform 1302 based on credentials provided by the peripheral device 1320A, may then be utilized by the client device 1310A to configure the peripheral device 1320A for use with the client device 1310A based on some user-based settings contained in the peripheral user data.

In some other examples, after the bi-directional communications are established between the peripheral device 1320A and the client device 1310A, the client device 1310A may then provide connection information associated with the peripheral device 1320A to, for example, another client device 1310B within the device ecosystem and associated with the user, as depicted in block 1418. In such examples, this may cause the client device 1310B to receive the communications information for the peripheral device (block 1420) then this may result in establishing a connection, via some wireless or wired means, between the peripheral device 1320A and the other client device 1310B (blocks 1422, 1424).

For example, the connection process of blocks 1418, 1420, 1422, 1424 may take the form of sharing of communications protocol information (e.g., Bluetooth addresses, MAC addresses, Wi-Fi-based connectivity) between the other client device 1310B and the peripheral device 1320A and subsequently entering into bi-directional communications via said communications protocol.

In some examples, the second client device 1310B may also connect to the client device 1310A via a NFMI connection, be it via the same wireless transmission system 120 that the peripheral device 1320A connects to the client device 1310A by or via another wireless transmission system 120. For example, the client device 1310B may comprise a mobile device or a tablet computer, having a wireless receiver system 150, and the client device 1310A may be operatively associated with or connected to a wireless charger (e.g., a Qi-certified charger, a Qi 2.0 certified charger, etc.) and bi-directional communications may be established between the client devices 1310A, 1310B, via the wireless charger. In such examples, the connectivity functionality of blocks 1418, 1420, 1422 may be carried out via an NFMI connection between systems 120, 150.

Another possible implementation of functionality 1400B that is carried out in accordance with the disclosed software technology is illustrated in FIG. 14B. For purposes of illustration, example functionality 1400B of FIG. 14B is described as being carried out by the devices within the example computing environment 1300 of FIG. 13, but it should be understood that the example functionality 1400B of FIG. 14B may be carried out by any other computing devices, systems, and/or platforms that are capable of implementing the disclosed software technology. Further, it should be understood that the example functionality of FIG. 14B is merely described in this manner for the sake of clarity and explanation and that the example functionality may be implemented in various other manners, including the possibility that functions may be added, removed, rearranged into different orders, combined into fewer blocks, and/or separated into additional blocks depending upon the particular embodiment.

As shown in FIG. 14B, the example functionality 1400B may begin at block(s) 1430 and 1432, wherein a client device 1310B and a client device 1310A connect with one another via the NFMI connection established using the systems 120, 150. This connection may take the form of electromagnetic coupling between the systems 120, 150 and devices 1310A, 1310B may then, via the systems 120, 150, engage in bi-directional communications, as illustrated in block 1434.

For example, the client device 1310B may comprise a mobile device or a tablet computer, having a wireless receiver system 150, and the client device 1310A may be operatively associated with or connected to a wireless charger (e.g., a Qi-certified charger, a Qi 2.0 certified charger, etc.) and bi-directional communications may be established between the client devices 1310A, 1310B, via the wireless charger.

At block 1436, via the established bi-directional communications, the client device 1310B may provide user-based credentials and/or on-board data to the client device 1310A, via the NFMI connection established between the system 120, 150. For example, the on-board data of the client device 1310B may comprise one or more of user-based data (e.g., login credentials, user preferences, account information for software associated with the client device, biometric data associated with the user, etc.), system configuration data for the client device 1310B (e.g., system settings, pre-set controls, macros and/or user-defined shortcuts, parameters and/or limits for use, etc.), software-associated data (e.g., save data for a computer program and/or video game, configuration data for software applications on the client device 1310A but associated with the client device 1310B, shared data files, etc.), among other forms of data.

At block 1438, the client device 1310A may receive and/or load the credentials and/or on-board data that were transmitted, via the NFMI connection between the systems 120, 150, from the client device 1310B. While additional steps are illustrated, the bi-directional sharing of information between the peripheral device 1320A and the client device 1310A may end the operations of the functionality 1400B, when applicable for a given task-such as data sharing and/or device synchronization between the two devices. However, as discussed in more detail below, the functionality 1400B may include additional functionality for further utilizing NFMI technology to synchronize the device ecosystem.

In some examples, the information received at block 1438 by the client device 1310A comprises credentials for use of at least one software application or data object on the client device 1310A. In such examples, the functionality 1400A may further include the client device transmitting and a back-end platform receiving said credentials and/or a request to validate the credentials, which may be then validated or denied by the back-end platform, as depicted in block 1440. In practice, this request may take the form of one or more request messages (e.g., one or more HTTP messages) that are sent over the respective communication path between the client device 1310A and the back-end computing platform 1302 (which as noted above may include at least one data network), and in at least some implementations, the one or more request messages may be sent via an API.

In some such examples, after the credentials are validated at block 1440, the back-end platform 1302 may locate, in data storage, client device user data associated with the client device 1310B and/or the user thereof and then provide said peripheral data to the client device 1310A, which is in connection with the client device 1310B, as depicted in block 1442. In some such examples, the client device user data, as received from the back-end platform 1302 based on credentials provided by the client device 1310B, may then be utilized by the client device 1310A to configure the client device 1310B for use with the client device 1310A based on some user-based settings contained in the client device user data.

In some other examples, after the bi-directional communications are established between the client device 1310B and the client device 1310A, the client device 1310A may then provide connection information associated with the client device 1310B to, for example, a peripheral device 1320 within the device ecosystem and associated with the user, as depicted in block 1446. In such examples, this may cause the peripheral device 1320 to receive the communications information for the client device 1310B (block 1448) then this may result in establishing a connection, via some wireless or wired means, between the peripheral device 1320 and the client device 1310B (blocks 1450, 1452).

For example, the connection process of blocks 1446, 1448, 1450, 1452 may take the form of sharing of communications protocol information (e.g., Bluetooth addresses, MAC addresses, Wi-Fi-based connectivity) between the client device 1310B and the peripheral device 1320 and subsequently entering into bi-directional communications via said communications protocol.

Figure 15:
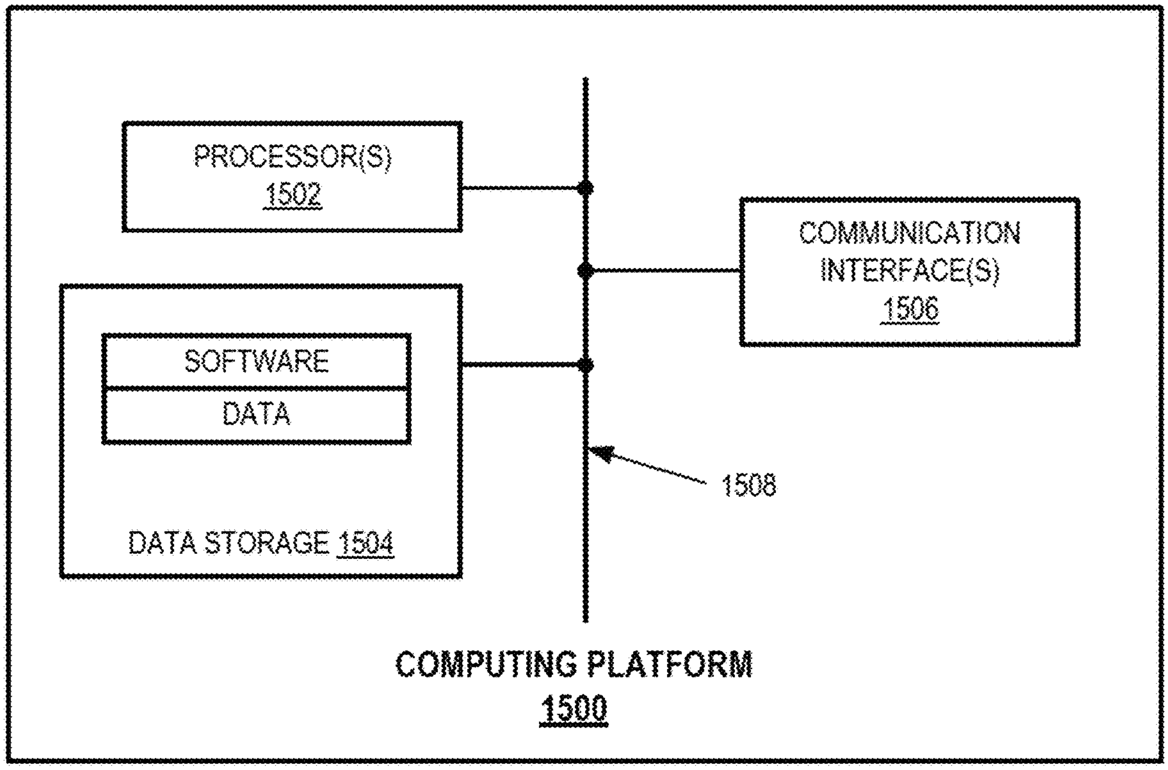
FIG. 15 is a simplified block diagram illustrating some structural components that may be included in an example computing platform that may be configured to perform some or all of the server-side functions disclosed herein.

Turning now to FIG. 15, a simplified block diagram is provided to illustrate some structural components that may be included in an example computing platform 1500 that may be configured to perform some or all of the platform-side functions disclosed herein. At a high level, computing platform 1500 may generally comprise any one or more computer systems (e.g., one or more servers) that collectively include one or more processors 1502, data storage 1504, and one or more communication interfaces 1506, all of which may be communicatively linked by a communication link 1508 that may take the form of a system bus, a communication network such as a public, private, or hybrid cloud, or some other connection mechanism. Each of these components may take various forms.

For instance, the one or more processors 1502 may comprise one or more processor components, such as one or more central processing units (CPUs), graphics processing units (GPUs), application-specific integrated circuits (ASICs), digital signal processors (DSPs), and/or programmable logic devices such as field programmable gate arrays (FPGAs), among other possible types of processing components. In line with the discussion above, it should also be understood that the one or more processors 502 could comprise processing components that are distributed across a plurality of physical computing devices connected via a network, such as a computing cluster of a public, private, or hybrid cloud.

In turn, data storage 1504 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 504 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 15, data storage 1504 may be capable of storing both (i) program instructions that are executable by the one or more processors 1502 such that the computing platform 1500 is configured to perform any of the various functions disclosed herein (including but not limited to any of the server-side functions discussed above), and (ii) data that may be received, derived, or otherwise stored by computing platform 1500.

The one or more communication interfaces 1506 may comprise one or more interfaces that facilitate communication between the computing platform 1500 and other systems or devices, where each such interface may be wired and/or wireless and may communicate according to any of various communication protocols. As examples, the one or more communication interfaces 1506 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

Although not shown, the computing platform 1500 may additionally have an I/O interface that includes or provides connectivity to I/O components that facilitate user interaction with the computing platform 1500, such as a keyboard, a mouse, a trackpad, a display screen, a touch-sensitive interface, a stylus, a virtual-reality headset, and/or one or more speaker components, among other possibilities.

It should be understood that computing platform 1500 is one example of a computing platform that may be used with the embodiments described herein. Numerous other arrangements are possible and contemplated herein. For instance, in other embodiments, the computing platform 1500 may include additional components not pictured and/or more or less of the pictured components.

Figure 16:
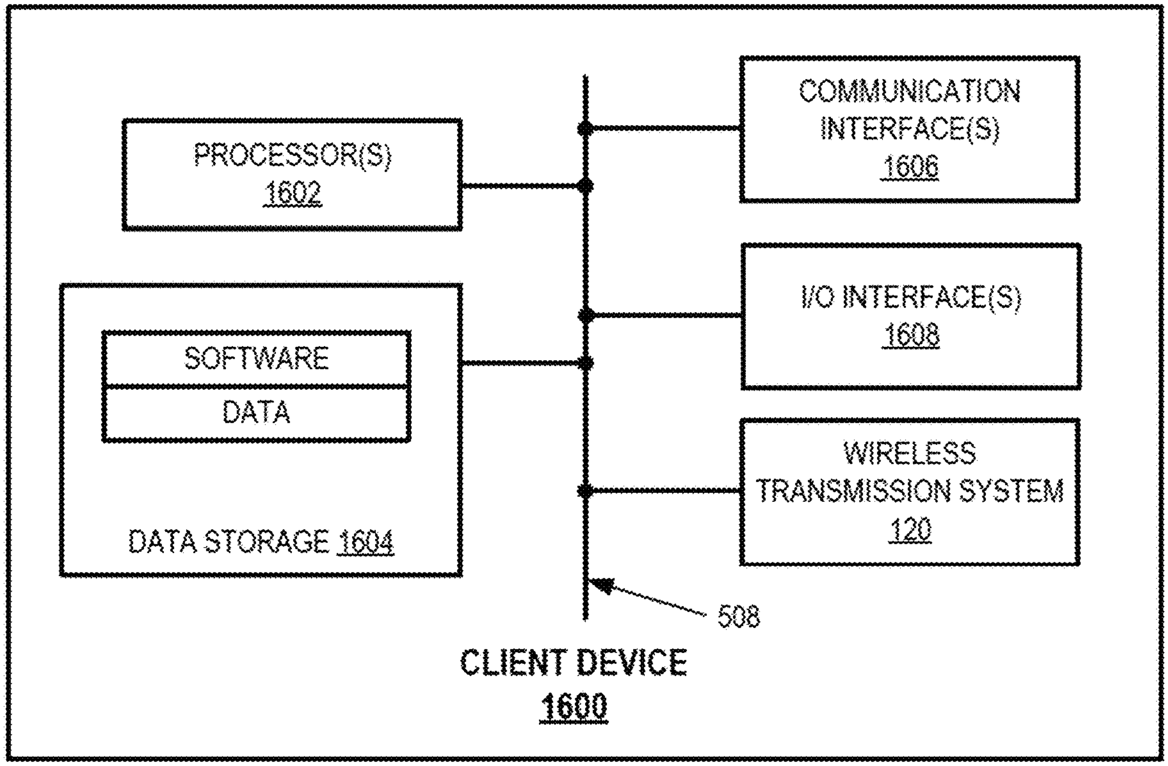
FIG. 16 is a simplified block diagram illustrating some structural components that may be included in an example client device that may be configured to perform some or all of the client-side functions disclosed herein.

Turning next to FIG. 16, a simplified block diagram is provided to illustrate some structural components that may be included in an example client device 1600 that may be configured to perform some or all of the client-side functions disclosed herein. At a high level, the example client device 1600 may include one or more processors 1602, data storage 1604, one or more communication interfaces 1606, and an I/O interface 1608, all of which may be communicatively linked by a communication link 1610 that may take the form a system bus and/or some other connection mechanism. Each of these components may take various forms.

For instance, the one or more processors 1602 of the example client device 1600 may comprise one or more processor components, such as one or more CPUs, GPUs, ASICS, DSPs, and/or programmable logic devices such as FPGAs, among other possible types of processing components.

In turn, the data storage 1604 of the example client device 1600 may comprise one or more non-transitory computer-readable mediums, examples of which may include volatile storage mediums such as random-access memory, registers, cache, etc. and non-volatile storage mediums such as read-only memory, a hard-disk drive, a solid-state drive, flash memory, an optical-storage device, etc. As shown in FIG. 16, data storage 1604 may be capable of storing both (i) program instructions that are executable by the one or more processors 1602 of the example client device 1600 such that the client device 1600 is configured to perform any of the various functions disclosed herein (including but not limited to any of the client-side functions discussed above), and (ii) data that may be received, derived, or otherwise stored by the client device 1600.

The one or more communication interfaces 1606 may comprise one or more interfaces that facilitate communication between the client device 1600 and other systems or devices, where each such interface may be wired and/or wireless and may communicate according to any of various communication protocols. As examples, the one or more communication interfaces 1606 may take include an Ethernet interface, a serial bus interface (e.g., Firewire, USB 3.0, etc.), a chipset and antenna adapted to facilitate any of various types of wireless communication (e.g., Wi-Fi communication, cellular communication, Bluetooth® communication, etc.), and/or any other interface that provides for wireless or wired communication. Other configurations are possible as well.

The I/O interface 1608 may generally take the form of (i) one or more input interfaces that are configured to receive and/or capture information at the example client device 1600 and (ii) one or more output interfaces that are configured to output information from the example client device 1600 (e.g., for presentation to a user). In this respect, the one or more input interfaces of I/O interface may include or provide connectivity to input components such as a microphone, a camera, a keyboard, a mouse, a trackpad, a touchscreen, and/or a stylus, among other possibilities, and the one or more output interfaces of I/O interface may include or provide connectivity to output components such as a display screen and/or an audio speaker, among other possibilities.

Further still, as illustrated, the client device 1600 may include or be operatively associated with a wireless transmission system 120, such as those discussed above. In some examples the wireless transmission system 120 may be an external device connected to the client device 1600 (e.g., a wireless power transmitter connected to computer via USB) and/or the wireless transmission system may be physically part of or embedded in the client device 1600. In some additional or alternative examples (e.g., the client device 1310B of FIG. 13), the client device 1600 may include a wireless receiver system 150, such as those discussed above (e.g., a mobile device with an embedded wireless power receiver and associated antenna, which is connectable to a wireless transmission system of or associated with another client device). The client device(s) 1600 may include or be operatively associated with components of the wireless power and data transfer system 100 in various other forms as well.

It should be understood that the example client device 1600 is one example of a client device that may be used with the example embodiments described herein. Numerous other arrangements are possible and contemplated herein. For instance, in other embodiments, the example client device 1600 may include additional components not pictured and/or more or fewer of the pictured components.

Figure 17:
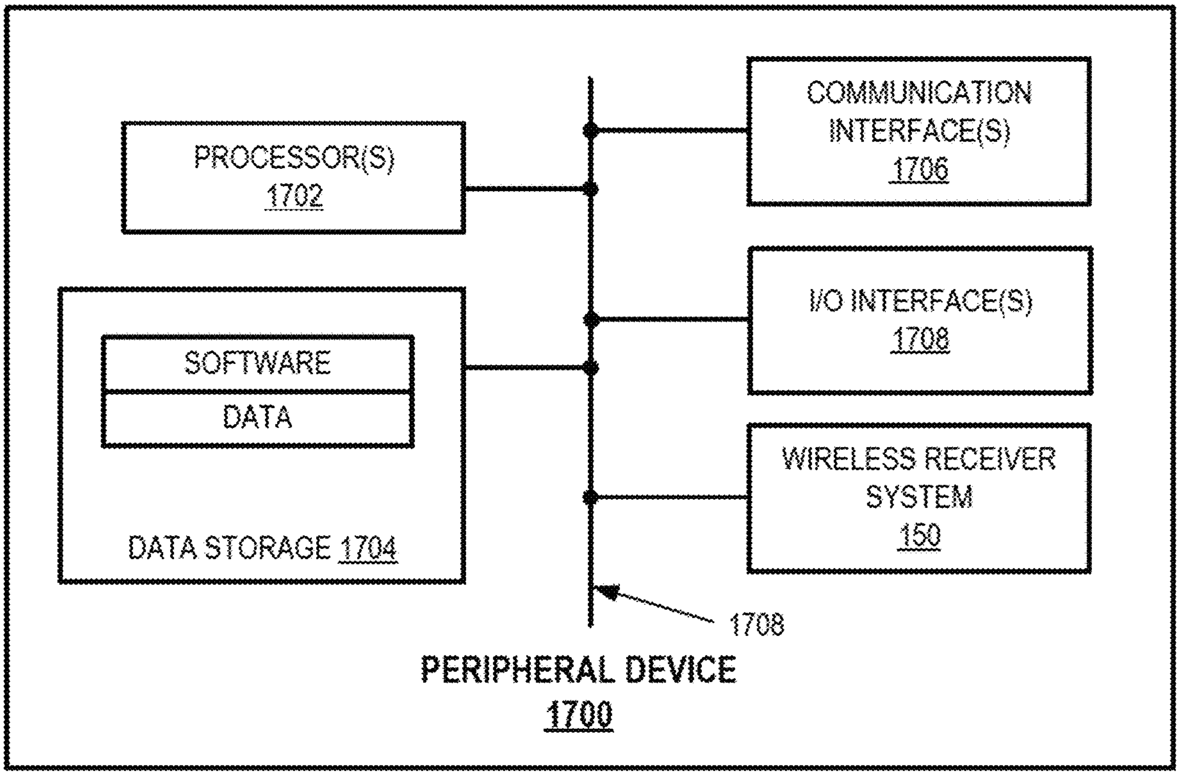
FIG. 17 is a simplified block diagram illustrating some structural components that may be included in an example payment card that may be configured to perform some or all of the peripheral device functions disclosed herein.

Turning next to FIG. 17, a simplified block diagram is provided to illustrate some structural components that may be included in an example peripheral device that may be configured to perform some or all of the peripheral device functions disclosed herein. At a high level, the peripheral device 1700 may include one or more processor(s) 1702, data storage 1704, power storage 1706, and one or more wireless communication interfaces 1710, each of which may be communicatively linked by a communication link 1705 that may take the form an electrical connection, communication bus, and/or some other connection mechanism. Each of these components may take various forms, and may be integrated together in whole or in part (e.g., as part of an integrated circuit, a microchip, or the like).

For instance, the one or more processors 1702 of the example peripheral device 1700 may comprise one or more processor components, such as one or more CPUs, ASICS, DSPs, and/or programmable logic devices such as FPGAs, among other possible types of processing components.

In turn, the data storage 1704 may include one or more non-volatile storage mediums and one or more non-volatile storage mediums, which may be collectively capable of storing both (i) program instructions that are executable by the one or more processors 1702 such that the peripheral device 1700 is configured to perform any of the various peripheral device functions disclosed herein, and (ii) data that may be received, derived, or otherwise stored by the peripheral device 1700 in accordance with the present disclosure (e.g., user data associated with the peripheral device).

The power storage 1706 may comprise any power-storage component (e.g., a capacitor, a battery) that serves to supply power to the various components of the peripheral device 1700 for performing one or more of the functions described herein. Such a power-storage component may source power from external sources, such as an external battery or a battery-powered computing device that the peripheral device 1700 can directly or indirectly connect to, such as a merchant system or a client device. In some implementations, the peripheral device 1700 may alternatively or additionally comprise a battery component that serves to receive and supply power to the various components of the peripheral device 1700. Such a battery component may take any of various forms now known or later discovered, including an embedded rechargeable battery, such as a solar strip or cell, among other possibilities. In some other implementations, the peripheral device 1700 may be capable of inductive power receipt or charging of the peripheral device 1700.

The one or more wireless communication interfaces 1710 may comprise one or more interfaces that facilitate communication between the peripheral device 1700 and another device (e.g., a client device), where each such interface may communicate according to any of various wireless communication protocols. Other configurations are possible as well.

Further still, as illustrated, the peripheral device 1700 may include or be operatively associated with a wireless receiver system 150, such as those discussed above. In some examples the wireless receiver system 150 may be an external device connected to the peripheral device 1700 and/or the wireless transmission system may be physically part of or embedded in the peripheral device 1700. In some additional or alternative examples, the peripheral device 1700 may include a wireless transmission system 120. The peripheral device 1700 may include or be operatively associated with components of the wireless power and data transfer system 100 in various other forms as well.

It should be understood that the example peripheral device 1700 is one example of a payment card that may be used with the example embodiments described herein. Numerous other arrangements are possible and contemplated herein. For instance, in other embodiments, the example peripheral device 1700 may include additional components not pictured and/or more or fewer of the pictured components.

Example peripheral devices for utilization in accordance with the above technology are illustrated in FIGS. 18A-21B. Each of the example peripheral devices of FIGS. 18A-21B may include or otherwise be operatively associated with a wireless receiver system 150.

Figure 18A:
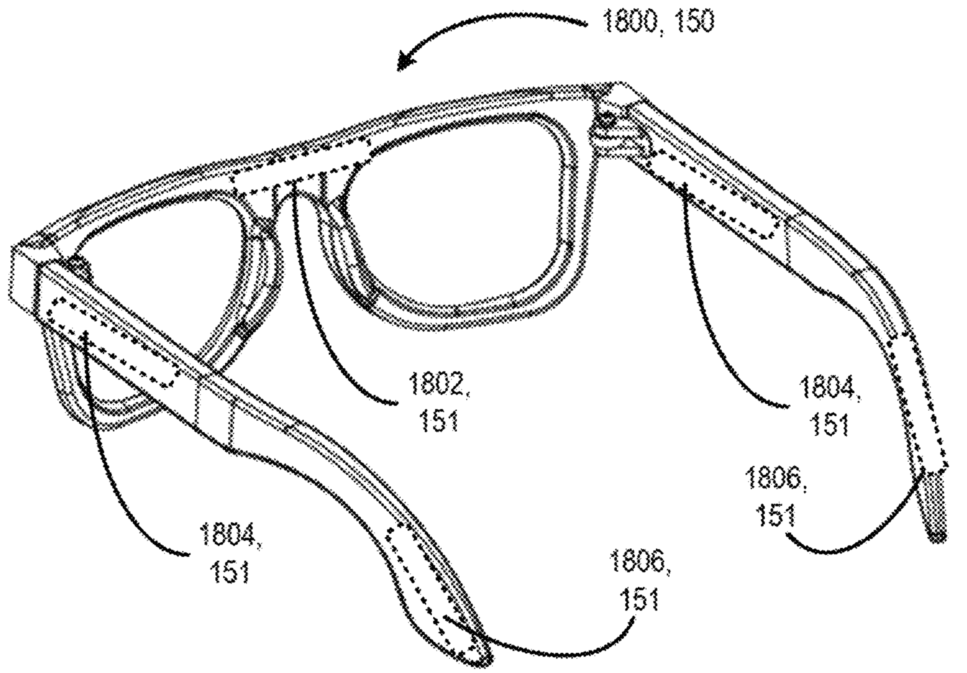
FIG. 18A is an isometric view of example eyewear, within which the wireless power and data transfer systems disclosed herein may be implemented for wireless power and data transfer to the eyewear.

FIG. 18A is an exemplary illustration of eyewear 1800, in which the wireless receiver system 150 and/or any components thereof may be integrated within the eyewear 1800, such that electronic components within and/or associated with the eyewear can receive power from a wireless transmission system 120, via the wireless receiver system 150. Eyewear may be any face-wearable accessory and/or device that covers, at least in part, at least one eye of a user. Eyewear may include, but is not limited to including, eyeglasses, prescription eyeglasses, reading glasses, fashion glasses, electronic glasses, sunglasses, smart glasses with integrated electronics, hearing aid glasses, speaker enabled glasses, altered reality (AR) glasses, virtual reality (VR) glasses, glasses with screens and/or projectors within or associated with lenses, among other contemplated eyewear. The wireless receiver system 150 integrated with the eyewear 1800 may be utilized to charge a battery or other storage device of or associated with the eyewear and/or the wireless receiver system 150 may be configured to directly power one or more components of or associated with the eyewear 1800.

Figure 18B:
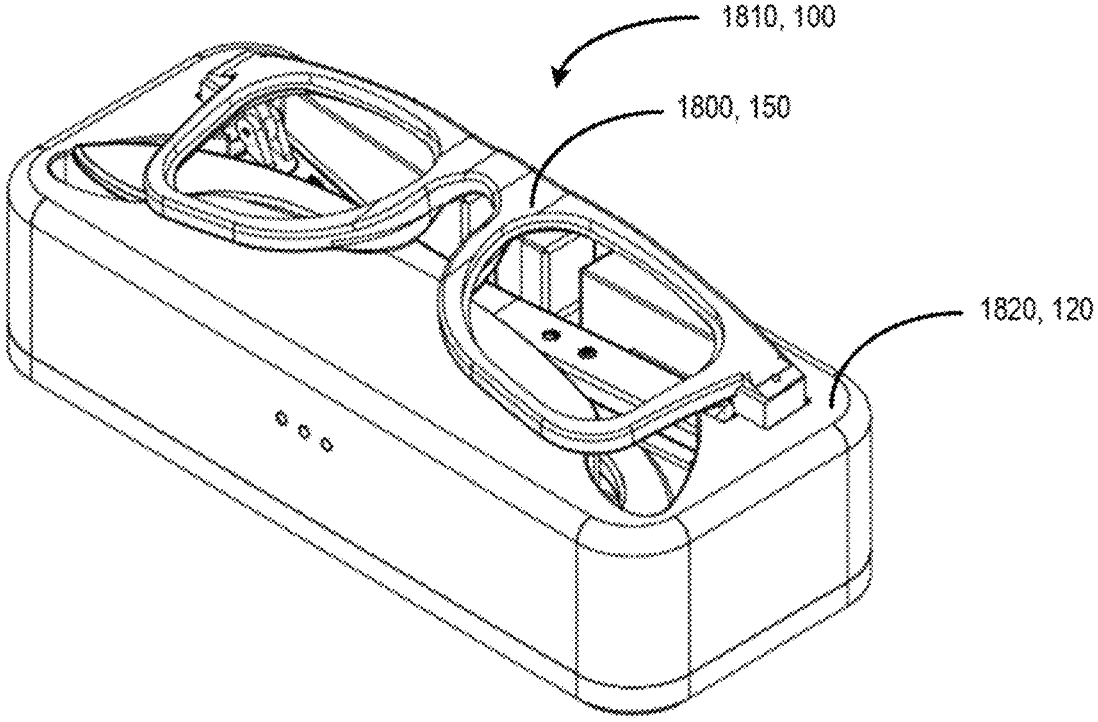
FIG. 18B is an isometric view of the exemplary eyewear of FIG. 18A and an associated case for the eyewear, within which the wireless power and data transfer systems disclosed herein may be implemented for wireless power and data transfer to the eyewear.

FIG. 18B illustrates the eyewear 1800 of FIG. 18B combining with a receptacle 1820, which includes the wireless transmission system 120 integrated and/or operatively associated with the receptacle 1820. The eyewear 1800 and the receptacle 1820 combine as an electronic eyewear system 1810, which integrates the wireless power and data transfer system 100 therein. The receptacle 1820 may be any surface, device, and/or container in which the eyewear 1800 interacts such that the integrated wireless receiver system 150 and integrated wireless transmission system 120 are capable of coupling for wireless power and data transfer. Receptacles 1820 may include, but are not limited to including, cases, pouches, holders, stands, surfaces, among other things. It is to be noted that the form-factors illustrated for the eyewear 1800 and/or the receptacle 1820 are merely exemplary and are not intended to limit the scope of the disclosure; other form factors for eyewear 1800 and/or receptacle(s) 1820 are certainly contemplated.

Figure 19A:
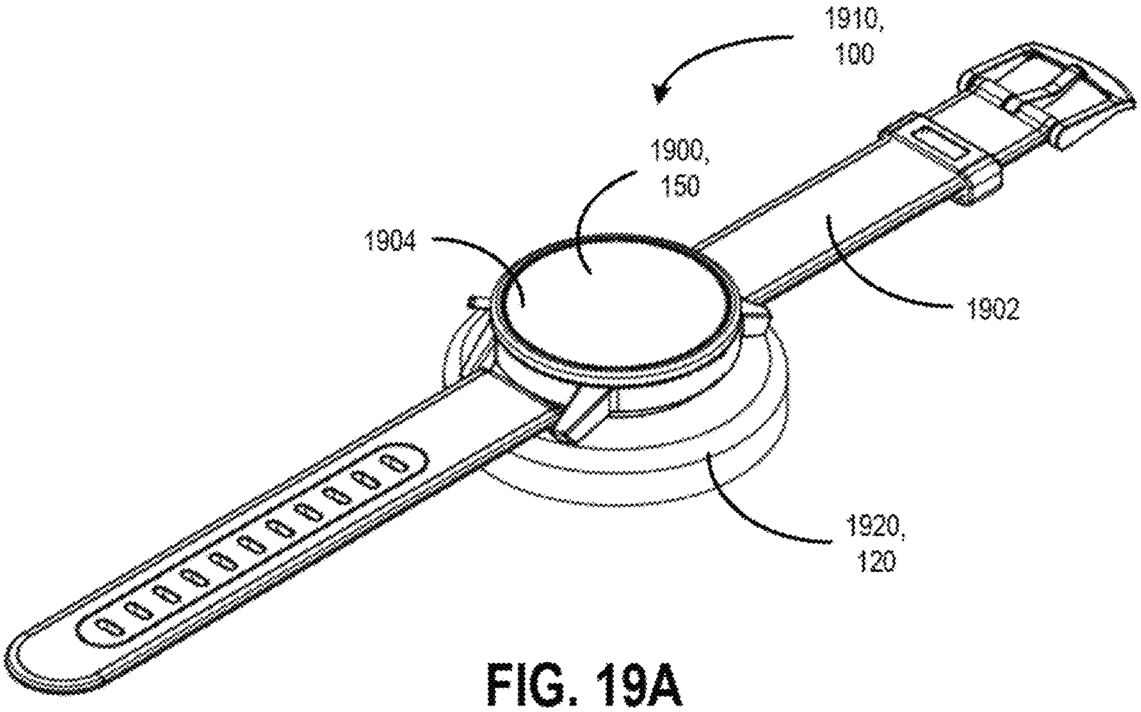
FIG. 19A is an isometric view of a wearable device and an associated charger for the wearable device, within which the wireless power and data transfer systems disclosed herein may be implemented for wireless power transmission from the charger to the wearable device, within which the wireless power and data transfer systems disclosed herein may be implemented for wireless power and data transfer to the wearable device.
Figure 19B:
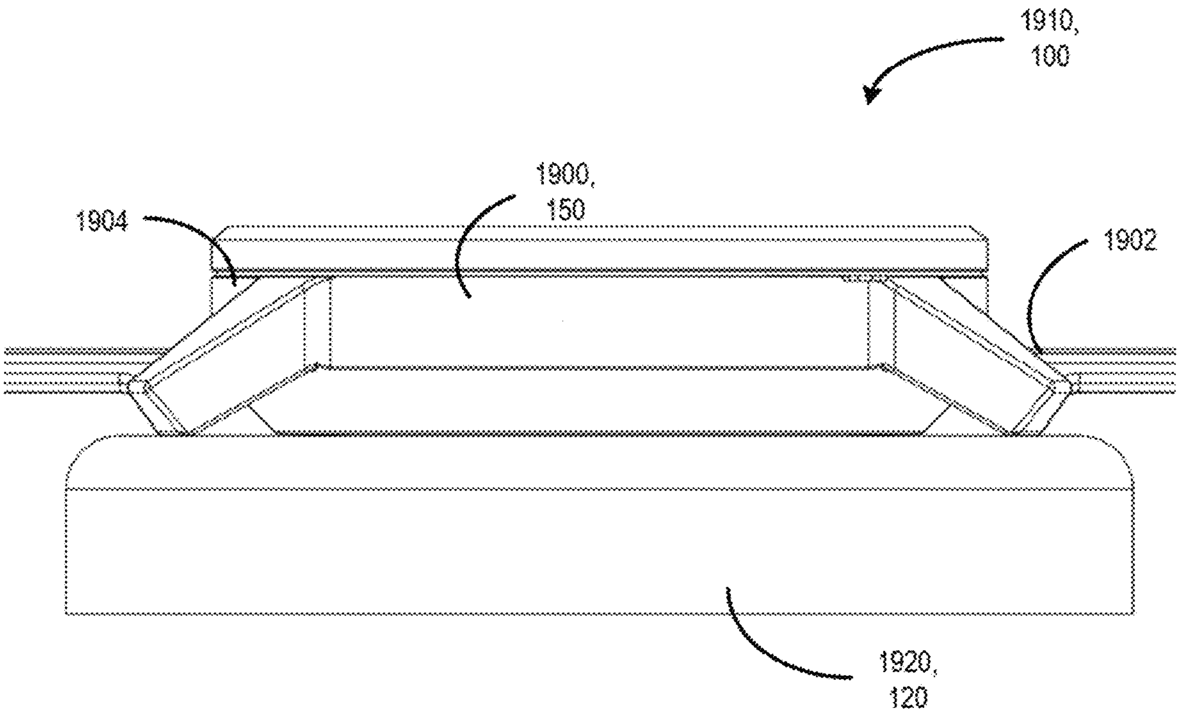
FIG. 19B is a side view of the wearable device and charger of FIG. 19A.

FIGS. 19A and 19B illustrate an example wearable device system 1910, which may incorporate or be operatively associated with the wireless power and data transfer system 100. FIG. 19A is an isometric view of the wearable device system 1910, when components are operatively in position for wireless power transfer, and FIG. 19B is a side view of the system 1910, in similar positioning. The wearable device system 1910 includes, at least, a wearable device 1900, which includes, is integrated with, and/or is operatively associated with the wireless receiver system 150. As used herein, a "wearable device" refers to any limb-wearable (e.g., wrist-wearable, ankle-wearable, leg-wearable, shoulder-wearable, forearm-wearable, upper-arm wearable, thigh-wearable, calf-wearable, hand-attached, foot-attached, etc.) and/or body wearable (chest-wearable, neck wear-able, waist-wearable, mid-section-wearable, etc.) electronic device that may require and/or benefit from receiving electrical power for some function. In some examples, such a wearable device may include a strap and/or connector (e.g., the strap 1902 of the wearable device 1900) utilized for connecting the wearable device to a user. Exemplary wearable devices include, but are not limited to including, smart watches, watches, fitness trackers, fitness bands, sleep monitors, heart rate monitors, medical devices, ankle monitors, tracking devices, industrial tracking and/or safety devices, identification devices, wearable peripherals for AR systems, wearable peripherals for VR systems, wearable peripherals for gaming consoles and/or platforms, among other wearable devices. The wireless receiver system 150 integrated with the wearable device 1900 may be utilized to charge a battery or other storage device of or associated with the wearable device 1900 and/or the wireless receiver system 150 may be configured to directly power one or more components of or associated with the wearable device 1900. As illustrated, the wearable device system 1910 further includes a charger 1920, which includes the wireless transmission system 120 integrated with and/or operatively associated with the charger 1920. The charger 1920 may be any surface, device, object, and/or container in which the wearable device 1900 interacts such that the integrated wireless receiver system 150 and integrated wireless transmission system 120 are capable of coupling for wireless power and data transfer. The charger 1920 may be and/or include any surfaces, proprietary devices, multi-device chargers, integrated chargers, cases, stands, holders, receptacles, and/or pouches, among other things. It is to be noted that the form-factors illustrated for the wearable device 1900 and/or the charger 1920 are merely exemplary and are not intended to limit the scope of the disclosure; other form factors for the wearable device 1900 and/or the charger 1920 are certainly contemplated.

Figure 20A:
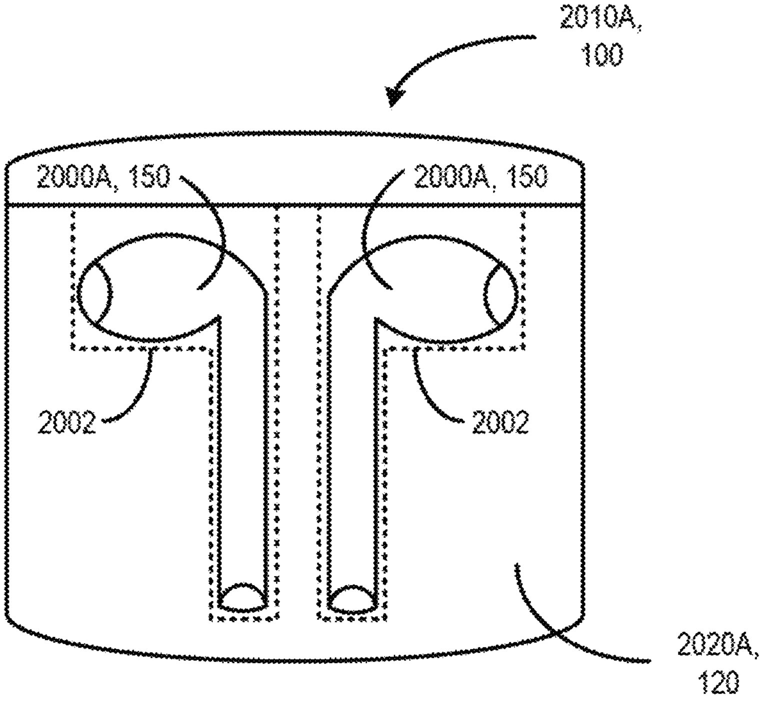
FIG. 20A is a side view, with cross-sectional denotations, of exemplary earbuds and an associated charging case, within which the wireless power and data transfer systems disclosed herein may be implemented for wireless power and data transfer to the earbuds.

FIG. 20A is a side view of an example listening device system 2010A which may incorporate or be operatively associated with the system 100. The listening device system 2010A includes, at least, one or more listening devices 2000A, which include, are integrated with, and/or are operatively associated with the wireless receiver system 150. As used herein, a "listening device" may include any portable device designed to output sound that can be heard by a user, such as headphones, earbuds, canalphones, over ear headphones, ear-fitting headphones, headsets, digital conferencing headsets, among other listening devices. Headphones are one type of portable listening device, while portable speakers are another. The term "headphones" represents a pair of small, portable listening devices that are designed to be worn on or around a user's head. Such devices convert an electrical signal to a corresponding sound that can be heard by the device. Headphones include traditional headphones that are worn over a user's head and include left and right listening devices connected to each other by a head band, headsets, and earbuds.

Earbuds may be defined as small headphones that are designed to be fitted directly in a user's ear. As used herein, the term "earbuds," which can also be referred to as earphones or ear-fitting headphones, includes both small headphones that fit within a user's outer ear facing the ear canal without being inserted in the ear canal, and in-ear headphones, sometimes referred to as canalphones, that are inserted in the ear canal itself. The wireless receiver system 150 integrated with the listening device(s) 2000 may be utilized to charge a battery or other storage device of or associated with the listening device(s) 2000 and/or the wireless receiver system 150 may be configured to directly power one or more components of or associated with the listening device(s) 2000.

As illustrated, the listening device system 2010A includes a case 2020A, which includes the wireless transmission system 120 integrated and/or operatively associated with the case 2020A. The case 2020 may be any container, receptacle, case, housing, flexible plastic housing, cloth case, leather case, among other things, in which the listening device(s) 2000A may reside, at least in part, in a manner in which the wireless receiver system 150 and the wireless transmission system 120 of the case 2020A are capable of coupling for wireless power and data transfer. In some examples, such as the illustration of FIG. 20A, the case 2020A may define one or more mechanical features 2002, which are configured for aligning the wireless transmission system 120 with the wireless receiver system 150 for proper placement for wireless power transfer.

Figure 20B:
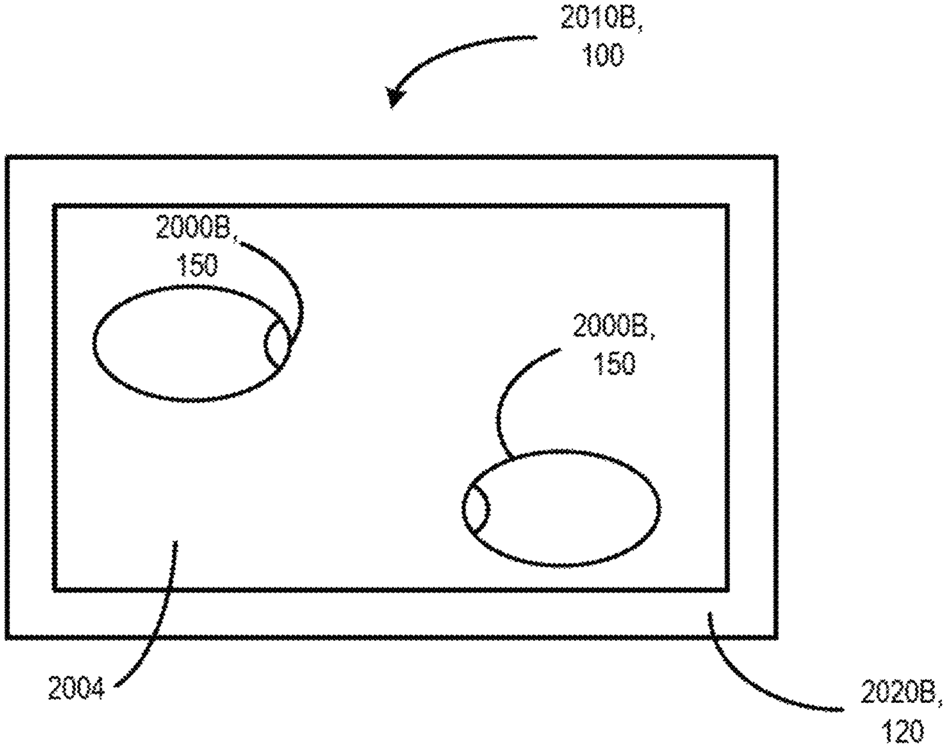
FIG. 20B is a side view of alternative exemplary earbuds and an associated charging surface, within which the wireless power and data transfer systems disclosed herein may be implemented for wireless power and data transfer to the earbuds.

FIG. 20B is another embodiment of an exemplary listening device system 2010B, wherein listening device(s) 2000B include and/or are operatively associated with the wireless receiver system 150 and a charging surface 2020B is operatively associated with the wireless transmission system 120 and configured for allowing wireless power transfer over the system 100. The listening device(s) 2000B may comprise any of the same types of listening devices described above with reference to the listening device(s) 2000A of FIG. 20A.

The charging surface 2020B may be any surface configured to house the wireless transmission system 120, obfuscate the wireless transmission system 120, indicate presence of the wireless transmission system 120, and/or indicate a charge volume for the listening device(s) 2000B. To that end, the charging surface 2020B may be a surface of a proprietary charger, a surface of a multidevice charger, a surface within a case and/or receptacle for the listening device(s) 2000B, a surface of an electronic device (e.g., a laptop computer, a smartphone, a mobile device, a tablet computer, among other electronic devices), a consumer, private, and/or commercial table and/or countertop, and/or a desktop, among other contemplated surfaces. It is to be noted that the form-factors illustrated for the listening devices 430A, 430B, the case 420A, and the charging surface 420B are merely exemplary and are not intended to limit the scope of the disclosure; other form factors for the listening devices 430A, 430B, the case 420A, and the charging surface 420B are certainly contemplated.

Figure 21A:
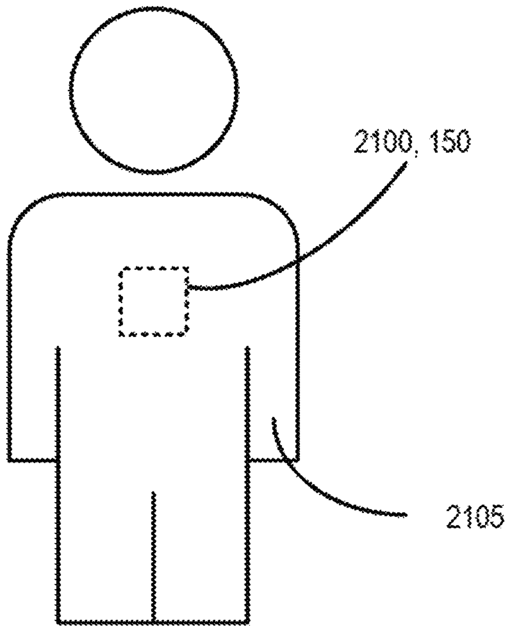
FIG. 21A is a front view of an example body that may be equipped with an implanted device having a wireless power receiver system, within which the wireless power and data transfer systems disclosed herein may be implemented for wireless power and data transfer to the implanted device.

Turning now to FIGS. 21A, an example implantable device 2100, which may include the wireless receiver system 150 and may be implanted within a body 2105, is illustrated in a front, plan-style view. The body 2105 may be any organic being that can have the implantable device 2100 implanted on it or within it, at least in part. The body 2105 may be a human being, an animal (e.g., a pet, a wild animal, a captive animal, etc.), among other known organic bodies.

The implantable device 2100 may be a medical device for a human (e.g., a stimulator, a pacemaker, an insulin pump, a sleep-apnea device, a neurostimulator, etc.), a pet-related implantable device (e.g., a location tracker for a pet, a health monitor for a pet, an identifying marker for a pet, etc.), etc. Further, the implantable device 2100 may take various other forms.

Figure 21B:
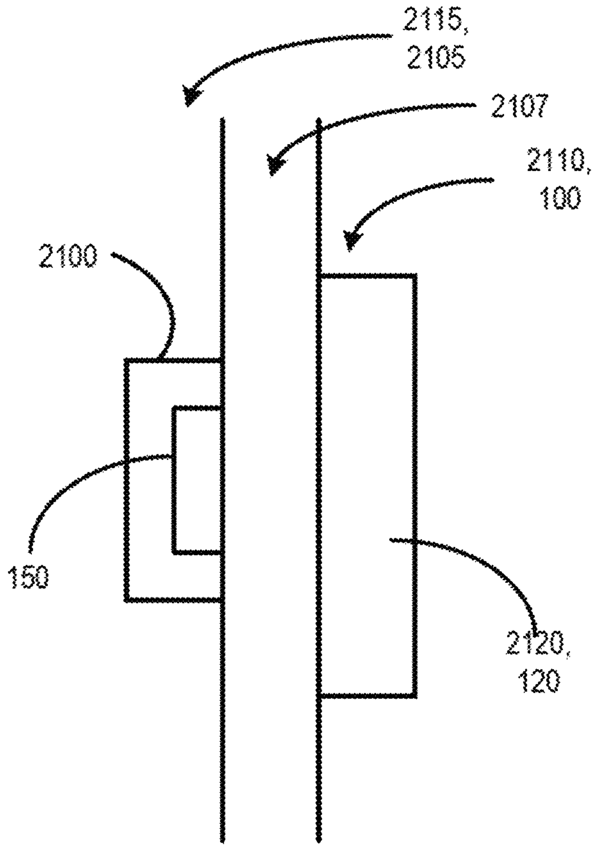
FIG. 21B is a side cross sectional view of a portion of the being of FIG. 21A illustrating the implanted device with respect to tissue(s) of the being and an external implanted device charger, within which the wireless power and data transfer systems disclosed herein may be implemented for wireless power and data transfer to the implanted device.

FIG. 21B is a side, cross sectional view of an implantable device system 2110, which utilizes the wireless power and data transfer system 100 for wireless power transfer to the implantable device 2100. As illustrated, the implantable device system 2110 further includes a charger 2120, which includes the wireless transmission system 120 integrated with and/or operatively associated with the charger 2120. The charger 2120 may be any surface, device, object, and/or container in which the implantable device 2100 interacts such that the integrated wireless receiver system 150 and integrated wireless transmission system 120 are capable of coupling for wireless power transfer. The charger 2120 may be and/or include any surfaces, proprietary devices, multi-device chargers, integrated chargers, cases, stands, holders, receptacles, and/or pouches, among other things. It is to be noted that the form-factors illustrated for the implantable device 2100 and/or the charger 2120 are merely exemplary and are not intended to limit the scope of the disclosure; other form factors for the implantable device 2100 and/or the charger 2120 are certainly contemplated.

As illustrated, the implantable device 2100 may be located within an inner-body volume 2115, which is a volume internal to the body 2105. When the charger 2120 is positioned, relative to the implantable device 2100, the charger 2120 may be positioned proximate to a tissue layer 2107 of the body 2105, which separates the inner-body volume 2115 from the outside world. Thus, the charger 2120 may be configured to charge the implantable device 2100, through the tissue layer 2107.

Implantable devices 2100 utilizing the wireless power and data transfer system 100 may be quite useful in a variety of fields, as they may prevent the unnecessary removal of implantable devices 2100 from the body 2105 to, for example, replace a battery that is depleted.

While illustrated as individual blocks and/or components of the wireless transmission system 120, one or more of the components of the wireless transmission system 120 may combined and/or integrated with one another as an integrated circuit (IC), a system-on-a-chip (SoC), among other contemplated integrated components. To that end, one or more of the transmission control system 200, the power conditioning system 600, the sensing system 300, the transmission antenna 121, and/or any combinations thereof may be combined as integrated components for one or more of the wireless transmission system 120, the wireless power and data transfer system 100, and components thereof. Further, any operations, components, and/or functions discussed with respect to the wireless transmission system 120 and/or components thereof may be functionally embodied by hardware, software, and/or firmware of the wireless transmission system 120.

Similarly, while illustrated as individual blocks and/or components of the wireless receiver system 150, one or more of the components of the wireless receiver system 150 may combined and/or integrated with one another as an IC, a SoC, among other contemplated integrated components. To that end, one or more of the components of the wireless receiver system 150 and/or any combinations thereof may be combined as integrated components for one or more of the wireless receiver system 150, the wireless power and data transfer system 100, and components thereof. Further, any operations, components, and/or functions discussed with respect to the wireless receiver system 150 and/or components thereof may be functionally embodied by hardware, software, and/or firmware of the wireless receiver system 150.

Further still, functionality disclosed herein for carrying out any of the systems and methods disclosed herein may be executed as software. For example, one or more controllers (e.g., the transmission controller 210, the receiver controller 510, etc.) may carry out said functionality of the systems and methods disclosed herein. To that end, any controller disclosed herein includes at least one processor and any controller disclosed herein includes or is otherwise associated with at least one machine-readable medium (e.g., the memory 212, the memory 512, etc.). Said machine-readable medium may comprise program instructions which, when executed by the at least one process of said controller, cause the controller to carry out some functionality disclosed that is associated with the disclosed systems and methods.

With respect to any of the data transmission systems disclosed herein, it should be appreciated that either or both of the wireless power sender and the wireless power receiver may wirelessly send in-band legacy data. Moreover, the systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 100 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment, a ferrite shield may be incorporated within the antenna structure to improve antenna performance. Selection of the ferrite shield material may be dependent on the operating frequency as the complex magnetic permeability ($\mu=\mu'-j*\mu''$) is frequency dependent. The material may be a polymer, a sintered flexible ferrite sheet, a rigid shield, or a hybrid shield, wherein the hybrid shield comprises a rigid portion and a flexible portion. Additionally, the magnetic shield may be composed of varying material compositions. Examples of materials may include, but are not limited to, zinc comprising ferrite materials such as manganese-zinc, nickel-zinc, copper-zinc, magnesium-zinc, and combinations thereof.

As used herein, the phrase “at least one of” preceding a series of items, with the term “and” or “or” to separate any of the items, modifies the list as a whole, rather than each member of the list (i.e., each item). The phrase “at least one of” does not require selection of at least one of each item listed; rather, the phrase allows a meaning that includes at least one of any one of the items, and/or at least one of any combination of the items, and/or at least one of each of the items. By way of example, the phrases “at least one of A, B, and C” or “at least one of A, B, or C” each refer to only A, only B, or only C; any combination of A, B, and C; and/or at least one of each of A, B, and C.

The predicate words “configured to”, “operable to”, and “programmed to” do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as “an aspect” does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an “aspect” may refer to one or more aspects and vice versa. A phrase such as an “embodiment” does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an “embodiment” may refer to one or more embodiments and vice versa. A phrase such as a “configuration” does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a “configuration” may refer to one or more configurations and vice versa.

The word “exemplary” is used herein to mean “serving as an example, instance, or illustration.” Any embodiment described herein as “exemplary” or as an “example” is not necessarily to be construed as preferred or advantageous over other embodiments. Furthermore, to the extent that the term “include,” “have,” or the like is used in the description or the claims, such term is intended to be inclusive in a manner similar to the term “comprise” as “comprise” is interpreted when employed as a transitional word in a claim. Furthermore, to the extent that the term “include,” “have,” or the like is used in the description or the claims, such term is intended to be inclusive in a manner similar to the term “comprise” as “comprise” is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase “means for” or, in the case of a method claim, the element is recited using the phrase “step for.”

Reference to an element in the singular is not intended to mean “one and only one” unless specifically so stated, but rather “one or more.” Unless specifically stated otherwise, the term “some” refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination. As a further example, it will be appreciated that certain protocols are used as specific example communications schemes herein, other wired and wireless communications techniques may be used where appropriate while embodying the principles of the present disclosure.

We claim:

1. A wireless power transmission system comprising:

a power and data connector that communicatively couples the wireless power transmission system with a given client device, the power and data connector comprising:

a power input that draws input direct current (DC) power from the given client device; and a bi-directional data connector;

a power conditioning system configured to: (i) receive the input DC power via the power input and (ii) generate alternating current (AC) signals based on the input DC power and a driving signal;

an antenna configured to (i) receive the AC signals, (ii) propagate wireless power signals based on the AC signals, and (iii) couple with a given wireless receiver system via the wireless power signals, the given wireless receiver system operatively associated with a given peripheral device; and a controller comprising:

at least one processor;

at least one non-transitory machine-readable medium; and program instructions stored on the at least one non-transitory machine-readable medium which, when executed by the at least one processor, cause the controller to:

generate the driving signal;

establish a wireless power transfer connection with the given peripheral device via (i) coupling with the given wireless receiver system, (ii) encoding first in-band data signals onto the wireless power signals, and (iii) decoding second in-band data signals from the wireless power signals that were transmitted by the given peripheral device;

after establishing the wireless power transfer connection, receive on-board data from the given peripheral device by decoding third in-band data signals that are encoded onto the wireless power signals by the given wireless power receiver system, the on-board data originating from data storage of the given peripheral device; and provide the on-board data to the given client device via the bi-directional data connector.

2. The wireless power transmission system of claim 1, wherein the controller further comprises program instructions stored on the at least one non-transitory machine-readable medium which, when executed by the at least one processor, cause the controller to encode data associated with the given client device onto the wireless power signals by altering the driving signal.

3. The wireless power transmission system of claim 2, wherein the controller further comprises program instructions stored on the at least one non-transitory machine-readable medium which, when executed by the at least one processor, cause the controller to receive the data associated with the given client device from the given client device, as communicated to the given client device from a back-end platform.

4. The wireless power transmission system of claim 3, wherein the data associated with the given client device is peripheral device user data.

5. The wireless power transmission system of claim 3, wherein the data associated with the given client device is communications information for another peripheral device that is configured to enable connectivity between the given peripheral device and the another peripheral device.

6. The wireless power transmission system of claim 1, wherein the on-board data is user credential data associated with a user of the given peripheral device.

7. The wireless power transmission system of claim 1, wherein the controller further comprises an automatic gain control (AGC) configured to (i) receive voltage information indicative of given in-band data signals and (ii) alter the voltage information to generate a gain-controlled data signal.

8. The wireless power transmission system of claim 1, wherein the controller further comprises program instructions stored on the at least one non-transitory machine-readable medium which, when executed by the at least one processor, cause the controller to, in response to an indication that the given wireless receiver system does not require further power transfer but is still proximate to the wireless power transmission system, enter a low power detection mode, and wherein program instructions stored on the at least one non-transitory machine-readable medium which, when executed by the at least one processor, cause the controller to generate the driving signal comprise program instructions which, when executed by the at least one processor, cause the controller to generate the driving signal based on the low power detection mode.

9. The wireless power transmission system of claim 1, further comprising a damping circuit that is configured to dampen the wireless power signals, wherein the damping circuit includes at least a damping transistor that is configured to receive a damping signal for switching the damping transistor to control damping during transmission of the wireless power signals, and wherein the controller further comprises program instructions stored on the at least one non-transitory machine-readable medium which, when executed by the at least one processor, cause the controller to generate the damping signal.

10. The wireless power transmission system of claim 9, wherein the damping circuit comprises a delay element.

11. A method of operating a wireless power transmission system, the method comprising:

receiving, as input, direct current (DC) power from a power and data connector (i) communicatively couples the wireless power transmission system with a given client device, the power and data connector and (ii) comprises (a) a power input that draws input direct current (DC) power from the given client device and (b) a bi-directional data connector;

generating a driving signal for driving an antenna of the wireless power transmission system;

generating alternating current (AC) signals based on the input DC power and the driving signal;

propagating wireless power signals that are based on the AC signals via the antenna;

establishing a wireless power transfer connection with a given peripheral device via:

coupling with a given wireless receiver system via the wireless power signals, the given wireless receiver system operatively associated with a given peripheral device;

encoding first in-band data signals onto the wireless power signals; and decoding second in-band data signals from the wireless power signals that were transmitted by the given peripheral device;

receiving on-board data from the given peripheral device by decoding third in-band data signals that are encoded onto the wireless power signals by the given wireless power receiver system, the on-board data originating from data storage of the given peripheral device; and providing the on-board data to the given client device via the bi-directional data connector.

12. The method of claim 11, further comprising encoding data associated with the given client device onto the wireless power signals by altering the driving signal.

13. The method of claim 12, further comprising receiving the data associated with the given client device from the given client device, as communicated to the given client device from a back-end platform.

14. The method of claim 13, wherein the data associated with the given client device is peripheral device user data.

15. The method of claim 14, wherein the data associated with the given client device is communications information for another peripheral device that is configured to enable connectivity between the given peripheral device and the another peripheral device.

16. The method of claim 11, wherein the on-board data is user credential data associated with a user of the given peripheral device.

17. The method of claim 11, further comprising:

receiving voltage information indicative of given in-band data signals; and altering the voltage information to generate a gain-controlled data signal.

18. The method of claim 11, further comprising, in response to an indication that the given wireless receiver system does not require further power transfer but is still proximate to the wireless power transmission system, entering a low power detection mode; and wherein generating the driving signal comprises generating the driving signal based on the low power detection mode.

19. The method of claim 11, further comprising:

generating damping signals that control selective signal dampening by a damping circuit during transmission of the wireless power signals; and based on the damping signal, controlling switching of a damping transistor of the damping circuit during transmission of the wireless power signals.

20. The method of claim 19, wherein the damping circuit comprises a delay element configured to ramp down a gate voltage for the damping transistor when the damping signal transitions from a high state to a low state.

* * * * *